US008571390B2

(12) United States Patent
Yahata et al.

(10) Patent No.: US 8,571,390 B2
(45) Date of Patent: Oct. 29, 2013

(54) REPRODUCTION DEVICE, PROGRAM, REPRODUCTION METHOD

(75) Inventors: Hiroshi Yahata, Osaka (JP); Tomoyuki Okada, Nara (JP)

(73) Assignee: Panasonic Corporation, Osaka (JP)

( * ) Notice: Subject to any disclaimer, the term of this patent is extended or adjusted under 35 U.S.C. 154(b) by 174 days.

(21) Appl. No.: 13/273,055

(22) Filed: Oct. 13, 2011

(65) Prior Publication Data

US 2012/0033941 A1 Feb. 9, 2012

Related U.S. Application Data

(63) Continuation of application No. 11/814,908, filed as application No. PCT/JP2006/301360 on Jan. 27, 2006, now Pat. No. 8,280,233.

(30) Foreign Application Priority Data

| Jan. 28, 2005 | (JP) | 2005-020716 |
| Jan. 28, 2005 | (JP) | 2005-020717 |
| Jan. 28, 2005 | (JP) | 2005-020718 |
| Jan. 28, 2005 | (JP) | 2005-020719 |
| Jan. 28, 2005 | (JP) | 2005-020720 |

(51) Int. Cl.
*H04N 5/928* (2006.01)

(52) U.S. Cl.
USPC .................................................. 386/338

(58) Field of Classification Search
None
See application file for complete search history.

(56) References Cited

U.S. PATENT DOCUMENTS

| 6,088,506 A | 7/2000 | Yoshio et al. |
| 6,219,488 B1 | 4/2001 | Mori et al. |
| 6,266,478 B1 | 7/2001 | Yoshio et al. |
| 6,653,948 B1 | 11/2003 | Kunimatsu et al. |
| 6,671,323 B1 | 12/2003 | Tahara et al. |
| 6,701,064 B1 | 3/2004 | De Haan et al. |
| 6,738,559 B1 | 5/2004 | Yoo et al. |
| 6,804,455 B1 | 10/2004 | Yoo et al. |
| 6,904,403 B1 | 6/2005 | Muraki et al. |
| 7,236,687 B2 | 6/2007 | Kato et al. |
| 7,477,833 B2 | 1/2009 | Kato et al. |
| 7,565,060 B2 | 7/2009 | Hamada et al. |
| 7,646,967 B2 | 1/2010 | Kato et al. |
| 7,961,570 B2 | 6/2011 | Seo et al. |
| 8,380,043 B2 * | 2/2013 | Saito .............................. 386/241 |
| 2001/0043731 A1 | 11/2001 | Ito et al. |
| 2001/0051040 A1 | 12/2001 | Yoshio et al. |

(Continued)

FOREIGN PATENT DOCUMENTS

| EP | 0 952 578 A2 | 10/1999 |
| EP | 1 198 133 A1 | 4/2002 |

(Continued)

*Primary Examiner* — Huy T Nguyen

(57) ABSTRACT

A playback apparatus that, when it is incorporated in a home theater system, judges via the HDMI whether an apparatus such as a speaker 600 connected thereto has a playback capability. If the connection partner apparatus has the playback capability, the playback apparatus inquires a user whether a decoding should be performed using a decoder embedded in the connection partner apparatus. If, in response to the inquiry, the user indicates that the decoding should be performed using the decoder of the connection partner apparatus, the playback apparatus reads a digital stream from a recording medium and outputs the read digital stream to the connection partner apparatus, by the pass-through output, regardless of a decoding capability of the playback apparatus itself.

4 Claims, 50 Drawing Sheets

(56) References Cited

U.S. PATENT DOCUMENTS

| | | | |
|---|---|---|---|
| 2002/0080875 A1 | 6/2002 | Tahara et al. |
| 2002/0085835 A1 | 7/2002 | Zhang et al. |
| 2002/0114388 A1 | 8/2002 | Ueda et al. |
| 2002/0181787 A1 | 12/2002 | Ito et al. |
| 2002/0194618 A1 | 12/2002 | Okada et al. |
| 2003/0161615 A1 | 8/2003 | Tsumagari et al. |
| 2003/0206712 A1 | 11/2003 | Yoshio et al. |
| 2004/0013198 A1 | 1/2004 | Togashi et al. |
| 2004/0120695 A1 | 6/2004 | Tsumagari et al. |
| 2004/0151472 A1 | 8/2004 | Seo et al. |
| 2004/0234242 A1 | 11/2004 | Akita et al. |
| 2005/0053360 A1 | 3/2005 | Jung et al. |
| 2005/0058307 A1 | 3/2005 | Yang et al. |
| 2006/0280075 A1 | 12/2006 | Kanegae et al. |
| 2007/0172210 A1 | 7/2007 | Hamada et al. |
| 2007/0230917 A1 | 10/2007 | Okada et al. |
| 2007/0258698 A1 | 11/2007 | Okada et al. |
| 2007/0286577 A1 | 12/2007 | Kato et al. |

FOREIGN PATENT DOCUMENTS

| | | |
|---|---|---|
| EP | 1 463 340 A2 | 9/2004 |
| EP | 1 638 327 A1 | 3/2006 |
| JP | 8-287654 | 11/1996 |
| JP | 9-282848 | 10/1998 |
| JP | 10-285240 | 10/1998 |
| JP | 2000-22856 | 8/2000 |
| JP | 2000-335320 | 12/2000 |
| JP | 2000-346651 | 12/2000 |
| JP | 2001-8211 | 1/2001 |
| JP | 2001-250318 | 9/2001 |
| JP | 2002-250636 | 9/2002 |
| JP | 2002-369154 | 12/2002 |
| JP | 2003-249057 | 9/2003 |
| JP | 2004-7423 | 1/2004 |
| JP | 2004-103207 | 4/2004 |
| JP | 2004-118905 | 4/2004 |
| JP | 2004-127398 | 4/2004 |
| JP | 2004-206863 | 7/2004 |
| JP | 2005-32425 | 2/2005 |
| RU | 2 233 011 | 11/1999 |
| WO | 98/55998 | 12/1998 |
| WO | WO 01/82608 | 1/2001 |
| WO | WO 2004/042723 | 5/2004 |
| WO | 2004/075547 | 9/2004 |
| WO | WO 2004/074976 A2 | 9/2004 |
| WO | WO 2004/093064 A1 | 10/2004 |
| WO | WO 2004/098183 | 11/2004 |
| WO | WO 2004/098193 A2 | 11/2004 |

* cited by examiner

FIG. 14

| PID value | stream |
|---|---|
| 0x0100 | program_map |
| 0x1001 | PCR |
| 0x1011 | video stream |
| 0x1100~0x111F | Primary audio stream |
| 0x1200~0x121F | PG stream |
| 0x1400~0x141F | IG stream |
| 0x1A00~0x1A1F | Secondary audio stream |

FIG. 15A
structure of Secondary audio stream
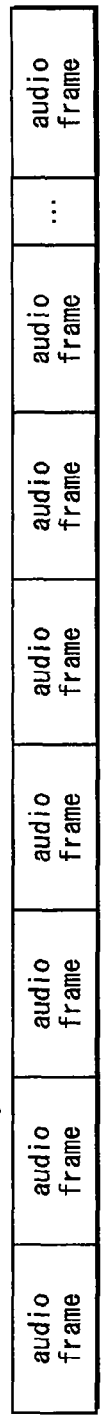
FIG. 15B
audio frame
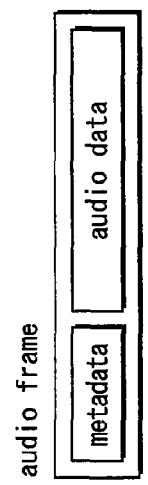
FIG. 15C
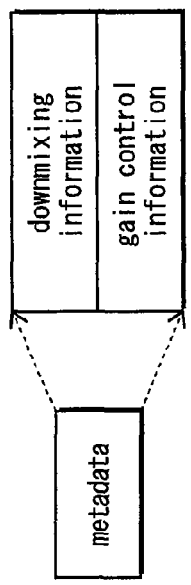
FIG. 15D  gain control information
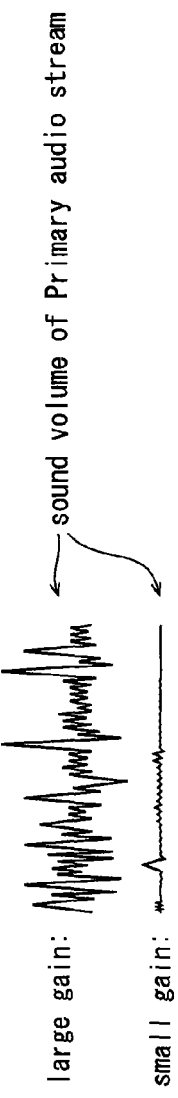
large gain:
small gain:

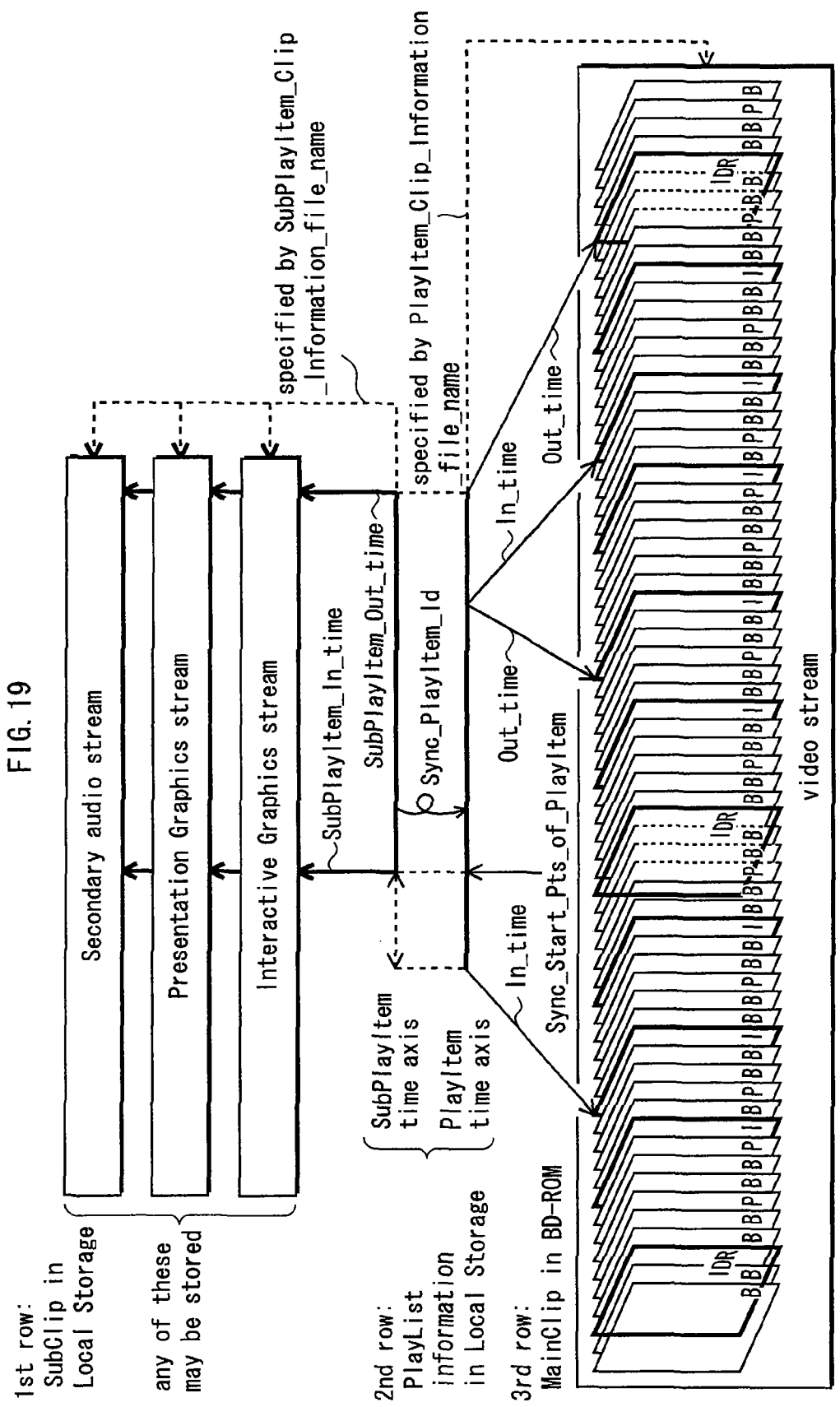

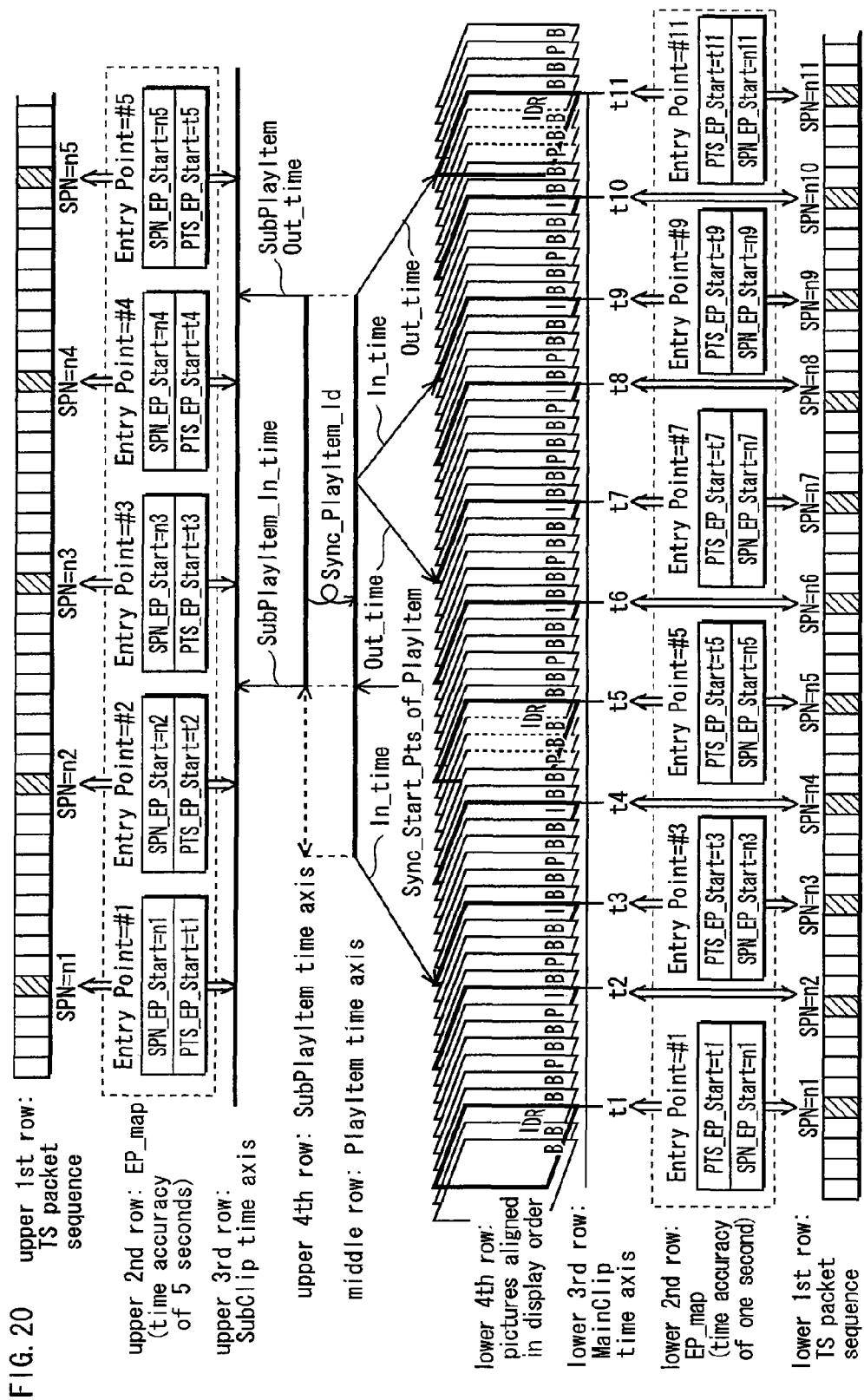

FIG. 21

STN_table

| |
|---|
| number_of_video_stream_entries |
| number_of_audio_stream_entries |
| number_of_PG_stream_entries |
| number_of_IG_stream_entries | video_streams permitted to be reproduced by PlayItem
{ entry-attribute }

Primary audio streams permitted to be reproduced by PlayItem
{
| |
|---|
| entry-attribute |
| entry-attribute |
| entry-attribute |
| entry-attribute |
| ⋮ |
| entry-attribute |
}

Secondary audio streams permitted to be reproduced by PlayItem
{
| |
|---|
| entry-attribute |
| Comb_info_Sequence_audio_Primary_audio |
| entry-attribute |
| Comb_info_Sequence_audio_Primary_audio |
| ⋮ |
| entry-attribute |
| Comb_info_Sequence_audio_Primary_audio |
}

PG streams permitted to be reproduced by PlayItem
{
| |
|---|
| entry-attribute |
| entry-attribute |
| entry-attribute |
| entry-attribute |
| ⋮ |
| entry-attribute |
}

IG streams permitted to be reproduced by PlayItem
{
| |
|---|
| entry-attribute |
| entry-attribute |
}

FIG. 27A  PSR1:Primary Audio Stream Number

| b31 | b30 | b29 | b28 | b27 | b26 | b25 | b24 |
|---|---|---|---|---|---|---|---|
| reserved ||||||||

| b23 | b22 | b21 | b20 | b19 | b18 | b17 | b16 |
|---|---|---|---|---|---|---|---|
| reserved ||||||||

| b15 | b14 | b13 | b12 | b11 | b10 | b9 | b8 |
|---|---|---|---|---|---|---|---|
| reserved ||||||||

| b7 | b6 | b5 | b4 | b3 | b2 | b1 | b0 |
|---|---|---|---|---|---|---|---|
| Primary audio stream number ||||||||

Primary audio stream
number ··· 0:Reserved
1 to 32:Primary audio stream number
0xFF:Primary audio stream is not selected
or no Primary audio stream FIG. 27B  PSR14:Secondary Audio Stream Number

| b31 | b30 | b29 | b28 | b27 | b26 | b25 | b24 |
|---|---|---|---|---|---|---|---|
| ||||||||

| b23 | b22 | b21 | b20 | b19 | b18 | b17 | b16 |
|---|---|---|---|---|---|---|---|
| reserved ||||||||

| b15 | b14 | b13 | b12 | b11 | b10 | b9 | b8 |
|---|---|---|---|---|---|---|---|
| ||||||||

| b7 | b6 | b5 | b4 | b3 | b2 | b1 | b0 |
|---|---|---|---|---|---|---|---|
| Secondary audio stream number ||||||||

Secondary audio stream
number ··· 0:Reserved
1 to 32:Secondary audio stream number
0xFF:Secondary audio stream is not selected
or no Secondary audio stream
Others:reserved FIG. 27C  PSR31:Player Profile/Player Version

| b31 | b30 | b29 | b28 | b27 | b26 | b25 | b24 |
|---|---|---|---|---|---|---|---|
| reserved ||||||||

| b23 | b22 | b21 | b20 | b19 | b18 | b17 | b16 |
|---|---|---|---|---|---|---|---|
| reserved |||| Player Profile ||||

| b15 | b14 | b13 | b12 | b11 | b10 | b9 | b8 |
|---|---|---|---|---|---|---|---|
| ||||||||

| b7 | b6 | b5 | b4 | b3 | b2 | b1 | b0 |
|---|---|---|---|---|---|---|---|
| ||||||||

Player Profile ··· 0000b:Standard profile player
without predetermined functions
0001b:Standard profile player
with all the functions
0011b:Full profile player Status and Transition for PSR14

Condition (A):
Reproduction apparatus has capability to reproduce Primary audio stream identified by PSR14.

Condition (B):
Combination of Primary_Audio_Stream_Number and Secondary_Audio_Stream_Number is permitted in STN_table

FIG. 37

PSR15:Player Capability for Audio

| b31 | b30 | b29 | b28 | b27 | b26 | b25 | b24 |
|---|---|---|---|---|---|---|---|
| reserved | | | | | | | |

| b23 | b22 | b21 | b20 | b19 | b18 | b17 | b16 |
|---|---|---|---|---|---|---|---|
| reserved | | | | | | | |

| b15 | b14 | b13 | b12 | b11 | b10 | b9 | b8 |
|---|---|---|---|---|---|---|---|
| DD/MLP | | DD(AC-3) | | DTS-HD capability | | | |
| MLP audio | | | | Extension Substream | | Core Substream | |

| b7 | b6 | b5 | b4 | b3 | b2 | b1 | b0 |
|---|---|---|---|---|---|---|---|
| DD/DD+ capability | | | | LPCM capability | | | |
| Dependent substream | | Independent substream | | | | | |

LPCM capability ... 0001b:Stereo capable for 48/96kHz
0010b:Surround capable for 48/96kHz
0101b:Stereo capable for all sampling frequency
0110b:Surround capable for all sampling frequency Note: A second left bit specifies capability of decoding for 192kHz LPCM.

DD/DD+ capability

| Independent substream(AC-3) | ... | 01b:Stereo capable<br>10b:Surround capable |
|---|---|---|
| Dependent substream | ... | 00b:incapable<br>01b:Stereo capable<br>10b:Surround capable |

DTS-HD capability

| Core substream | ... | 01b:Stereo capable<br>10b:Surround capable |
|---|---|---|
| Extension substream | ... | 00b:incapable<br>01b:Stereo capable<br>10b:Surround capable |

DD/MLP capability

| DD(AC-3) | ... | 01b:Stereo capable<br>10b:Surround capable |
|---|---|---|
| MLP audio | ... | 00b:incapable<br>01b:Stereo capable<br>10b:Surround capable |

PSR31:Player Profile/Player Version

| b31 | b30 | b29 | b28 | b27 | b26 | b25 | b24 |
|---|---|---|---|---|---|---|---|
| reserved | | | | | | | |

| b23 | b22 | b21 | b20 | b19 | b18 | b17 | b16 |
|---|---|---|---|---|---|---|---|
| reserved | | | | Player Profile | | | |

| b15 | b14 | b13 | b12 | b11 | b10 | b9 | b8 |
|---|---|---|---|---|---|---|---|
| Player Version(b15-B8) | | | | | | | |

| b7 | b6 | b5 | b4 | b3 | b2 | b1 | b0 |
|---|---|---|---|---|---|---|---|
| Player Version(b7-B0) | | | | | | | |

Player Profile ··· 0000b:Standard profile player
                       without predetermined functions
                 0001b:Standard profile player
                       with all the functions
                 0011b:Full profile player
                 1000b:Audio profile player

REPRODUCTION DEVICE, PROGRAM, REPRODUCTION METHOD

RELATED APPLICATIONS

This is a continuation application from U.S. application Ser. No. 11/814,908 filed on Nov. 13, 2008, which is a §371 application of PCT/JP2006/301360 filed on Jan. 27, 2006, which claims priority from Japanese Application No. 2005-020716 filed on Jan. 28, 2005, Japanese Application No. 2005-020717 filed on Jan. 28, 2005, Japanese Application No. 2005-020718 filed on Jan. 28, 2005, Japanese Application No. 2005-020719 filed on Jan. 28, 2005 and Japanese Application No. 2005-020720 filed on Jan. 28, 2005.

TECHNICAL FIELD

The present invention relates to an audio stream reading technology.

BACKGROUND ART

The audio stream reading technology is a technology for allowing a playback apparatus to read a compressed encoded audio stream from a recording medium such as an optical disc, and to output the read audio stream to another apparatus. In general, the playback apparatus is provided with a decoder for decompressing the compressed encoded audio stream, obtains a non-compressed LPCM-format digital audio with the decoding by the decoder, and outputs the obtained non-compressed LPCM-format digital audio or an analog audio signal to another apparatus.

A televisions or a speaker in a home theater system takes in the non-compressed LPCM-format digital audio or the analog audio signal that is output from the playback apparatus in this way, and outputs sounds/voices. The document identified below discloses one of prior art technologies for reading an audio stream recorded on a recording medium and playing back the read audio stream.

Document 1: Japanese Patent Application Publication No. 2000-228656

DISCLOSURE OF THE INVENTION

The Problems the Invention is Going to Solve

In some home theater systems, however, the playback apparatus is connected to an expensive AV amplifier that has a decoding capability.

Here, such expensive AV amplifiers are used by people who favor high-quality audio. Accordingly, a decoder circuit connected to the expensive amplifier is made of an expensive hardware material for the purpose of preventing a noise from occurring. On the other hand, in a decoder circuit embedded in the playback apparatus, a low-price hardware material is used for the circuit board or the like, providing a less anti-noise ability.

Accordingly, if decoding is performed by the playback apparatus, not by the AV amplifier, and the decoding result is output, the output audio is of a low quality, with a noise added thereto, even if the decoder on the AV amplifier side is an expensive one.

One solution to the above-mentioned problem would be to enrich the product line up by adding such a playback apparatus that outputs the compressed audio stream as it is, aiming at people who have such expensive AV amplifiers. However, since such people are small in number, enriching the product line up in that way is burdensome for the product makers.

It is therefore an object of the present invention to provide a playback apparatus that can maximize the ability of an expensive AV amplifier when the expensive AV amplifier is included, together with the playback apparatus, in a home theater system.

Means to Solve the Problems

To solve the above-described problem, the present invention provides a playback apparatus for reading an audio stream in an encoded state from a recording medium and playing back the read audio stream, the playback apparatus comprising: a judging unit operable to judge whether or not a connection partner apparatus has a playback capability; an inquiring unit operable to, if the judging unit judges that the connection partner apparatus has the playback capability, inquire a user whether or not a decoding should be performed using a decoder embedded in the connection partner apparatus; and a transfer unit operable to transfer the audio stream from the recording medium to the connection partner apparatus by keeping the audio stream in the encoded state, if, in response to the inquiry, the user indicates that the decoding should be performed using the decoder of the connection partner apparatus.

Alternatively, or in addition, the present invention provides a recording medium in which playlist information is recorded, the playlist information including main path information and sub path information. The main path information is information that specifies, as a main stream, one of a plurality of digital streams, and defines a main playback section in the main stream. The sub path information is information that specifies, as a sub stream, another one of the plurality of digital streams, and defines a sub playback section in the sub stream, the sub playback section being synchronized with the main playback section, the sub stream being recorded in the recording medium. The present invention may further include a video stream and a primary audio stream that have been multiplexed in the main stream. The sub stream includes a secondary audio stream, which includes metadata that defines a coefficient matrix that is to be included in a sound mixing application, and the coefficient matrix defines conversion coefficients for respective channels for audio outputs of the primary audio stream, each of the conversion coefficients being used when a conversion process for soundmixing is performed for each of the channels.

Effects of the Invention

With the above-described structure, if the user indicates that the decoding should be performed using the decoder of the connection partner apparatus, the playback apparatus transfers the audio stream from the recording medium to the connection partner apparatus by keeping the audio stream in the encoded state, regardless of the decoding capability of the playback apparatus itself. This makes it possible to cause the AV amplifier, which is connected to the playback apparatus, to perform the decoding instead of the playback apparatus itself, if the AV amplifier is an expensive one for high-quality audio and has the decoding capability. With this structure, if the AV amplifier has a decoder that prevents a noise from occurring, it is possible to cause the AV amplifier to perform the decoding, realizing a high-quality audio output.

As described above, when the playback apparatus of the present invention is incorporated in a home theater system which also includes an expensive AV amplifier, it is possible to maximize the ability of the decoder of the AV amplifier. Accordingly, this makes it possible to develop with ease and market such a playback apparatus that can be supported by a wide range of users including ordinary ones and those who favor high-quality audio, without unnecessarily enriching the product line up.

BRIEF DESCRIPTION OF THE DRAWING

FIG. 14 shows PID assignment map in the BD-ROM standard.

FIG. 15A shows the internal structure of the Secondary audio stream.

FIG. 15B shows an example of the audio frame.

FIG. 15C shows an internal structure of the metadata.

FIG. 15D shows an example of the gain control information.

FIG. 19 shows the relationships among SubClip in the local storage 200, PlayList information in the local storage 200, and MainClip in the BD-ROM.

FIG. 20 shows the EP_map and the PlayItem time axis that are set for the MainClip and the EP_map and the SubPlayItem time axis that are set for the SubClip composed of Primary and Secondary audio streams.

FIG. 21 shows the internal structure of the STN_table.

FIG. 27A shows the bit assignment in the PSR1.

FIG. 27B shows the bit assignment in the PSR14.

FIG. 27C shows the bit assignment in the PSR31.

FIG. 37 shows an internal structure of PSR15 in the PSR set 23.

DESCRIPTION OF CHARACTERS

Figure 1:
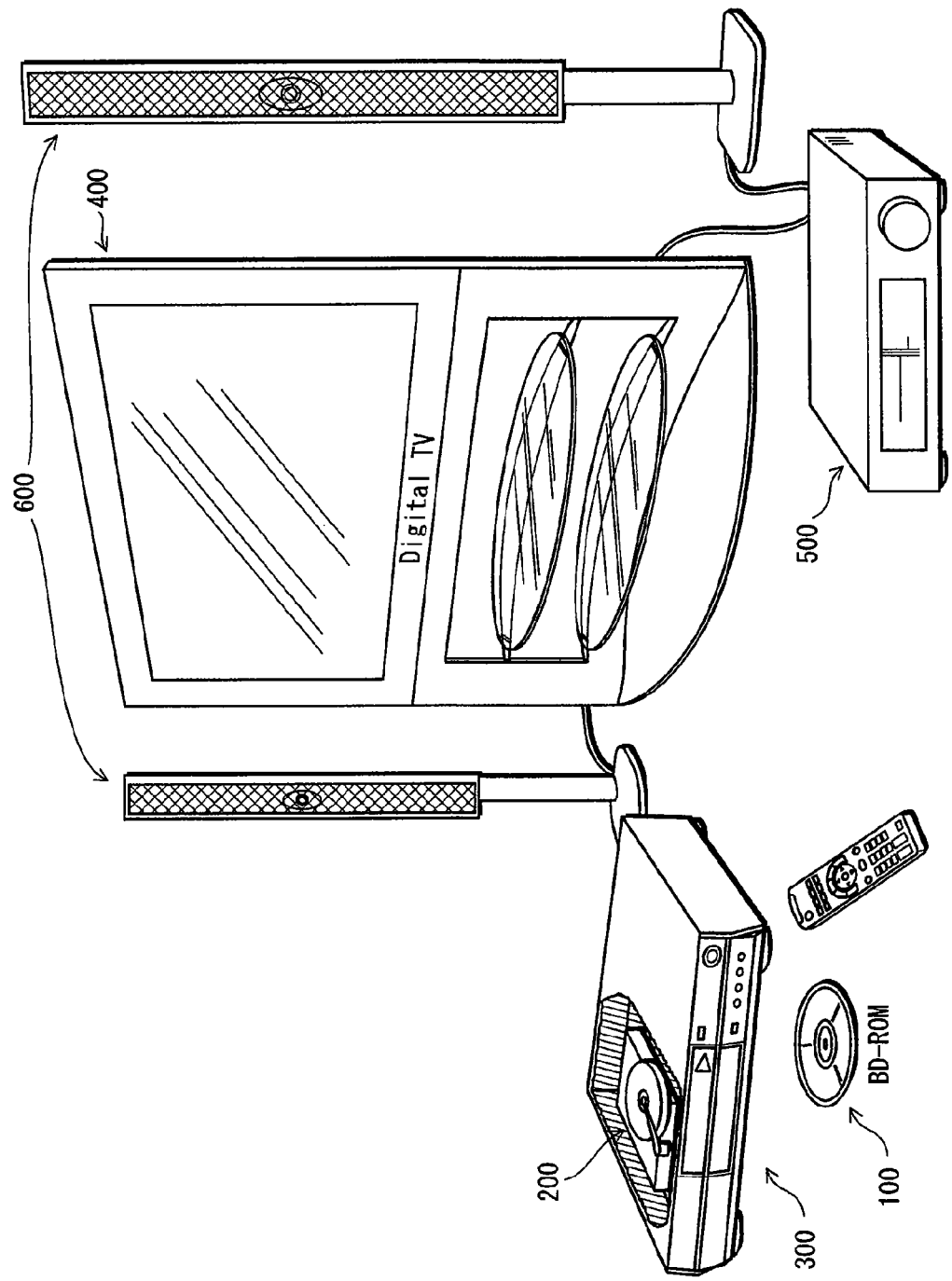
FIG. 1 shows a use of the recording medium of the present invention.

100 BD-ROM
200 local storage
300 reproduction apparatus
400 television
500 AV amplifier
600 speakers
1a BD-ROM drive
1b bus
2a, 2b read buffers
3a, 3b demultiplexers
4 video decoder
5 video plane
6a, 6b buffers
7a, 7b audio decoders
8 DownMix/DownSample
9a, 9b mixers
10a switch
10b encoder
11 Interactive Graphics decoder
12 Interactive Graphics plane
13 Presentation Graphics decoder
14 Presentation Graphics plane
15 JPEG decoder
16 Still plane
17 combining unit
18a, 18b STC generating units
19a, 19b ATC generating units
21 memory
22 controller
23 PSR set
24 PID conversion unit
25 communication unit
26 operation receiving unit
27 HDMI transmission/reception unit
41 PlayList processing unit
42 Procedure executing unit
43 Procedure executing unit
44 mixing control unit

BEST MODE FOR CARRYING OUT THE INVENTION

First Embodiment

The following describes an embodiment of the recording medium of the present invention. First, the use of the recording medium of the present invention will be described. FIG. 1 shows a use of the recording medium of the present invention. In FIG. 1, the recording medium of the present invention is a local storage 200. The local storage 200 is used for the purpose of supplying a motion picture to a home theater system composed of a reproduction apparatus 300, a television 400, an AV amplifier 500, and speakers 600.

The BD-ROM 100, the local storage 200, and the reproduction apparatus 300 will now be described.

The BD-ROM 100 is a recording medium in which a motion picture is recorded.

The local storage 200 is a hard disk that is embedded in the reproduction apparatus, and is used for storing a content that is distributed from a server of a motion picture distributor.

The reproduction apparatus 300 is a digital home electric appliance supported for networks, and has a function to reproduce a content of the BD-ROM 100. The reproduction apparatus 300 is also able to combine a content, which is downloaded from the server of the motion picture distributor via a network, with the content recorded on the BD-ROM 100 to expand/update the content of the BD-ROM 100. With a technology called "virtual package", it is possible to combine a content recorded on the BD-ROM 100 with a content recorded on the local storage 200 and treat the data, which is not recorded on the BD-ROM 100, as if it is recorded on the BD-ROM 100.

Up to now, the use of the recording medium of the present invention has been described.

Figure 2:
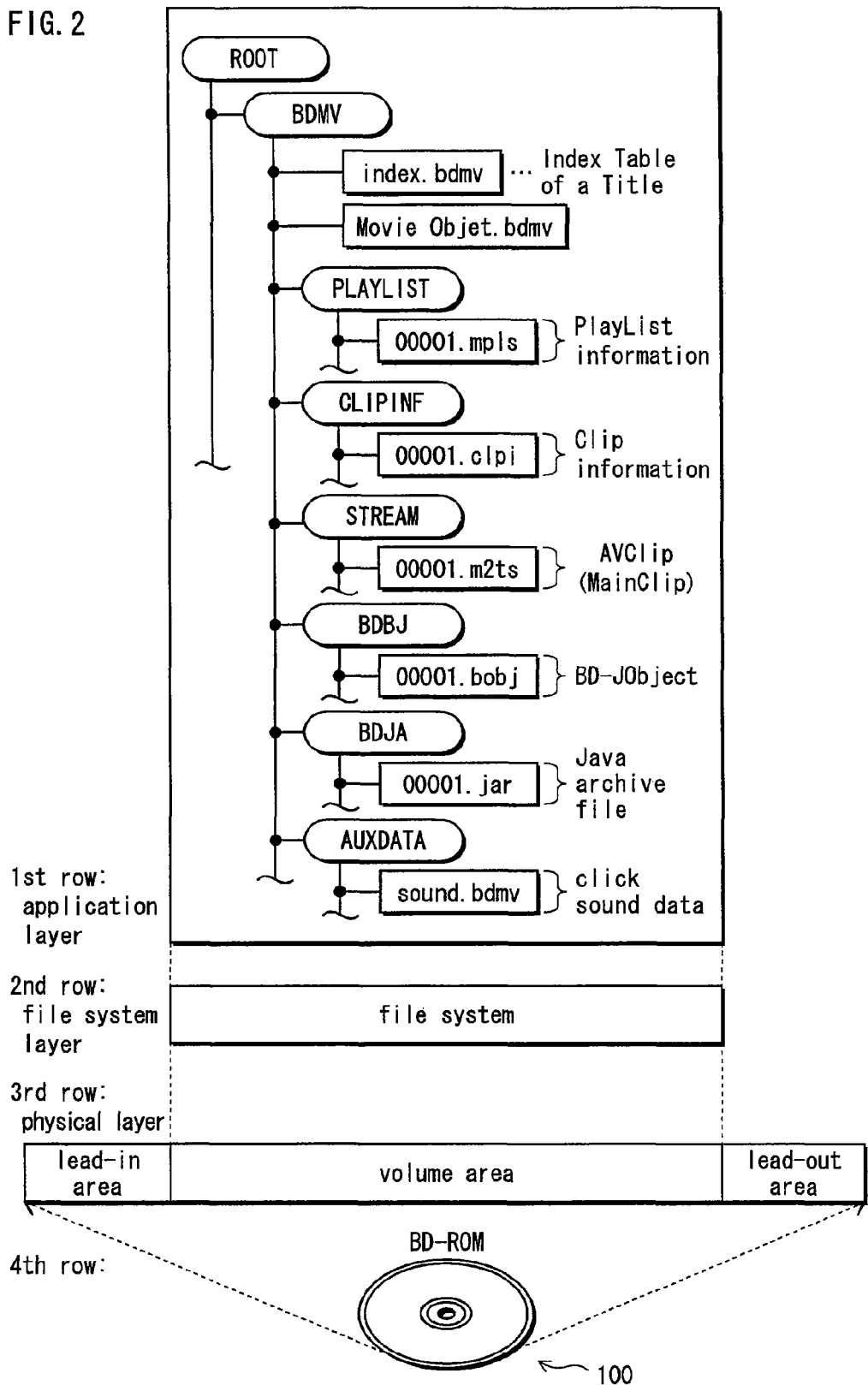
FIG. 2 shows the internal structure of the BD-ROM.

From now on, the production of the recording medium of the present invention will be described. The recording medium of the present invention can be achieved by an improvement on a file system of the BD-ROM. FIG. 2 shows a file/directory structure of the BD-ROM. In FIG. 2, file/directory structure of the BD-ROM includes a BDMV directory under a root directory.

<BD-ROM Outline>

FIG. 2 shows an internal structure of the BD-ROM. The fourth row of FIG. 2 shows the BD-ROM. The third row shows tracks on the BD-ROM. FIG. 2 shows the tracks in the state where they are horizontally extended though they are in reality formed spirally in order from the inner circumference to the outer circumference. The tracks include a lead-in area, a volume area, and a lead-out area. The volume area of FIG. 2 has a layer model that includes a physical layer, a file system layer, and an application layer. The $1^{st}$ row of FIG. 2 shows an application layer format (application format) of the BD-ROM represented by a directory structure. In the $1^{st}$ row of FIG. 2, the BD-ROM includes a BDMV directory under a root directory.

The BDMV directory includes files to which an extension "bdmv" is attached ("index.bdmv" and "Movie Object.bdmv"). Under the BDMV directory, there are six subdirectories: PLAYLIST directory, CLIPINF directory, STREAM directory, BDBJ directory, BDJA directory, and AUXDATA directory.

The PLAYLIST directory includes a file to which an extension "mpls" is attached ("00001.mpls").

The CLIPINF directory includes a file to which an extension "clpi" is attached ("00001.clpi").

The STREAM directory includes a file to which an extension "m2ts" is attached ("00001.m2ts").

The BDBJ directory includes a file to which an extension "bobj" is attached ("00001.bobj").

The BDJA directory includes a file to which an extension "jar" is attached ("00001.jar").

The AUXDATA directory includes a file "sound.bdmv".

It is understood from the above-described directory structure that a plurality of different types of files are stored in the BD-ROM.

<BD-ROM Structure 1: AVClip>

Figure 3:
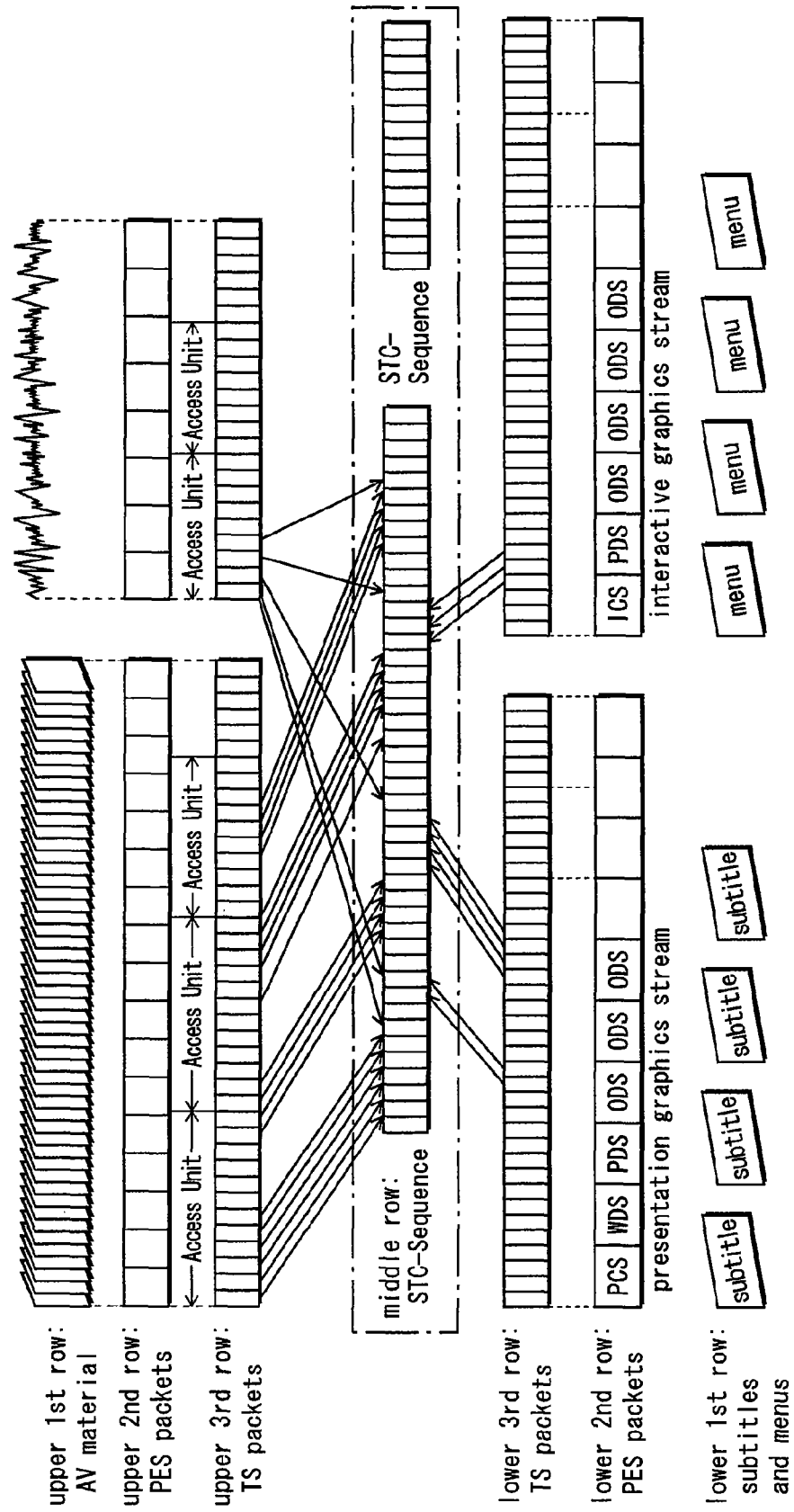
FIG. 3 shows the structure of the file to which the extension "m2ts" is attached.

Firstly, files with the extension "m2ts" will be explained. FIG. 3 shows the structure of the file to which the extension "m2ts" is attached. The file to which the extension "m2ts" is attached ("00001.m2ts") stores an AVClip. The AVClip is a digital stream in the MPEG2-Transport Stream format. The digital stream is generated by converting the digitized video and audio (upper $1^{st}$ row) into an elementary stream composed of PES packets (upper $2^{nd}$ row), and converting the elementary stream into TS packets (upper $3^{rd}$ row), and similarly, converting the Presentation Graphics (PG) stream for the subtitles or the like and the Interactive Graphics (IG) stream for the interactive purposes (lower $1^{st}$ row, lower 2nd row) into the TS packets ($3^{rd}$ row), and then finally multiplexing these TS packets.

The PG stream is a graphics stream constituting a subtitle written in a language. There are a plurality of streams that respectively correspond to a plurality of languages such as English, Japanese, and French. The PG stream is composed of functional segments such as: PCS (Presentation Control Segment); PDS (Pallet Define Segment); WDS (Window Define Segment); ODS (Object Define Segment); and END (END of Display Set Segment). The ODS (Object Define Segment) is a functional segment that defines a graphics object as a subtitle.

The WDS is a functional segment that defines a drawing area of a graphics object on the screen. The PDS (Pallet Define Segment) is a functional segment that defines a color in drawing a graphics object. The PCS is a functional segment that defines a page control in displaying a subtitle. Such page control includes Cut-In/Out, Fade-In/Out, Color Change, Scroll, and Wipe-In/Out. It is possible with the page control by the PCS to achieve a display effect, for example, fading out the current subtitle while displaying the next subtitle.

The IG stream is a graphics stream for achieving an interactive control. The interactive control defined by the IG stream is an interactive control that is compatible with an interactive control on a DVD reproduction apparatus. The IG stream is composed of functional segments such as: ICS (Interactive Composition Segment); PDS (Palette Definition Segment); ODS (Object Definition Segment); and END (END of Display Set Segment). The ODS (Object Definition Segment) is a functional segment that defines a graphics object. A button on the interactive screen is drawn by a plurality of such graphics objects. The PDS (Palette Definition Segment) is a functional segment that defines a color in drawing a graphics object. The ICS (Interactive Composition Segment) is a functional segment that achieves a state change in which the button state changes in accordance with a user operation. The ICS includes a button command that is executed when a confirmation operation is performed on a button.

The AVClip is composed of one or more "STC_Seuences". The "STC_Seuence" is a section that does not include a system time-base discontinuity of the System Time Clock (STC), which is the standard time of the system for the AV stream. The system time-base discontinuity of the STC is a point at which the discontinuity_indicator of the PCR packet, which carries the PCR (Program Clock Reference) that is referred to by the decoder to obtain the STC, is ON.

Figure 4:
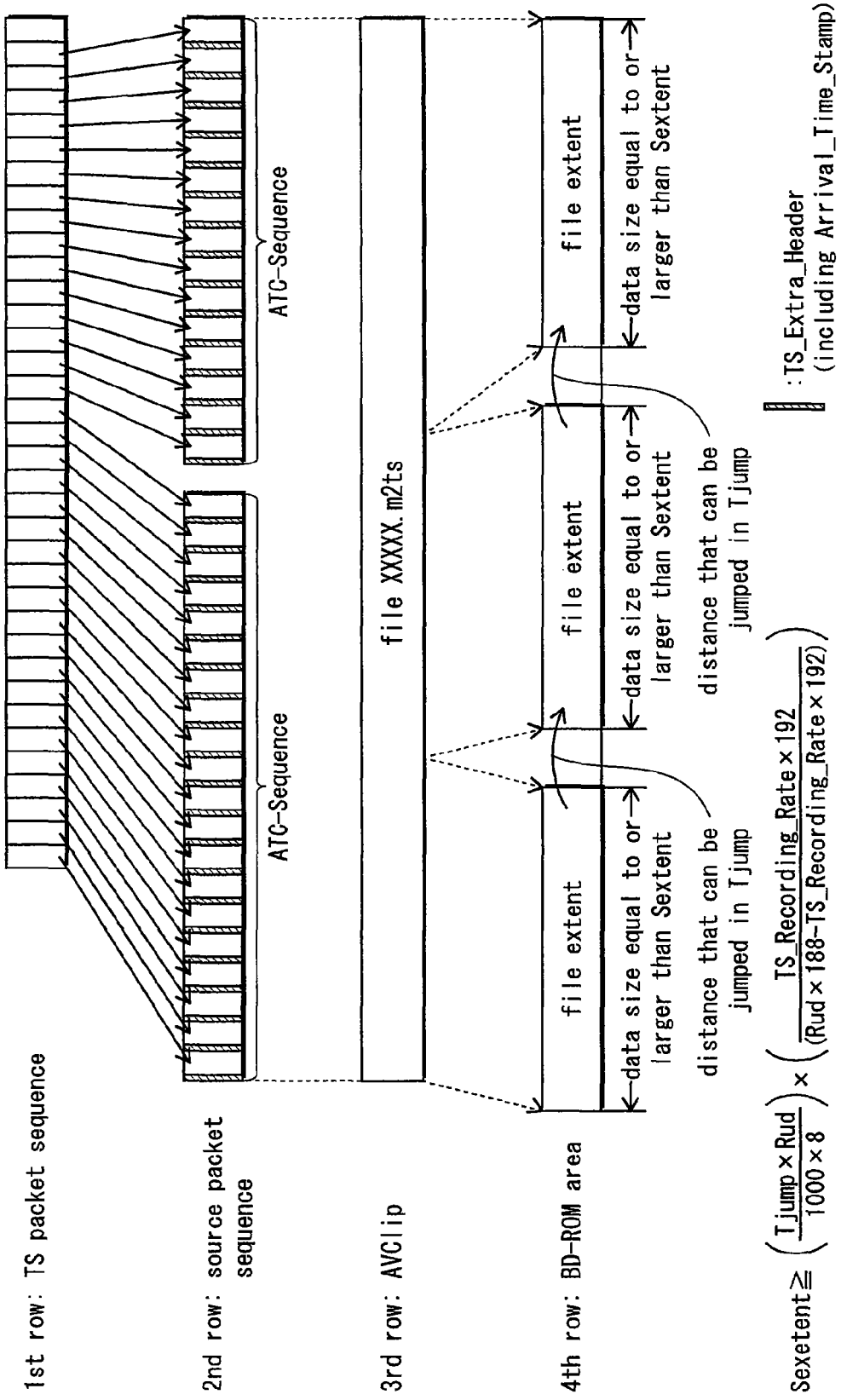
FIG. 4 shows what processes the TS packets constituting the AVClip are subjected to before they are written to the BD-ROM.

Next, how the AVClip having the above-described construction is written to the BD-ROM will be explained. FIG. 4 shows what processes the TS packets constituting the AVClip are subjected to before they are written to the BD-ROM. The 1$^{st}$ row of FIG. 4 shows the TS packets constituting the AVClip.

As shown in the 2$^{nd}$ row of FIG. 4, a 4-byte TS_extra_header (shaded portions in the drawing) is attached to each 188-byte TS packet constituting the AVClip to generate each 192-byte Source packet. The TS_extra_header includes Arrival_Time_Stamp that is information indicating the time at which the TS packet is input to the decoder.

The AVClip shown in the 3$^{rd}$ row includes one or more "ATC_Sequences" each of which is a sequence of Source packets. The "ATC_Sequence" is a sequence of Source packets, where Arrival_Time_Clocks referred to by the Arrival_Time_Stamps included in the ATC_Sequence do not include "arrival time-base discontinuity". In other words, the "ATC_Sequence" is a sequence of Source packets, where Arrival_Time_Clocks referred to by the Arrival_Time_Stamps included in the ATC_Sequence are continuous.

Such ATC_Sequences constitute the AVClip, and is recorded on the BD-ROM with a file name "xxxxx.m2ts".

The AVClip is, as is the case with the normal computer files, divided into one or more file extents, which are then recorded in areas on the BD-ROM. The 4$^{th}$ row shows how the AVClip is recorded on the BD-ROM. In the 4$^{th}$ row, each file extent constituting the file has a data length that is equal to or larger than a predetermined length called Sextent. Sextent is the minimum data length of each file extent, where an AVClip is divided into a plurality of file extents to be recorded.

It is presumed here that the time required for the optical pickup to jump to a location on the BD-ROM is obtained by the following equation:

$$Tjump=Taccess+Toverhead.$$

The "Taccess" is a time required that corresponds to a jump distance (a distance to a jump-destination physical address).

The TS packets read out from the BD-ROM are stored in a buffer called the read buffer, and then output to the decoder. The "Toverhead" is obtained by the following equation when the input to the read buffer is performed with a bit rate called the Rud and the number of sectors in the ECC block is represented by Secc:

$$Toverhead \leq (2 \times Secc \times 8)/Rud = 20 \text{ msec}.$$

TS packets read out from the BD-ROM are stored in the read buffer in the state of Source packets, and then supplied to the decoder at a transfer rate called "TS_Recording_rate".

To keep the transfer rate of the TS_Recording_rate while the TS packets are supplied to the decoder, it is necessary that during Tjump, the TS packets are continuously output from the read buffer to the decoder. Here, Source packets, not TS packets, are output from the read buffer. As a result, when the ratio of the TS packet to the Source packet in size is 192/188, it is necessary that during Tjump, the Source packets are continuously output from the read buffer at a transfer rate of "192/188×TS_Recording_rate".

Accordingly, the amount of occupied buffer capacity of the read buffer that does not cause an underflow is represented by the following equation:

$$Boccupied \geq (Tjump/1000 \times 8) \times ((192/188) \times TS\_Recording\_rate).$$

The input rate to the read buffer is represented by Rud, and the output rate from the read buffer is represented by TS_Recording_rate×(192/188). Therefore, the occupation rate of the read buffer is obtained by performing "(input rate)−(output rate)", and thus obtained by "(Rud−TS_Recording_rate)×(192/188)".

The time "Tx" required to occupy the read buffer by "Boccupied" is obtained by the following equation:

$$Tx=Boccupied/(Rud-TS\_Recording\_rate \times (192/188)).$$

When reading from the BD-ROM, it is necessary to continue to input TS packets with the bit rate Rud for the time period "Tx". As a result, the minimum data length Sextent per extent when the AVClip is divided into a plurality of file extents to be recorded is obtained by the following equations:

$$\begin{aligned} S\text{ extent} &= Rud \times Tx = Rud \times B \text{ occupied}/(Rud-TS\_Recording\_rate \times (192/188)) \geq Rud \times (Tjump/1000 \times 8) \times \\ &\quad ((192/188) \times TS\_Recording\_rate)/(Rud-TS\_Recording\_rate \times (192/188)) \geq (Rud \times Tjump/1000 \times 8) \times \\ &\quad TS\_Recording\_rate \times 192/(Rud \times 188 - TS\_Recording\_rate \times 192). \end{aligned}$$

Hence, $$Sextent \geq (Tjump \times Rud/1000 \times 8) \times (TS\_Recording\_rate \times 192/(Rud \times 188 - TS\_Recording\_rate \times 192)).$$

If each file extent constituting the AVClip has the data length that is equal to or larger than Sextent that is calculated as a value that does not cause an underflow of the decoder, even if the file extents constituting the AVClip are located discretely on the BD-ROM, TS packets are continuously supplied to the decoder so that the data is read out continuously during reproduction.

Figure 5:
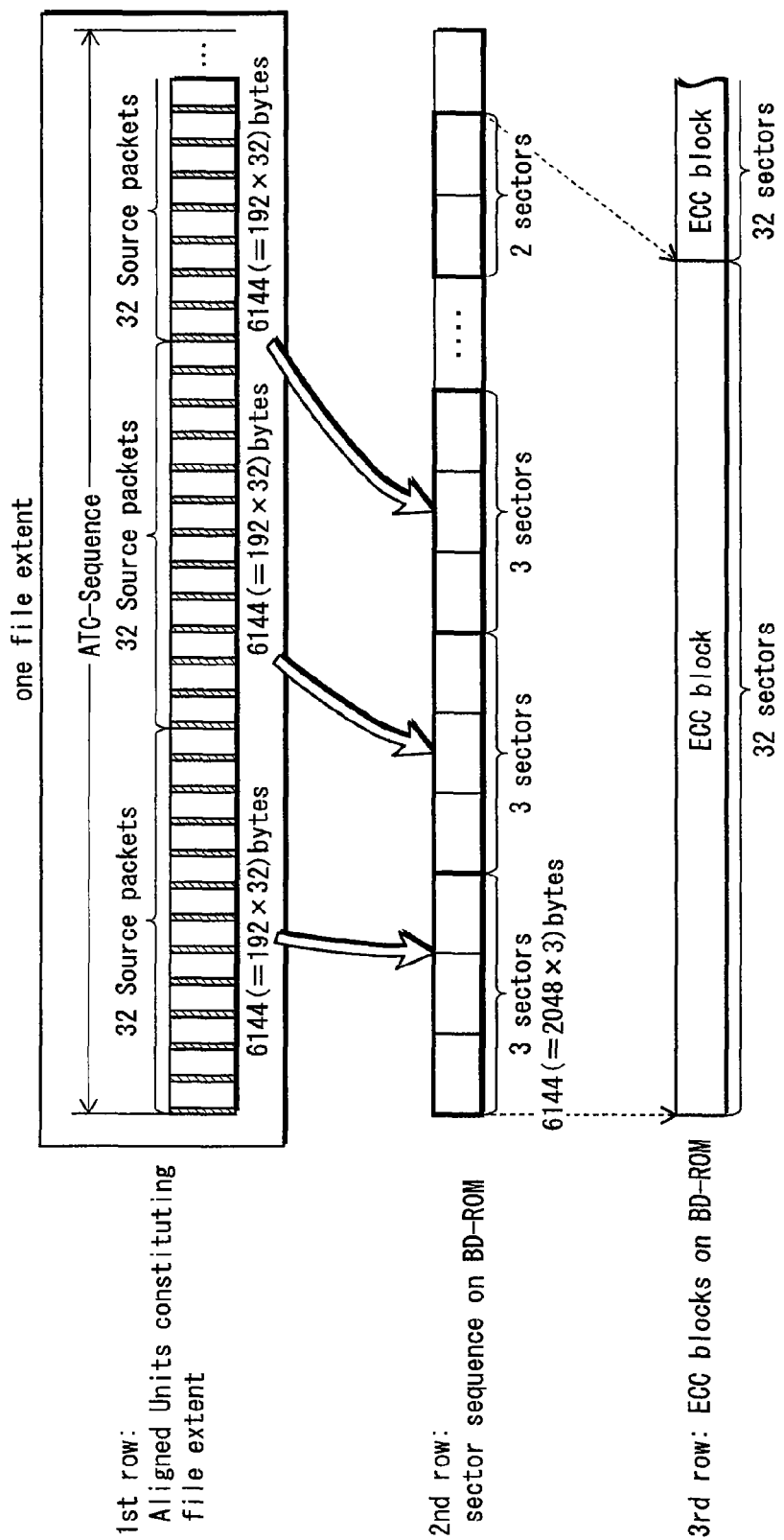
FIG. 5 shows relationships between the physical unit of the BD-ROM and the Source packets constituting one file extent.

FIG. 5 shows relationships between the physical unit of the BD-ROM and the Source packets constituting one file extent. As shown in the $2^{nd}$ row, a plurality of sectors are formed on the BD-ROM. The Source packets constituting the file extent are, as shown in the $1^{st}$ row, divided into groups each of which is composed of 32 Source packets. Each group of Source packets is then written into a set of three consecutive sectors. The group of 32 Source packets is 6144 bytes (=32×192), which is equivalent to the size of three sectors (=2048×3). The 32 Source packets stored in the three sectors is called an "Aligned Unit". Writing to the BD-ROM is performed in units of Aligned Units.

In the $3^{rd}$ row, an error correction code is attached to each block of 32 sectors. The block with the error correction code is referred to as an ECC block. In so far as it access the BD-ROM in units of Aligned Units, the reproduction apparatus can obtain 32 complete Source packets. Up to now, writing process of the AVClip to the BD-ROM has been described.

<Types of Elementary Streams>

Figure 6:
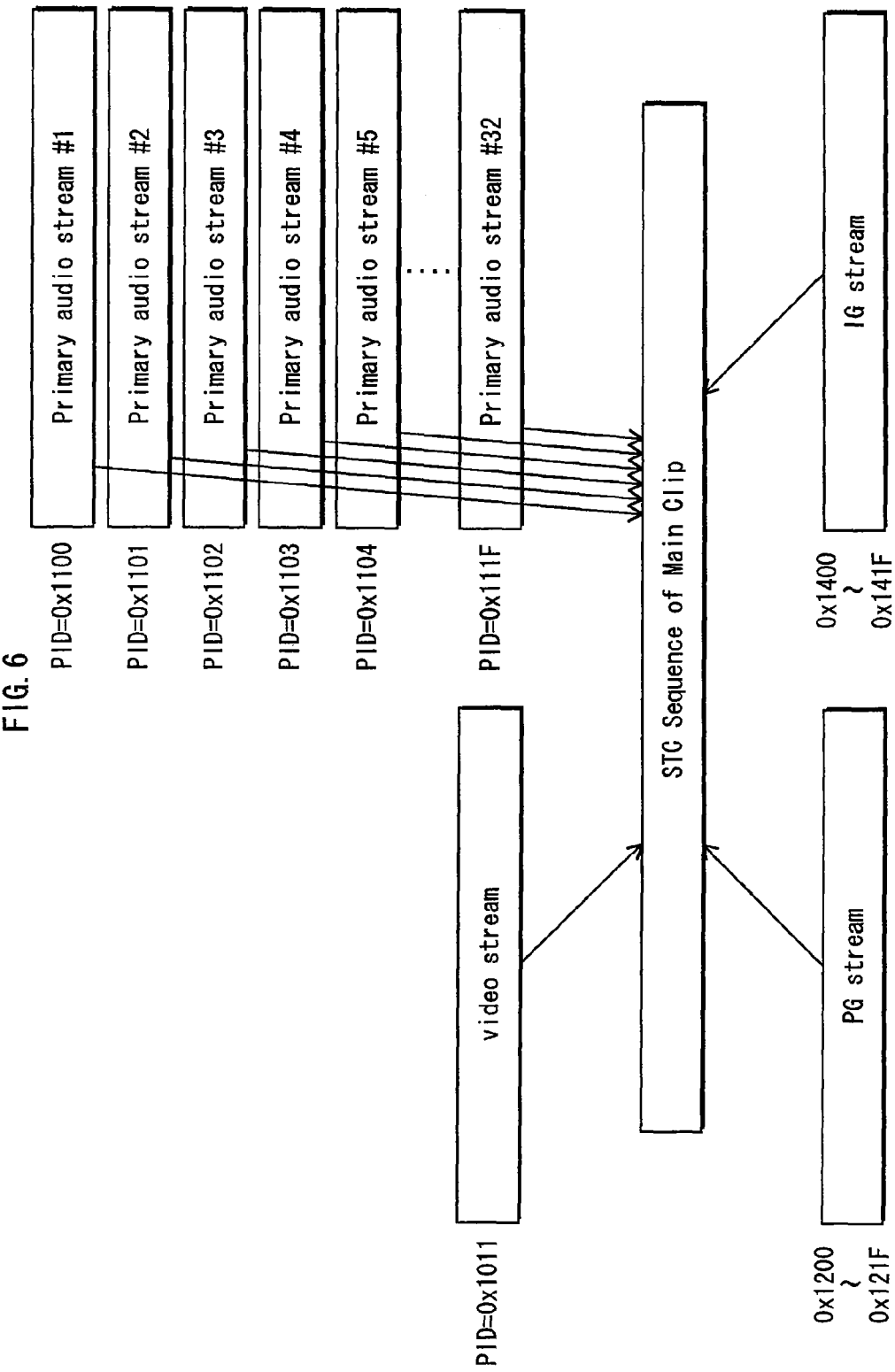
FIG. 6 shows the elementary streams that are multiplexed into the AVClip.

FIG. 6 shows the elementary streams that are multiplexed into the AVClip.

As shown in FIG. 6, multiplexed into the AVClip are: a high-image-quality video stream having PID of 0x1011; Primary audio streams having PIDs of 0x1100 to 0x111F; PG streams having PIDs of 0x1200 to 0x121F; and IG streams having PIDs of 0x1400 to 0x141F. The packets constituting the elementary streams are assigned with corresponding PIDs, and demultiplexed based on the PIDs. Hereinafter, an AVClip in which such a high-image-quality video stream is multiplexed is referred to as "MainClip", and an AVClip that is reproduced simultaneously with the MainClip is referred to as "SubClip".

<BD-ROM Structure 2: Clip Information>

Figure 7:
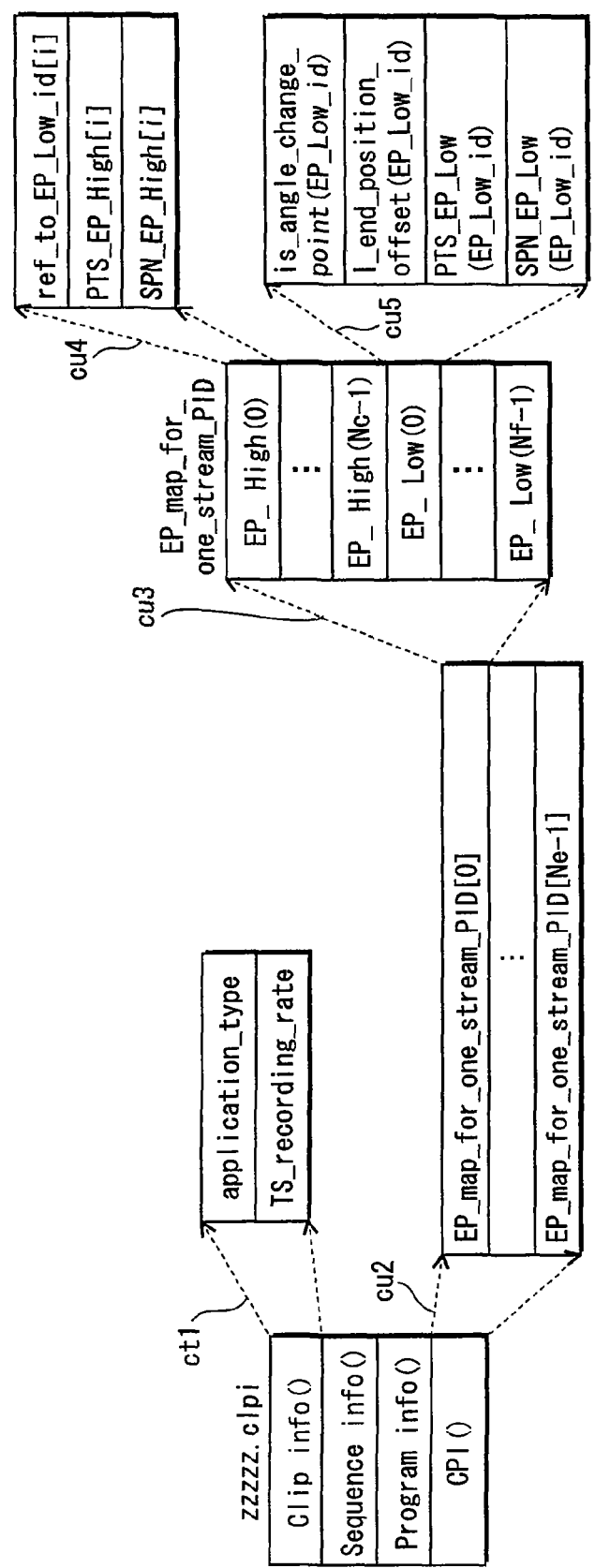
FIG. 7 shows the internal structure of Clip information.

Next, files to which an extension "clpi" is attached will be described. A file (00001.clpi) to which an extension "clpi" is attached stores Clip information. The Clip information is management information on each AVClip. FIG. 7 shows the internal structure of Clip information. As shown on the left-hand side of the drawing, the Clip information includes:

i) "ClipInfo( )" storing information regarding the AVClip;
ii) "Sequence Info( )" storing information regarding the ATC Sequence and the STC Sequence;
iii) "Program Info( )" storing information regarding the Program Sequence; and
iv) "Characteristic Point Info (CPI( ))".

The "ClipInfo" includes "application_type" indicating the application type of the AVClip referred to by the Clip information. The "TS_recording_rate", which indicates whether or not video is contained or whether or not still pictures (slide show) are contained, is system bit rate information of the AVClip.

The Sequence Info is information regarding one or more STC-Sequences and ATC-Sequences contained in the AVClip. The reason that these information are provided is to preliminarily notify the reproduction apparatus of the system time-base discontinuity and the arrival time-base discontinuity. That is to say, if such discontinuity is present, there is a possibility that a PTS and an ATS that have the same value appear in the AVClip. This might be a cause of a defective reproduction. The Sequence Info is provided to indicate from where to where in the transport stream the STCs or the ATCs are sequential.

The Program Info is information that indicates a section (called "Program Sequence") of the program where the contents are constant. Here, "Program" is a group of elementary streams that have in common a time axis for synchronized reproduction. The reason that the Program Info is provided is to preliminarily notify the reproduction apparatus of a point at which the Program contents changes. It should be noted here that the point at which the Program contents changes is, for example, a point at which the PID of the video stream changes, or a point at which the type of the video stream changes from SDTV to HDTV.

From now on, the Characteristic Point Info will be described. The lead line cu2 indicates the close-up of the structure of CPI. As indicated by the lead line cu2, the CPI is composed of the Ne number of EP_map_for_one_stream_PIDs: EP_map_for_one_stream_PID [0] . . . EP_map_for_one_stream_PID [Ne-1]). These EP_map_for_one_stream_PIDs are EP_maps of the elementary streams that belong to the AVClip. The EP_map is information that indicates, in association with an entry time (PTS_EP_start), a packet number (SPN_EP_start) at an entry position where the Access Unit is present in one elementary stream. The lead line cu3 in the drawing indicates the close-up of the internal structure of EP_map_one_stream_PID.

It is understood from this that the EP_map_for_one_stream_PID is composed of the Ne number of EP_Highs (EP_High(0) . . . EP_High(Nc-1)) and the Nf number of EP_Lows (EP_Low(0) . . . EP_Low(Nf-1)). Here, the EP_High plays a role of indicating upper bits of the SPN_EP_start and the PTS_EP_start of the Access Unit (Non-IDR I-Picture, IDR-Picture), the EP_Low plays a role of indicating lower bits of the SPN_EP_start and the PTS_EP_start of the Access Unit (Non-IDR I-Picture, IDR-Picture).

The lead line cu4 in the drawing indicates the close-up of the internal structure of EP_High. As indicated by the lead line cu4, the EP_High(i) is composed of: "ref_to_EP_Low_id [i]" that is a reference value to EP_Low; "PTS_EP_High[i]" that indicates upper bits of the PTS of the Access Unit (Non-IDR I-Picture, IDR-Picture); and "SPN_EP_High[i]" that indicates upper bits of the SPN of the Access Unit (Non-IDR I-Picture, IDR-Picture). Here, "i" is an identifier of a given EP_High.

The lead line cu5 in the drawing indicates the close-up of the structure of EP_Low. As indicated by the lead line cu5, the EP_Low(i) is composed of: "is_angle_change_point(EP_Low_id)" that indicates whether or not the corresponding Access Unit is an IDR picture; "I_end_position_offset (EP_Low_id)" that indicates the size of the corresponding Access Unit; "PTS_EP_Low(EP_Low_id)" that indicates lower bits of the PTS of the Access Unit (Non-IDR I-Picture, IDR-Picture); and "SPN_EP_Low(EP_Low_id)" that indicates lower bits of the SPN of the Access Unit (Non-IDR I-Picture, IDR-Picture). Here, "EP_Low_id" is an identifier for identifying a given EP_Low.

<Clip Information Explanation 2: EP_Map>

Figure 8:
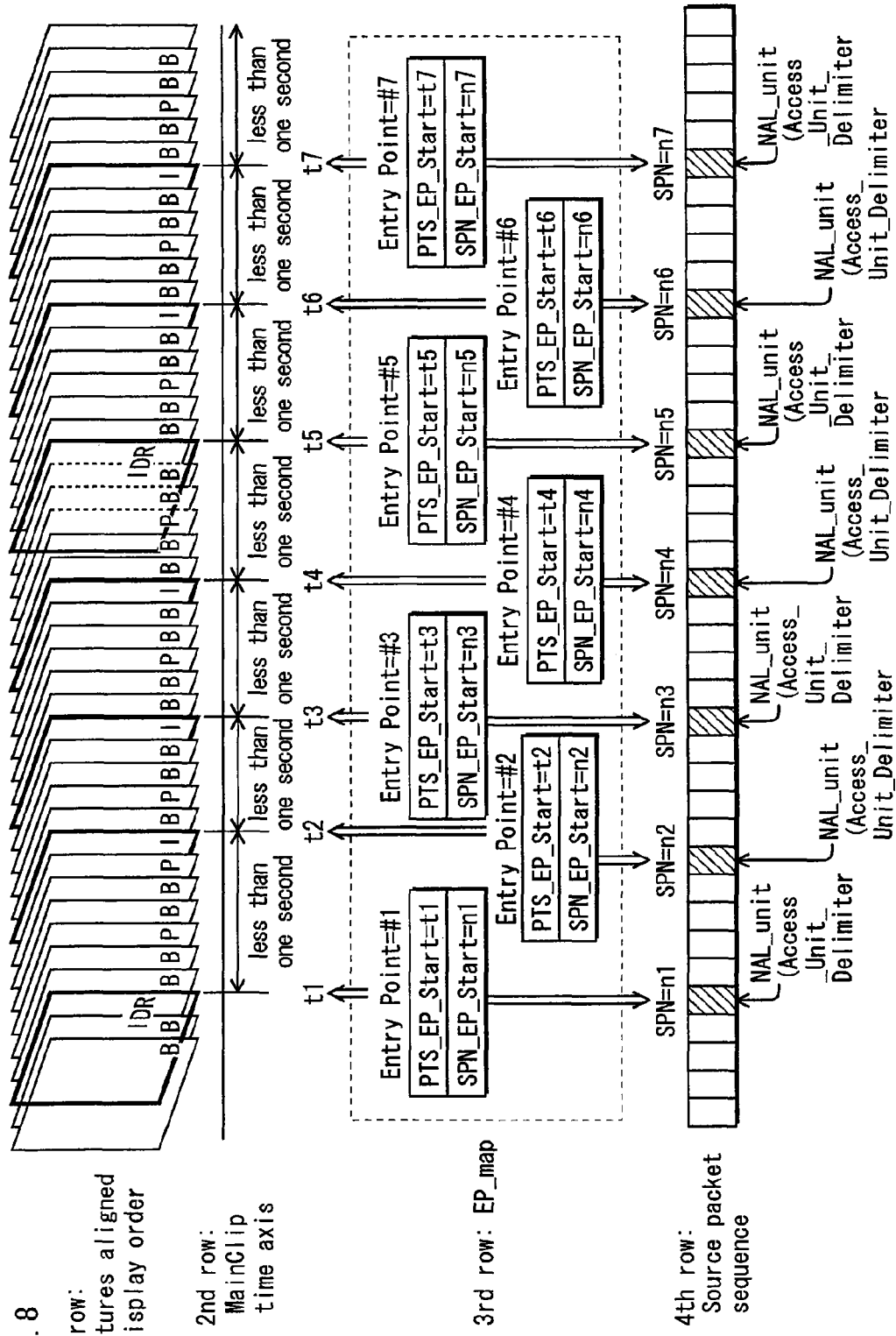
FIG. 8 shows EP_map settings on a video stream of a motion picture.

Here, the EP_map will be explained in a specific example. FIG. 8 shows EP_map settings on a video stream of a motion picture. The $1^{st}$ row shows a plurality of pictures (IDR picture, I-Picture, B-Picture, and P-Picture defined in MPEG4-AVC). The $2^{nd}$ row shows the time axis for the pictures. The $4^{th}$ row indicates a packet sequence, and the $3^{rd}$ row indicates settings of the EP_map.

It is presumed here that in the time axis of the 2nd row, an IDR picture or an I-Picture is present at each time point t1 ... t7. The interval between adjacent ones of the time point t1 ... t7 is approximately one second. The EP_map used for the motion picture is set to indicate t1 to t7 as the entry times (PTS_EP_start), and indicate entry positions (SPN_EP_start) in association with the entry times.

<PlayList Information>

Next, the PlayList information will be described. A file (00001.mpls) to which extension "mpls" is attached is a file storing the PlayList (PL) information.

Figure 9:
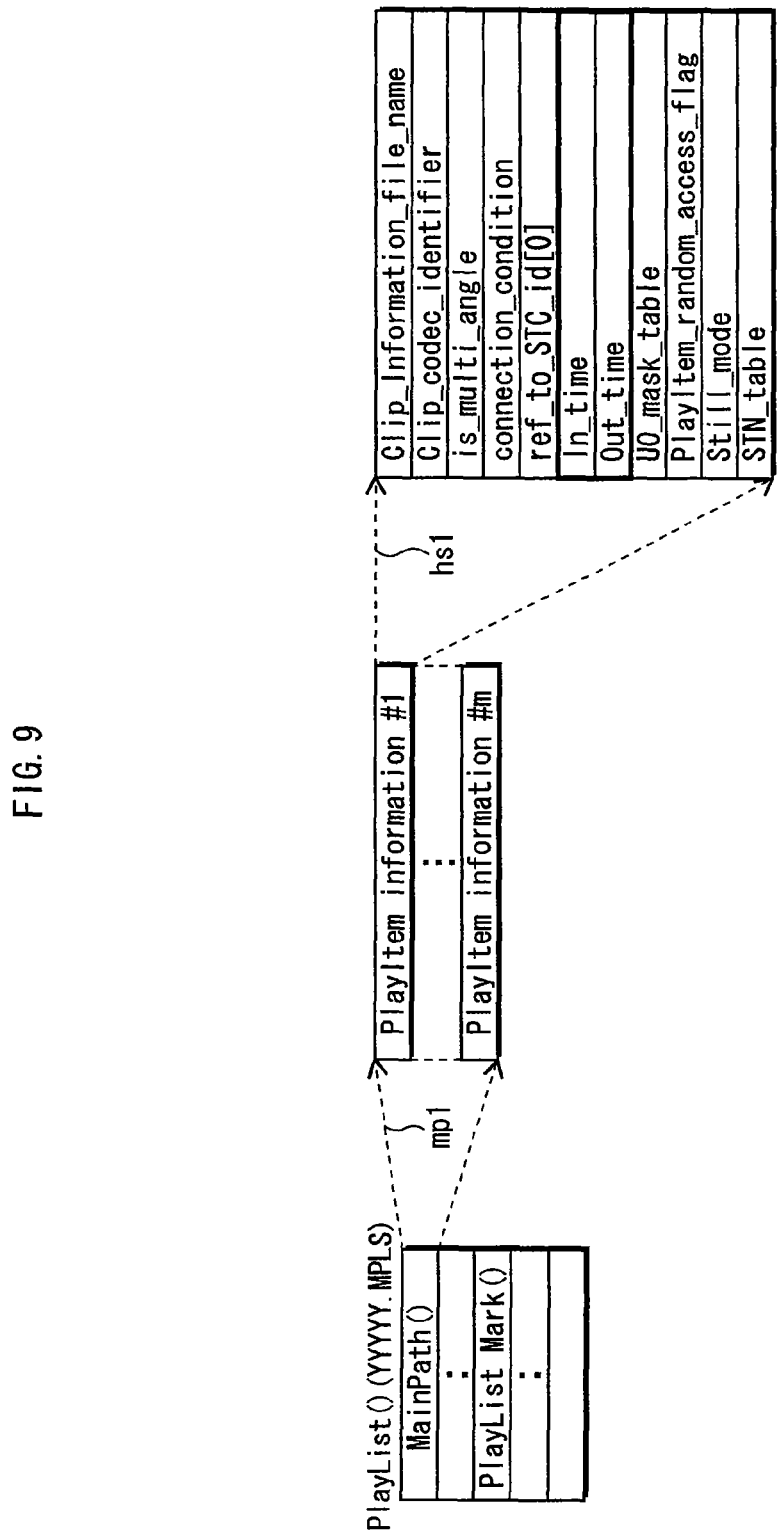
FIG. 9 shows the data structure of the PlayList information.

FIG. 9 shows the data structure of the PlayList information. As indicated by the lead line mp1 in FIG. 9, the PlayList information includes: MainPath information (MainPath( )) that defines MainPath; and PlayListMark information (PlayListMark( )) that defines chapter.

<PlayList Information Explanation 1: MainPath Information>

First, the MainPath will be described. The MainPath is a presentation path that is defined in terms of the video stream as the main image and the audio stream.

As indicated by the arrow mp1 m the MainPath is defined by a plurality of pieces of PlayItem information: PlayItem information #1 ... PlayItem information #m. The PlayItem information defines one or more logical reproduction sections that constitute the MainPath. The lead line hs 1 in the drawing indicates the close-up of the structure of the PlayItem information. As indicated by the lead line hs1, the PlayItem information is composed of: "Clip_Information_file_name" that indicates the file name of the reproduction section information of the AVClip to which the IN point and the OUT point of the reproduction section belong; "Clip_codec_identifier" that indicates the AVClip encoding method; "is_multi_angle" that indicates whether or not the PlayItem is multi angle; "connection_condition" that indicates whether or not to seamlessly connect the current PlayItem and the preceding PlayItem; "ref_to_STC_id[0]" that indicates uniquely the STC_Sequence targeted by the PlayItem; "In_time" that is time information indicating the start point of the reproduction section; "Out_time" that is time information indicating the end point of the reproduction section; "UO_mask_table" that indicates which user operation should be masked by the PlayItem; "PlayItem_random_access_flag" that indicates whether or not to permit a random access to a mid-point in the PlayItem; "Still_mode" that indicates whether or not to continue a still display of the last picture after the reproduction of the PlayItem ends; and "STN_table". Among these, the time information "In_time" indicating the start point of the reproduction section and the time information "Out_time" indicating the end point of the reproduction section constitute a presentation path. The presentation path information is composed of "In_time" and "Out_time".

Figure 10:
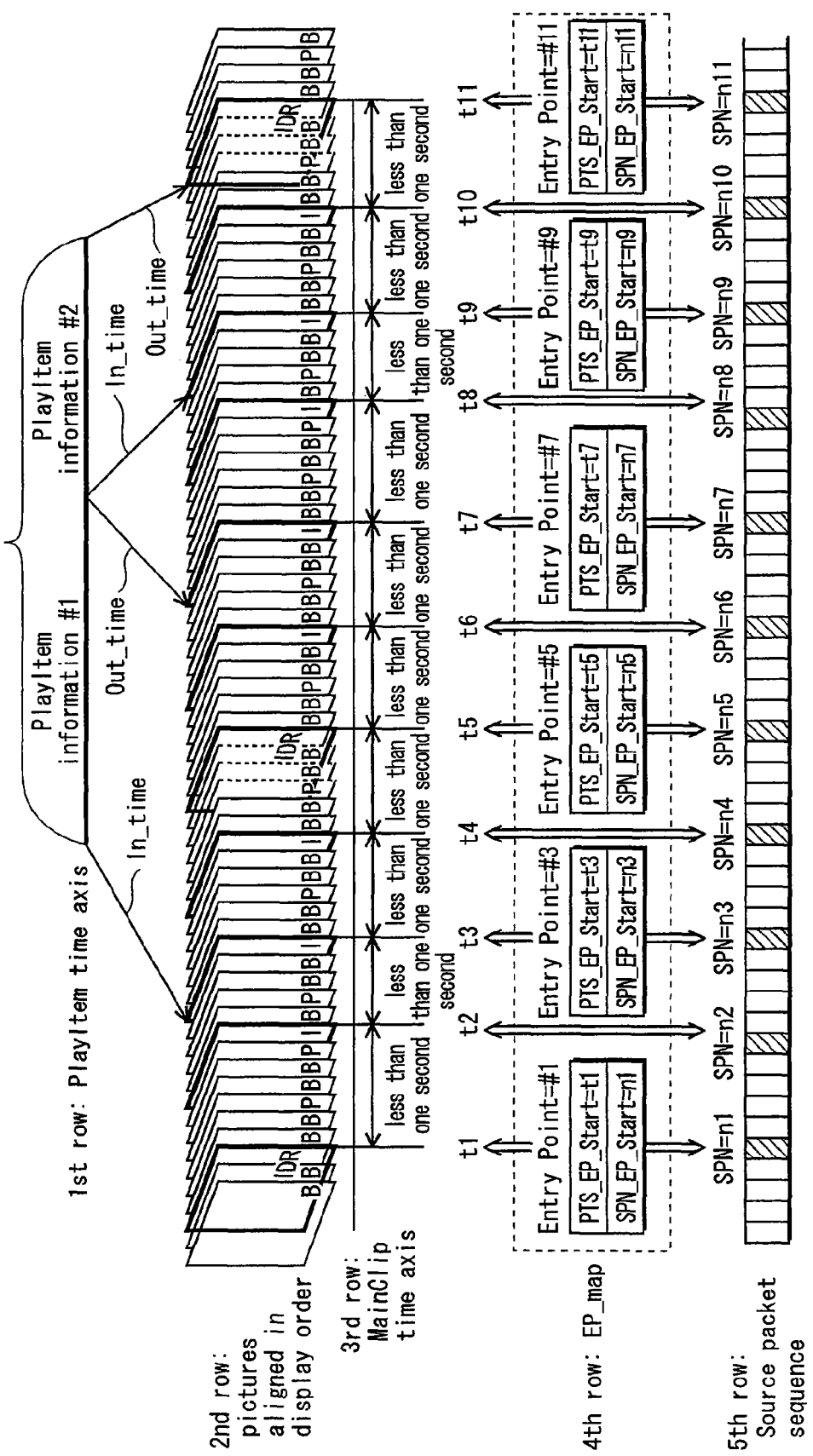
FIG. 10 shows the relationships between the AVClip and the PlayList information.

FIG. 10 shows the relationships between the AVClip and the PlayList information. The 1st row shows the time axis held by the PlayList information. The 2nd to 5th rows show the video stream that is referenced by the EP_map.

The PlayList information includes two pieces of PlayItem information: PlayItem information #1; and PlayItem information #2. Two reproduction sections are defined by "In_time" and "Out_time" included in the PlayItem information #1 and PlayItem information #2. When these reproduction sections are arranged, a time axis that is different from the AVClip time axis is defined. This is the PlayList time axis shown in the 1st row. As understood from this, it is possible, by defining the PlayItem information, to define a presentation path that is different from the AVClip.

The above-described Clip information and PlayList information are classified into "static scenario". This is because the Clip information and the PlayList information define a PlayList that is a static reproduction unit. This completes the description of the static scenario.

From now on, the "dynamic scenario" will be explained. The dynamic scenario is scenario data that dynamically defines the reproduction control of the AVClip. Here, "dynamically" indicates that the contents of the reproduction control change due to state change in the reproduction apparatus or due to a key event from the user. The BD-ROM presumes two modes as operation environments for the reproduction control. The first operation environment resembles that of the DVD reproduction apparatus, and is a command-based execution environment. The other is an operation environment of the Java™ virtual machine. The first operation environment is called the HDMV mode. The second operation environment is called the BD-J mode. Since these two operation environments are available, the dynamic scenario is written to conform to one of these operation environments. A dynamic scenario written to conform to the HDMV mode is called "Movie Object", and a dynamic scenario written to conform to the BD-J mode is called "BD-J Object".

First, the Movie Object will be described.

<Movie Object>

The Movie Object is stored in a file "MovieObject.bdmv" shown in FIG. 2 and includes a navigation command sequence.

The navigation command sequence is a sequence of navigation commands that achieve a conditional branch, setting the status register in the reproduction apparatus, acquiring a value set in the status register, and so on. The following navigation commands can be written in the Movie Object.

PlayPL Command

Format: PlayPL(1st Argument, 2nd Argument)

As the 1st argument, a PlayList number is written to specify a PlayList to be reproduced. As the 2nd argument, a PlayItem included in the PlayList, given time in the PlayList, Chapter, or Mark to specify a reproduction start position.

A PlayPL function using the PlayItem to specify a reproduction start position in the PL time axis is referred to as "PlayPLatPlayItem( )".

A PlayPL function using the Chapter to specify a reproduction start position in the PL time axis is referred to as "PlayPLatChapter( )".

A PlayPL function using the time information to specify a reproduction start position in the PL time axis is referred to as "PlayPLatSpecifiedTime( )".

The writing format of the navigation command in the Movie Object resembles the writing format of the navigation command in DVD. This makes it possible to efficiently transfer the disc contents from DVD to BD-ROM. The below-identified international publication, as a prior art, discloses the Movie Object. Please refer to the international publication for detail of the Movie Object.

International Publication: WO 2004/074976

Up to now, the Movie Object has been described. The following describes BD-J Object.

<BD-J Object>

BD-J Object is a dynamic scenario of the BC-J mode that is written in the Java™ programming environment, and is stored in a file "00001.bobj". The BD-J Object differs from the Movie Object in that it does not contain a command directly written therein. That is to say, in the Movie Object, the control procedure is directly written in the navigation command. In contrast, in the BD-J Object, the control procedure is indirectly defined, with specifications for Java™ applications being written in the application management table. Such an indirect definition enables the sharing of the control procedure, in which a control procedure is shared by a plurality of dynamic scenarios, to be performed efficiently.

The reproduction of PlayList using Movie Object is achieved by writing a navigation command (PlayPL command) that instructs to reproduce a PlayList. The reproduction of PlayList using BD-J Object is achieved by incorporating the PlayList management table, which indicates PlayList reproduction procedures, into the BD-J Object.

Here, the Java™ applications in the BD-J mode will be described. It is presumed here that fully mounted in the Java™ platform in the BD-J mode are Java2Micro_Edition (J2ME) Personal Basis Profile (PBP 1.0), and Globally Executable MHP specification (GEM1.0.2) for package media targets.

The Java™ applications in the BD-J mode are controlled by the Application Manager via the xlet interface. The xlet interface has four states: "loaded", "paused", "active", and "destroyed"

The above-described Java™ platform includes a standard Java™ library for displaying image data conforming to JFIF (JPEG), PNG, or the like. With this construction, the Java™ applications can achieve a GUI framework that is different from the GUI achieved by the IG stream in the HDMV mode. The GUI framework in the Java™ applications includes the HAVi framework defined in GEM1.0.2 and the remote control navigation mechanism in GEM1.0.2.

With such a construction, the Java™ applications can achieve a screen display in which a moving image is displayed on the screen together with buttons, texts, and online display (contents of BBS), and it is possible to perform operations on the displayed screen. The substance of the Java™ applications is the Java™ archive file (00001.jar) stored in the BDJA directory under the BDMV directory shown in FIG. 2.

The below-identified international publications, as prior arts, discloses the BD-J Object. Please refer to the international publications for detail of the BD-J Object.
International Publications: WO 2004/045840 A1
  WO 2005/0365552 A1
  WO 2005/036546 A1

Up to now, the BD-J Object has been described.
<sound.bdmv>

The sound.bdmv will be described. The sound.bdmv is a file for storing audio data that is output as a click sound when a menu drawn in the IG stream or the GUI framework of a Java™ application is operated (such audio data is referred to as sound data).

Figure 11:
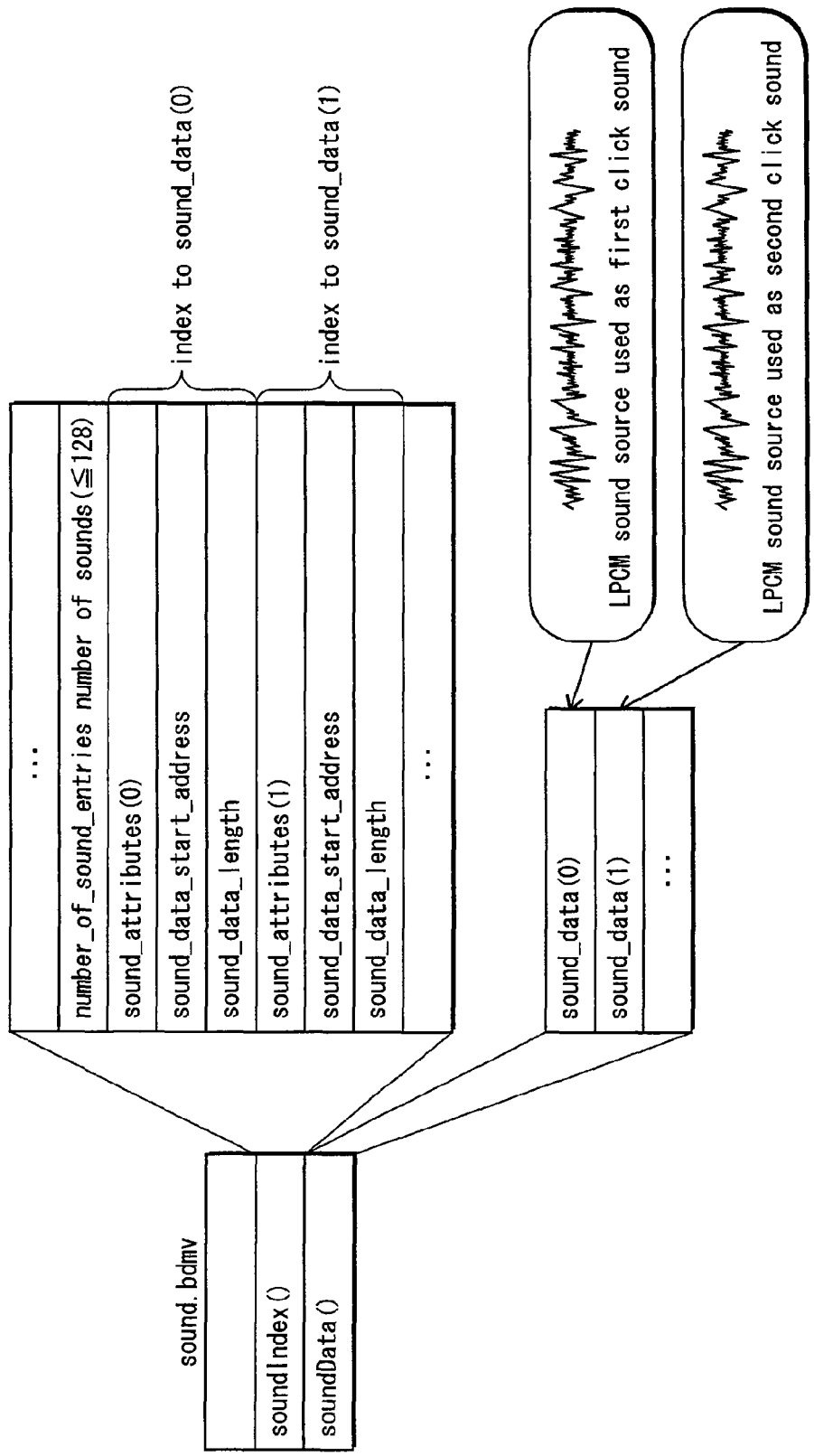
FIG. 11 shows the structure of the file sound.bdmv.

FIG. 11 shows the structure of the file sound.bdmv. The file sound.bdmv includes Sound Data( ) and Sound Index( ). The Sound Data( ) includes a plurality of pieces of sound data (sound_data(0), sound_data(1) . . . ). Among these pieces of sound data, sound_data(0) is a sound source of the $1^{st}$ click sound that is output when the menu is operated, and sound_data(1) is a sound source of the $2^{nd}$ click sound that is output when the menu is operated. These sound data are identified by identifiers called sound_IDs.

The Sound Index( ) includes: the number of sounds (number_of_sound_entries), an index to sound_data(0), an index to sound_data(1) . . . .

Each index includes: sound_attributes that indicates an attribute of the sound such as monaural or stereo; sound_data_start_address that indicates the address of a corresponding piece of sound data; and sound_data_length that indicates the sequential length of the corresponding piece of sound data.

As shown in FIGS. 2-6, the sources of the sounds used in the motion picture are multiplexed in the AVClip as the Primary audio stream. This arrangement is made for the purpose of supplying the Primary audio stream, which provides sound/voice in the motion picture, at the same time when the video stream is read out. On the other hand, the file sound.bdmv, in which the click sound for a menu operation by the user is stored, is recorded on the BD-ROM separately from the AVClip. Since the file sound.bdmv is recorded separately from the AVClip, when sound data is tried to be output during a reading out of the AVClip, the optical pickup jumps to read the file sound.bdmv. When this happens, the reading out of the AVClip is interrupted and the reproduction of the AVClip is interrupted.

To prevent such interruption of the AVClip reproduction, it is necessary to preload the file sound.bdmv in the buffer when the AVClip is not reproduced. That is to say, it is necessary to preload sound data of the file sound.bdmv prior to the AVClip reproduction. This completes the description of the file sound.bdmv.
<Index.bdmv>

The Index.bdmv is a table that indicates the Movie Object or the BD-J Object that constitutes a title.

The Index.bdmv defines the Movie Object or the BD-J Object that is a component of a Title.

The below-identified international publication discloses the Index.bdmv. Please refer to the international publication for detail of the Index.bdmv.
International Publication: WO 2004/025651 A1

Up to now, the BD-ROM 100 has been described.
<Local Storage 200>

Figure 12:
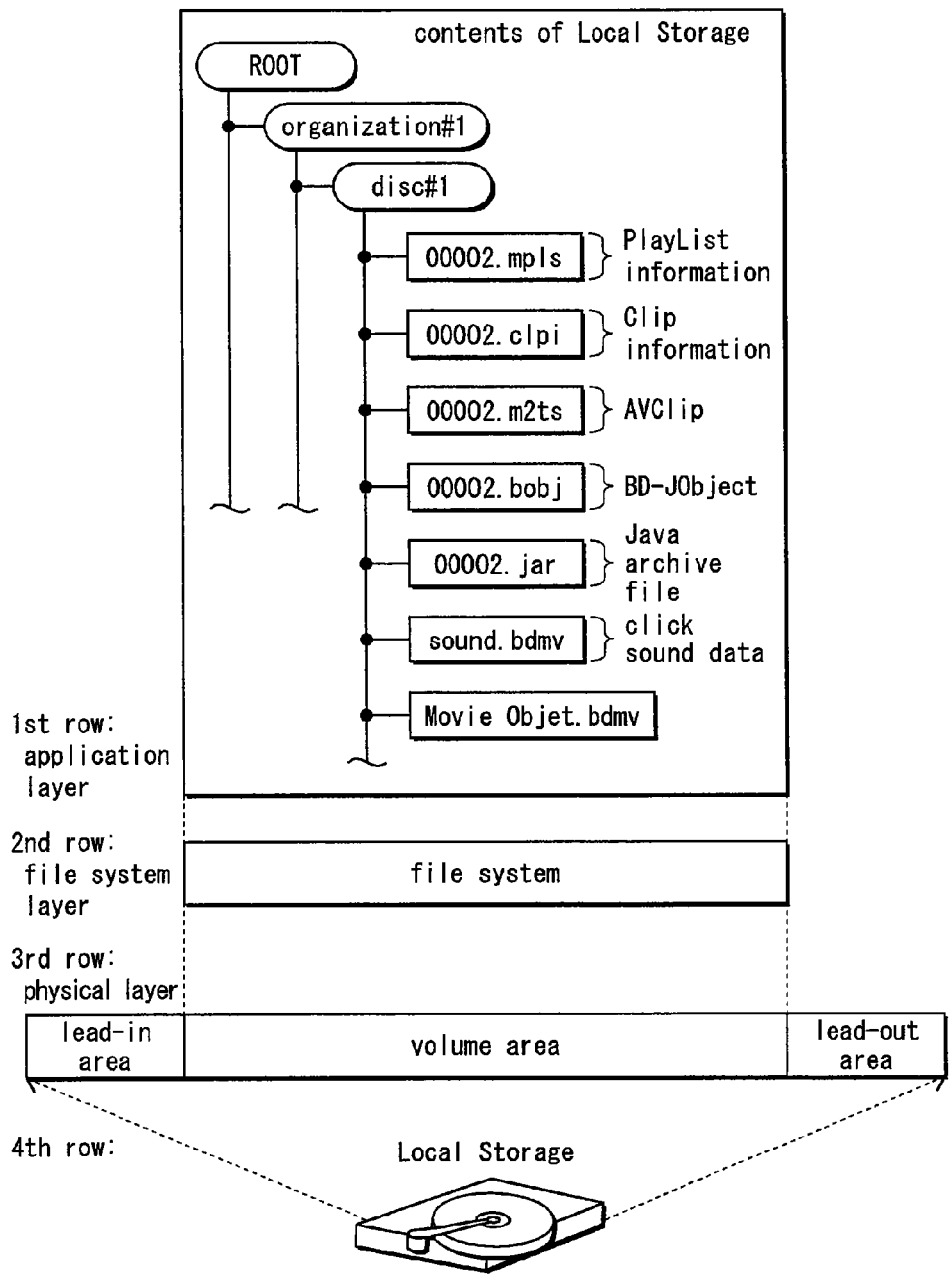
FIG. 12 shows an internal structure of the local storage 200.

The following describes the local storage 200 that is a recording medium of the present invention. FIG. 12 shows an internal structure of the local storage 200. As shown in FIG. 12, the recording medium of the present invention can be produced by improving the application layer.

The fourth row of FIG. 12 shows the local storage 200. The third row shows tracks on the local storage 200. FIG. 12 shows the tracks in the state where they are horizontally extended though they are in reality formed spirally in order from the inner circumference to the outer circumference of the local storage 200. The tracks include a lead-in area, a volume area, and a lead-out area. The volume area of FIG. 12 has a layer model that includes a physical layer, a file system layer, and an application layer. The $1^{st}$ row of FIG. 12 shows an application layer format (application format) of the local storage 200 represented by a directory structure.

In the directory structure shown in FIG. 12, there is a subdirectory "organization#1" under a root directory. Also, there is a subdirectory "disc#1" under the directory "organization#1". The directory "organization#1" is assigned to a specific provider of a motion picture. The directory "disc#1" is assigned to each BD-ROM provided from the provider.

With this construction in which the directory assigned to a specific provider includes directories that corresponds to BD-ROMs, download data for each BD-ROM is stored separately. Similarly to the information stored in the BD-ROM, under the subdirectory "disc#1", the following information is stored: PlayList information ("00002.mpls"); Clip information ("00002.clpi"); AVClip ("00001.m2ts"); BD-J Object ("00002.bobj"); Java™ archive file ("00002.jar"); click sound data ("sound.bdmv"); and Movie Object ("MovieObject.bdmv").

The following describes the PlayList information, Clip information, and AVClip that are the components of the local storage 200.

<Local Storage 200 Structure 1: AVClip>

The AVClip ("00002.m2ts") in the local storage 200 constitutes a SubClip. The SubClip is an AVClip that includes an elementary stream that is decoded and reproduced simultaneously with the MainClip. The SubClip is classified into "Primary audio stream", "Secondary audio stream", "Presentation Graphics (PG) stream", and "Interactive Graphics (IG) stream" (hereinafter, a SubClip may also be referred to as an Out-of-MUX stream).

In the present embodiment, it is presumed that "00002.m2ts" shown in FIG. 12 is a SubClip in which the Secondary audio stream, PG stream, and IG stream are multiplexed. The Secondary audio stream will be described in detail from now on.

<Out-of-MUX Stream Explanation 1: Secondary Audio Stream>

While the Primary audio stream is an audio stream that includes what is called main sound/voice, the Secondary audio stream is an audio stream that includes what is called sub-sound/voice. When the SubClip is reproduced, the sound/voice for reproduction is output after the sound/voice of the Primary audio stream is mixed with the sound/voice of the Secondary audio stream. The sound/voice to be included in the Secondary audio stream includes, for example, "commentary sound/voice". When the main sound/voice included in the Primary audio stream is the sound/voice of the motion picture, and the sub-sound/voice included in the Secondary audio stream is the commentary sound/voice of the director, the sound/voice of the motion picture is output after it is mixed with the commentary sound/voice.

The Secondary audio stream is recorded on only the local storage 200 for reproduction, but is not recorded on the BD-ROM. The Primary audio stream may be recorded on the BD-ROM and/or the local storage 200. The encoding codec for the Primary audio stream may be different from the encoding codec for the Secondary audio stream.

Figure 13:
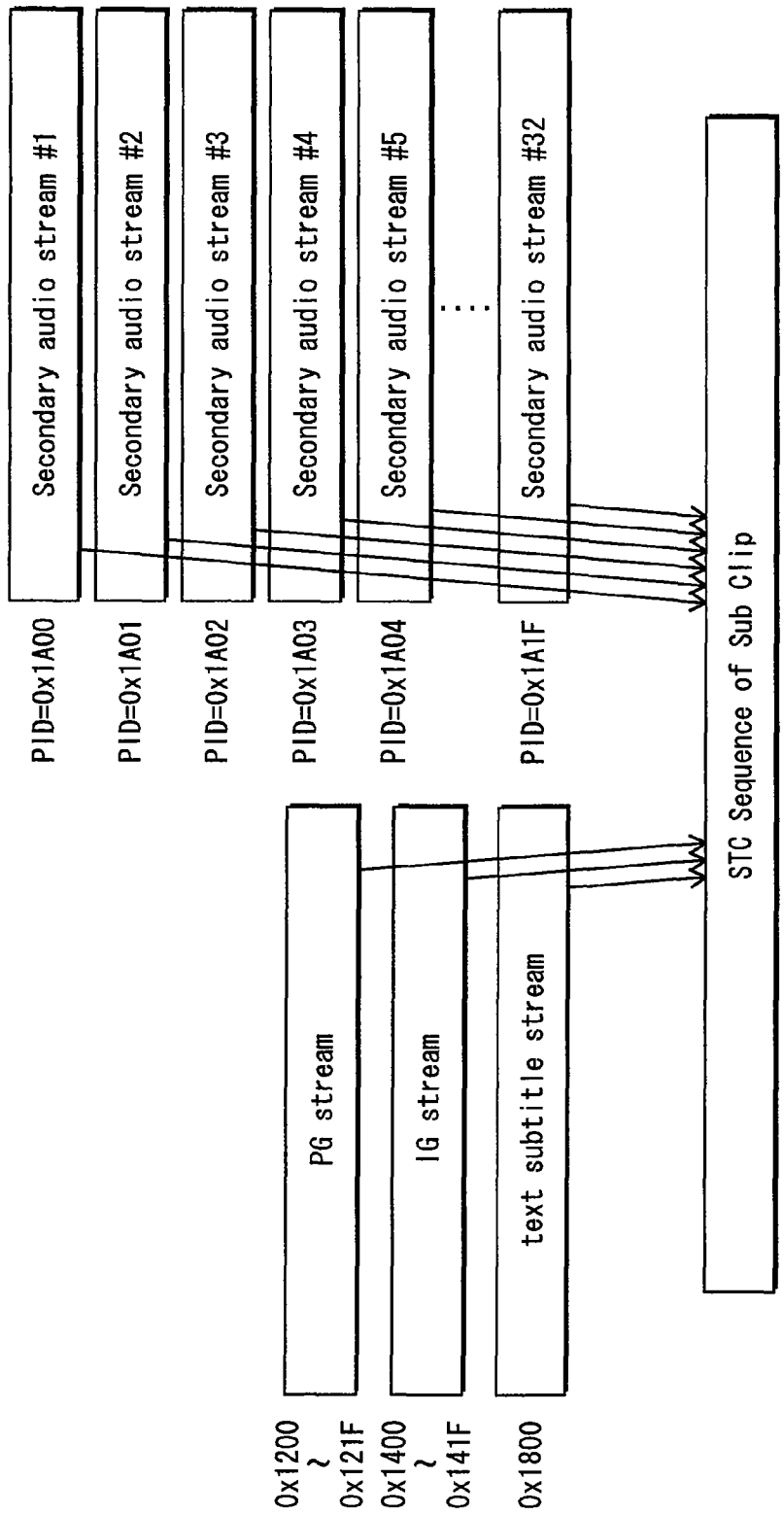
FIG. 13 shows elementary streams that are multiplexed into the SubClip.

FIG. 13 shows elementary streams that are multiplexed into the SubClip. In FIG. 13, PG streams having PIDs "0x1200" to "0x121F", IG streams having PIDs "0x1400" to "0x141F", and Secondary audio streams having PIDs "0x1A00" to "0x1A1F" are multiplexed. Here, the PIDs of the PG streams and the IG streams in the SubClip are the same as the PIDs of the PG streams and the IG streams in the MainClip, but any of the PIDs of the 32 Secondary audio streams is not the same as any of the PIDs of the 32 Primary audio streams since they differ in the upper byte.

FIG. 14 shows PID assignment map in the BD-ROM standard. According to FIG. 14, "0x0100" is assigned to "program_map", "0x1001" is assigned to "PCR", "0x1011" is assigned to the video stream, the zone from "0x1100" to "0x111F" is assigned to the Primary audio streams, the zone from "0x1200" to "0x121F" is assigned to the PG streams, the zone from "0x1400" to "0x141F" is assigned to the IG streams, and the zone from "0x1A00" to "0x1A1F" is assigned to the Secondary audio streams. As understood from the PID assignment map, the zone assigned to the Primary audio streams is different from the zone assigned to the Secondary audio streams.

FIG. 15A shows the internal structure of the Secondary audio stream.

As shown in FIG. 15A, the Secondary audio stream is composed of a plurality of audio frames. FIG. 15B shows an example of the audio frame. The audio frame of the Secondary audio stream includes metadata.

FIG. 15C shows an internal structure of the metadata. As shown in FIG. 15C, the metadata is composed of "downmixing information" and "gain control information".

The downmixing information is information for downmixing. The downmixing is a conversion in which the number of audio reproduction channels is adjusted to be smaller than the number of encoding channels. The downmixing information defines a conversion coefficient matrix for the downmixing so that the reproduction apparatus can perform the downmixing. For example, the downmixing enables an audio stream in 5.1 channels to be reproduced in 2 channels.

The gain control information is used to increase or decrease the gain of the audio output of the Primary audio stream. In the present embodiment, the gain control information is only used to decrease the gain. FIG. 15D shows an example of the gain control information. As understood from this, the metadata of the Secondary audio stream can decrease in real time the output of the Primary audio stream that is reproduced simultaneously with the Secondary audio stream. When combining (mixing) the Primary and Secondary audio streams, it is not necessary to control in real time the gains of the two audio streams. Since the Primary and Secondary audio streams in a pair are preliminarily known, it is only necessary in mixing (combining) them to decrease the gain of the Primary audio stream, without changing the gain of the Secondary audio stream.

It is possible to store only valid gain control information for a duration starting from the time specified by "mark_time_stamp" of PlayListMark.

Figure 16:
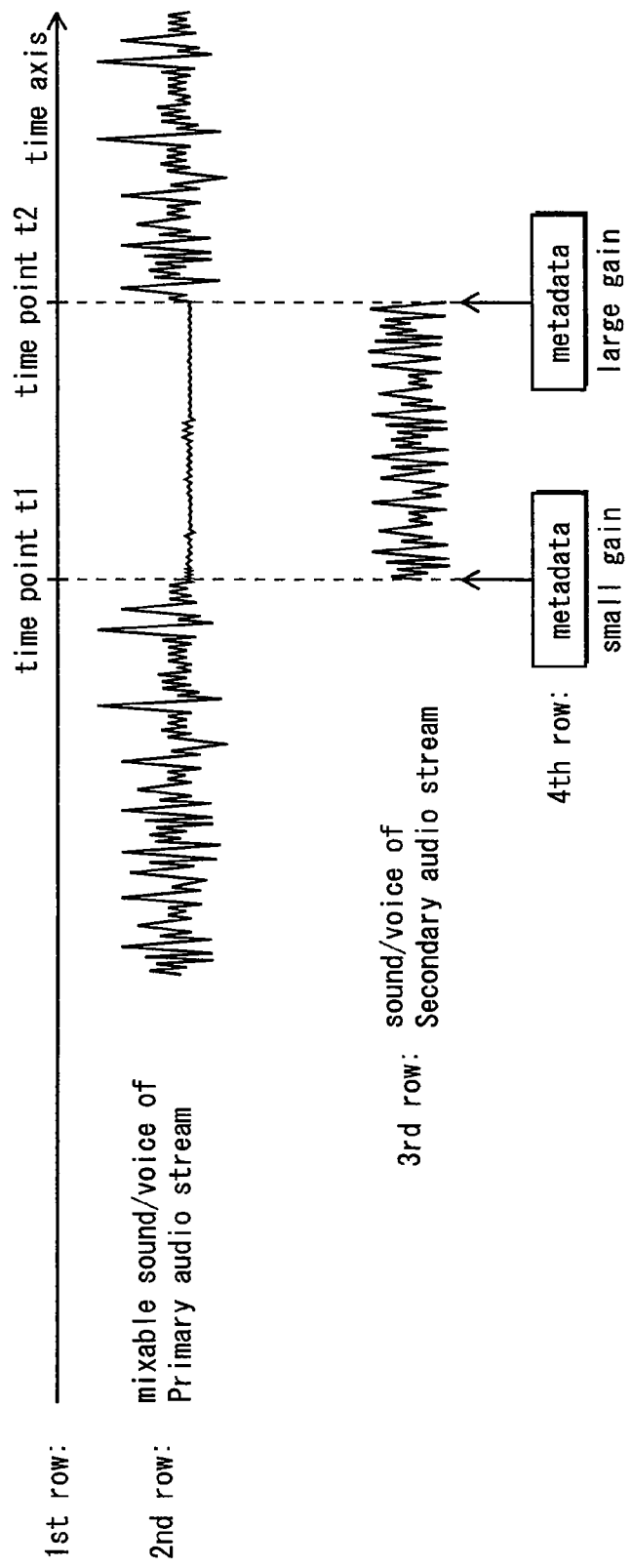
FIG. 16 shows how the sound volume of the Primary audio stream is controlled by the metadata in the Secondary audio stream.

FIG. 16 shows how the sound volume of the Primary audio stream is controlled by the metadata in the Secondary audio stream. In FIG. 16, the $1^{st}$ row shows the time axis, the $2^{nd}$ row shows the reproduction output of the Primary audio stream that can be mixed, the $3^{rd}$ row shows the reproduction output of the Secondary audio stream, and the $4^{th}$ row shows metadata multiplexed in the Secondary audio stream.

The metadata disposed in an audio frame that corresponds to reproduction time t1 suppresses the sound volume of the reproduction output of the Primary audio stream as a whole. The metadata disposed in an audio frame that corresponds to reproduction time t2 restores the sound volume of the reproduction output of the Primary audio stream. With this arrangement in which metadata is disposed at reproduction times t1 and t2, it is possible to avoid a situation in which the sound volume of the reproduction output of the Primary audio stream is combined with that of the Secondary audio stream to cause the speaker to be broken.

When the gain adjustment for mixing is performed in real time using the gain control information of the Secondary audio stream, it is only necessary for the gain control information stored in each audio frame of the Secondary audio stream to specify that the gain of the Primary audio stream is decreased by a predetermined amount. This method, which always secures an appropriate gain control, is more convenient than, for example, a case where the mixing reproduction is performed by jumping into the period between the reproduction times t1 and t2 using a special reproduction.

<Local Storage 200 Structure 2: PlayList Information>

Figure 17:
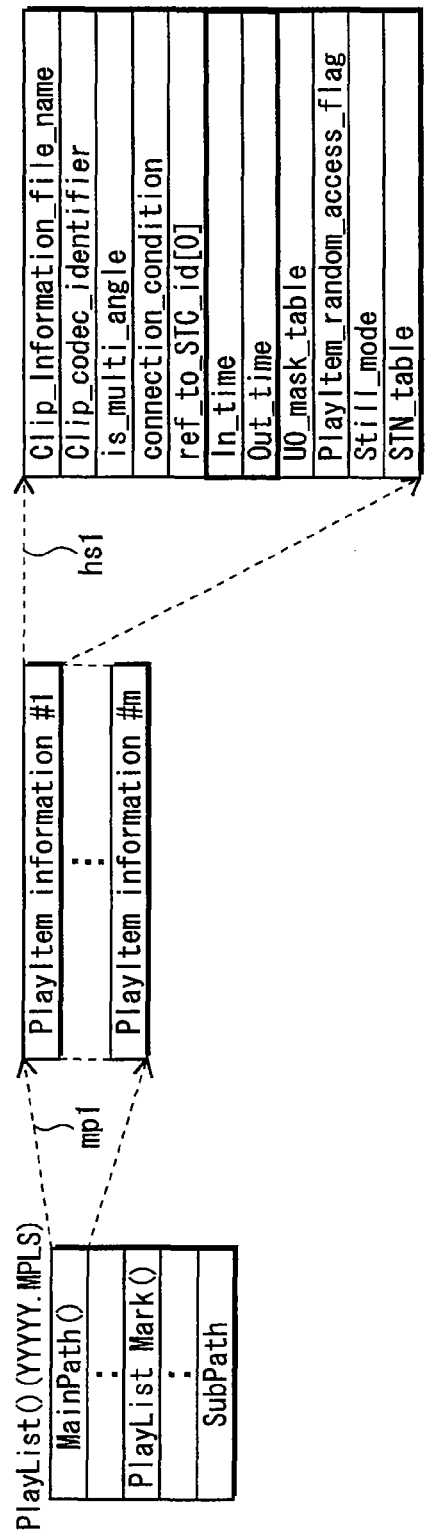
FIG. 17 shows the data structure of the PlayList information.

Next, the PlayList information in the local storage 200 will be described. A file (00002.mpls) to which extension "mpls" is attached is information that defines PlayList (PL) by combining two types of presentation paths called MainPath and Subpath. FIG. 17 shows the data structure of the PlayList information. As shown in FIG. 17, the PlayList information includes: MainPath information (MainPath( )) that defines MainPath; PlayListMark information (PlayListMark( )) that defines chapter; and Subpath information (Subpath( )) that defines Subpath. The internal structures of the PlayList information and the PlayItem information are the same as those of the BD-ROM, and the description thereof is omitted here.

<PlayList Information Explanation 1: Subpath Information>

While the MainPath is a presentation path that is defined in terms of the MainClip that is the main image, Subpath is a presentation path that is defined in terms of the SubClip that is synchronized with the MainPath.

Figure 18:
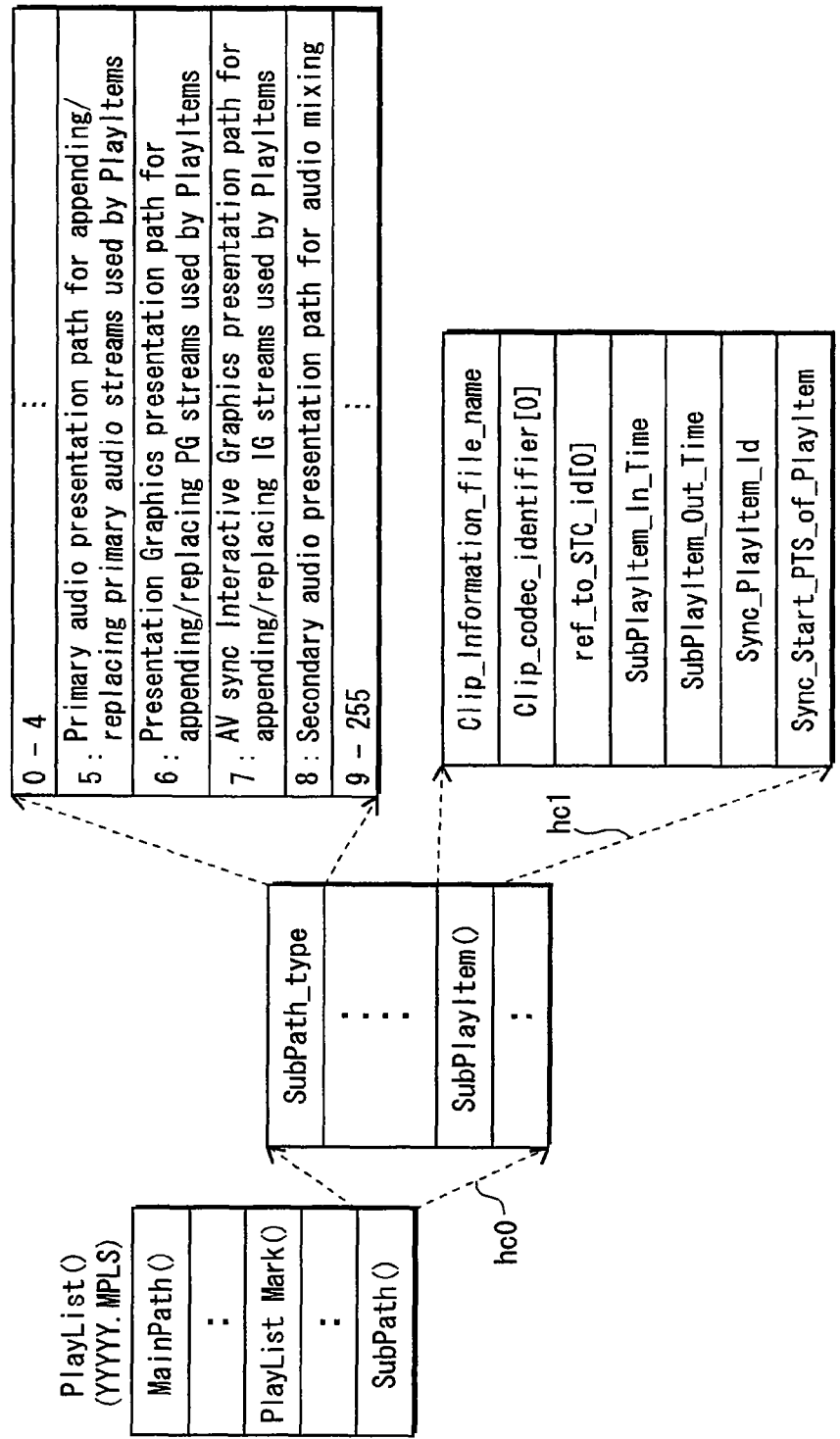
FIG. 18 shows the internal structure of the Subpath information with close-ups.

FIG. 18 shows the internal structure of the Subpath information with close-ups. As indicated by the arrow hc0, each Subpath includes: SubPath_type that indicates the type of SubClip; and one or more pieces of SubPlayItem information ( ... SubPlayItem( ) ... ).

The lead line hc1 indicates the close-up of the structure of the SubPlayItem information. As the lead line hc1 indicates, the SubPlayItem information includes: "Clip_information_file_name", "Clip_codec_identifier", "ref_to_STC_id[0]", "SubPlayItem_In_time", "SubPlayItem_Out_time", "sync_PlayItem_id", and "sync_start_PTS_of_PlayItem".

The "Clip_information_file_name" is information that uniquely specifies a SubClip that corresponds to SubPlayItem, by writing the file name of the Clip information.

The "Clip_codec_identifier" indicates an encoding method of the AVClip.

The "ref_to_STC_id[0]" uniquely indicates a STC_Sequence that is the target of the PlayItem.

The "SubPlayItem_In_time" is information that indicates the start point of SubPlayItem in the reproduction time axis of the SubClip.

The "SubPlayItem_Out_time" is information that indicates the end point of SubPlayItem in the reproduction time axis of the SubClip.

The "sync_PlayItem_id" is information that uniquely specifies, among PlayItems constituting the MainPath, PlayItem with which the SubPlayItem is to be synchronized. The "SubPlayItem_in_time" is present in the reproduction time axis of the PlayItem specified by the "sync_PlayItem_id".

The "sync_start_PTS_of_PlayItem" indicates the position of the start point of the SubPlayItem specified by the SubPlayItem_In_time, in the reproduction time axis of the PlayItem specified by the "sync_PlayItem_id".

<Subpath Information Detail 1: SubPath_Type>

Up to now, the SubPath information has been described. From now on, the SubPath_type will be explained. The SubPath_type is set to be a value among 0 to 255 to indicate the type of the SubPath that is defined by the SubPath information.

When the SubPath_type is set to 5, it indicates that the SubPath defined by the SubPath information is the Primary audio presentation path. The Primary audio presentation path is used when the audio stream, which is to be replaced with the Primary audio stream referred to by the MainPath (PlayItem) before it is reproduced, is stored in the SubPath (SubPlayItem).

When the SubPath_type is set to 6, it indicates that the current SubPath information defines the Presentation Graphics presentation path for addition or replacement. Here, the "addition or replacement" concerns the addition of a PG stream to the PG streams that can be reproduced by the PlayItem information, or the replacement of a PG stream with any of the PG streams that can be reproduced by the PlayItem information.

When the SubPath_type is set to 7, it indicates that the current SubPath information defines the Interactive Graphics presentation path for addition or replacement. Here, the "addition or replacement" concerns the addition of an IG stream to the IG streams that can be reproduced by the PlayItem information, or the replacement of an IG stream with any of the IG streams that can be reproduced by the PlayItem information.

When the SubPath_type is set to 8, it indicates that the current SubPath information defines the Secondary audio presentation path for addition. Here, the "addition" concerns the addition of a Secondary audio stream that is to be mixed with the reproduction sound/voice of the Primary audio stream that can be reproduced by the PlayItem information.

For example, when a mixing reproduction of the Primary and Secondary audio streams is performed, two audio decoders and two mixers need to be operated and accordingly the reproduction type of the player needs to be acquired preliminarily, which is different from the case where only the ordinary Primary audio stream is reproduced. For this purpose, Subpath_type or the PID of the STN_table is used to notify the player, before a reproduction, that there is a Secondary audio stream that is to be reproduced in synchronization therewith.

Up to now, the Subpath_type has been described.

<Subpath Information Detail 2: Relationships Among Three Parties>

It should be noted that the "three parties" mentioned here are SubClip in the local storage 200, PlayList information in the local storage 200, and MainClip in the BD-ROM.

FIG. 19 shows the relationships among SubClip in the local storage 200, PlayList information in the local storage 200, and MainClip in the BD-ROM. In FIG. 19, the $1^{st}$ row shows SubClip in the local storage 200. As shown in the $1^{st}$ row, the SubClip in the local storage 200 is any of the Secondary audio stream, PG stream, and IG stream. Any of these streams is subjected to the synchronous reproduction as a Subpath.

The $2^{nd}$ row of FIG. 19 shows two time axes that are defined by the PlayList information. Of these, the lower time axis is the PlayItem time axis defined by the PlayItem information, and the upper time axis is the SubPlayItem time axis defined by the SubPlayItem information.

As shown in FIG. 19, "SubPlayItem_Clip_information_file_name" of the SubPlayItem information indicates one among ".m2ts" files stored in the STREAM directory to specify a reproduction section for a SubClip. The "SubPlayItem_in_time" and "SubPlayItem_Out_time" play a role of defining the start point and the end point of the reproduction section.

The arrow "Sync_PlayItem_id" plays a role of specifying synchronization, namely, specifying a PlayItem to be synchronized with. The arrow "sync_start_PTS_of PlayItem" plays a role of determining the position of "SubPlayItem_In_time" in the PlayItem time axis.

FIG. 20 shows the EP_map and the PlayItem time axis that are set for the MainClip and the EP_map and the SubPlayItem time axis that are set for the SubClip.

In FIG. 20, the middle row and the lower $4^{th}$ to lower $1^{st}$ rows show the PlayItem time axis, picture sequence, MainClip time axis, EP_map, and TS packet sequence shown in FIG. 10.

Also, the upper $1^{st}$ to upper $3^{rd}$ rows show the TS packet sequence, EP_map, and SubClip time axis, and the upper $4^{th}$ row shows the SubItem time axis.

Up to now, the SubPath information has been described.

<STN_table>

What is unique to the PlayList information in the local storage 200 is the STN_Table. The following describes the PlayList information in the local storage 200.

The STN_table is a table that indicates reproducible streams among a plurality of elementary streams multiplexed in the AVClips specified by the Clip_Information_file_name in the PlayItem information, and among Out_of_MUX streams specified by the Clip_Information_file_name in the information. More specifically, the STN_table is generated by associating the Stream_attributes with the Stream entries respectively corresponding to the plurality of elementary streams multiplexed in the MainClips and to the Out_of_MUX streams multiplexed in the SubClips.

FIG. 21 shows the internal structure of the STN_table. As shown in FIG. 21, the STN_table includes a plurality of pairs (entry-attribute) of an entry of the STN_table and an attribute, and shows the number of the pairs (number_of_video_stream_entries, number_of_audio_stream_entries, number_of_PG_stream_entries, number_of_IG_stream_entries).

In the STN_table, as indicated by the parenthesis sign "{", each entry-attribute pair correspond to any of a video stream, Primary audio stream, Secondary audio stream, PG stream, and IG streams that are permitted to be reproduced by the PlayItem. In particular, it should be noted here that pairs of a Stream_entry and a Stream_attribute in the Secondary audio stream are associated with Comb_info_Secondary_audio_Primary_audio.

The entry—attribute will now be described in detail.

Figure 22A:
FIG. 22A shows Stream_attribute corresponding to a video stream.

FIG. 22A shows Stream_attribute corresponding to a video stream.

The Stream_attribute for video stream includes; "Video_format" that indicates a video stream display method; "frame_rate" that indicates a display frequency of the video stream; and so on.

Figure 22B:
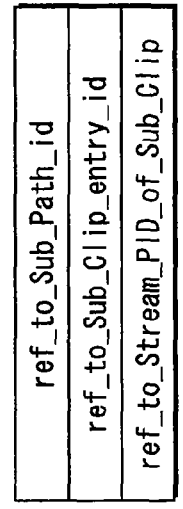
FIG. 22B shows Stream_attributes corresponding to the Primary audio stream and the Secondary audio stream.

FIG. 22B shows Stream_attributes corresponding to the Primary audio stream and the Secondary audio stream.

The Stream_attributes for the Primary and Secondary audio streams includes: "stream_coding_type" that indicates the audio stream encoding method; "audio_presentation_type" that indicates the channel construction of the corresponding audio stream; "Sampling_frequency" that indicates the sampling frequency of the corresponding audio stream; and "audio_language code" that indicates the language attribute of the audio stream.

Figure 22C:
FIG. 22C shows Stream_entry for the video streams.

FIG. 22C shows Stream_entry for the video streams. As shown in FIG. 22C, the Stream_entry for the video stream includes "ref_to_Stream_PID_of_Main_Clip" that indicates a PID used for demultiplexing the video stream.

The Stream_attributes for the Primary audio stream, IG stream, and PG stream multiplexed in the MainClip have the format shown in FIG. 22C.

Figure 22D:
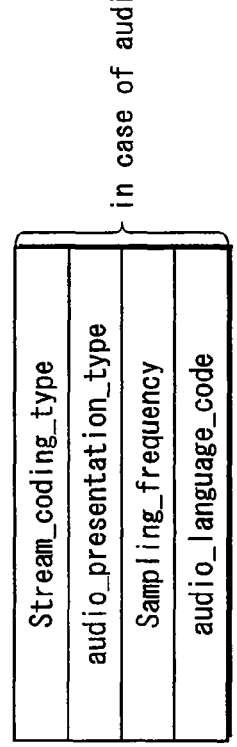
FIG. 22D shows Sub_entries for the Secondary audio streams.

FIG. 22D shows Sub_entries for the streams (in the following description, referred to as Secondary audio streams) multiplexed in the SubClip. The Stream_entry for the Secondary audio stream includes "ref_to_Sub_Path_id" that indicates SubPath information that is referring to the Secondary audio stream; "ref_to_Sub_Clip_entryid" that indicates the SubClip in which the Secondary audio stream is multiplexed; and "ref_to_stream_PID_of_Sub_Clip" that indicates the PID used for demultiplexing the Secondary audio stream.

Figure 22E:
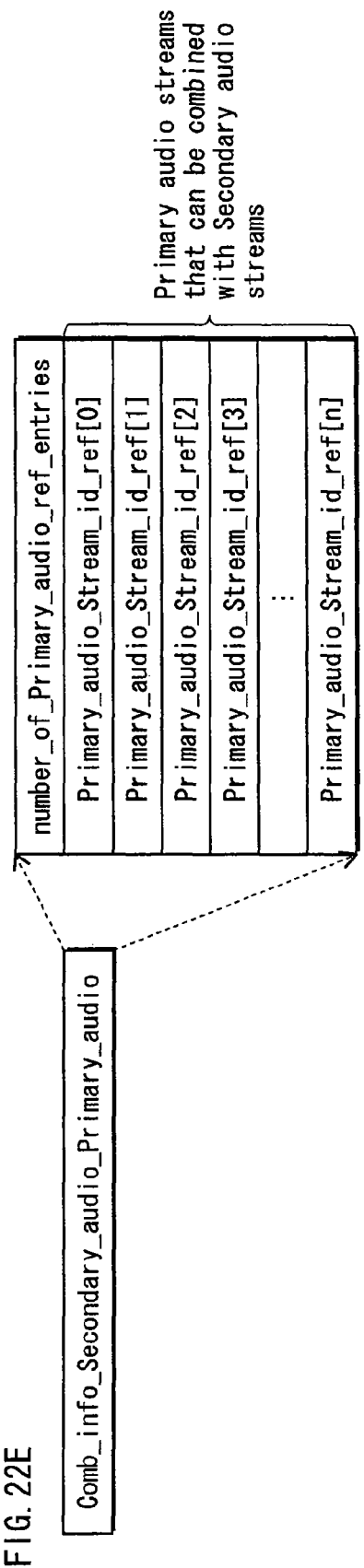
FIG. 22E shows the internal structure of Comb_info_Secondary_audio_Primary_audio that is associated with a pair of Stream_entry and Stream_attribute for the Secondary audio stream.

FIG. 22E shows the internal structure of Comb_info_Secondary_audio_Primary_audio that is associated with a pair of Stream_entry and Stream_attribute for the Secondary audio stream. The Comb_info_Secondary_audio_Primary_audio is composed of: number_of_primary_audio_stream_ref entries that indicates, for each Secondary audio stream, the total number of Primary audio streams that can be combined with the Secondary audio streams; and Primary_audio_stream_id_ref[0] . . . [n] that indicate the stream numbers of the Primary audio streams that can be combined during reproduction.

Figure 23:
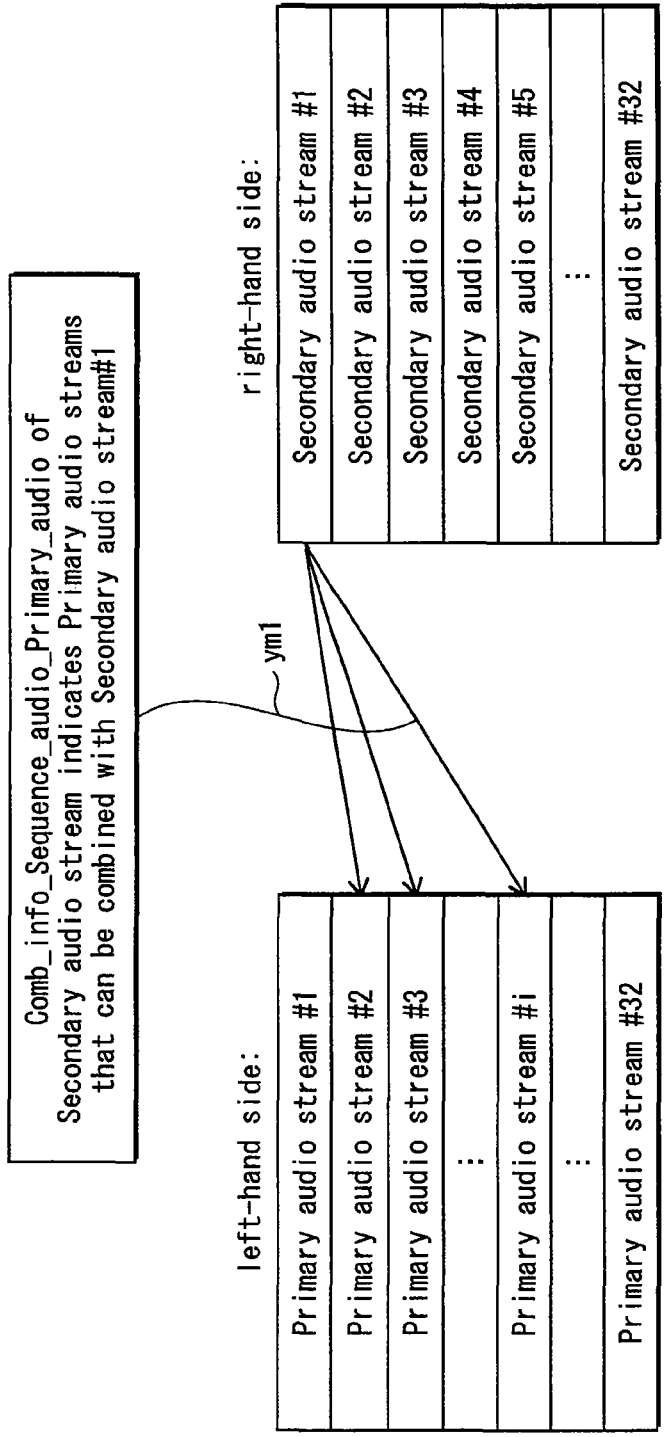
FIG. 23 shows the specification of the Primary audio streams by Comb_info_Secondary_audio_Primary_audio.

FIG. 23 shows the specification of the Primary audio streams by Comb_info_Secondary_audio_Primary_audio. In FIG. 23, the right-hand side shows 32 Secondary audio streams, and the left-hand side shows 32 Primary audio streams. The arrow ym1 indicates specification by Comb_info_Secondary_audio_Primary_audio of Secondary audio stream#1. In this way, the Comb_info_Secondary_audio_Primary_audio that is set for each Secondary audio stream specifies uniquely one or more Primary audio streams with which the reproduction output of the Secondary audio stream can be mixed. Such a construction makes it possible to set, at the time of authoring, whether or not to mix the Secondary audio stream, depending on the audio attribute. For example, it is possible to set not to mix the Secondary audio stream with, during the reproduction, Primary audio streams that have a predetermined attribute, and to set to mix the Secondary audio stream with, during the reproduction, Primary audio streams that have attributes other than the predetermined attribute.

Up to now, the PlayList information in the local storage 200 has been explained. This completes the explanation of the local storage 200.

<Virtual Package>

Figure 24:
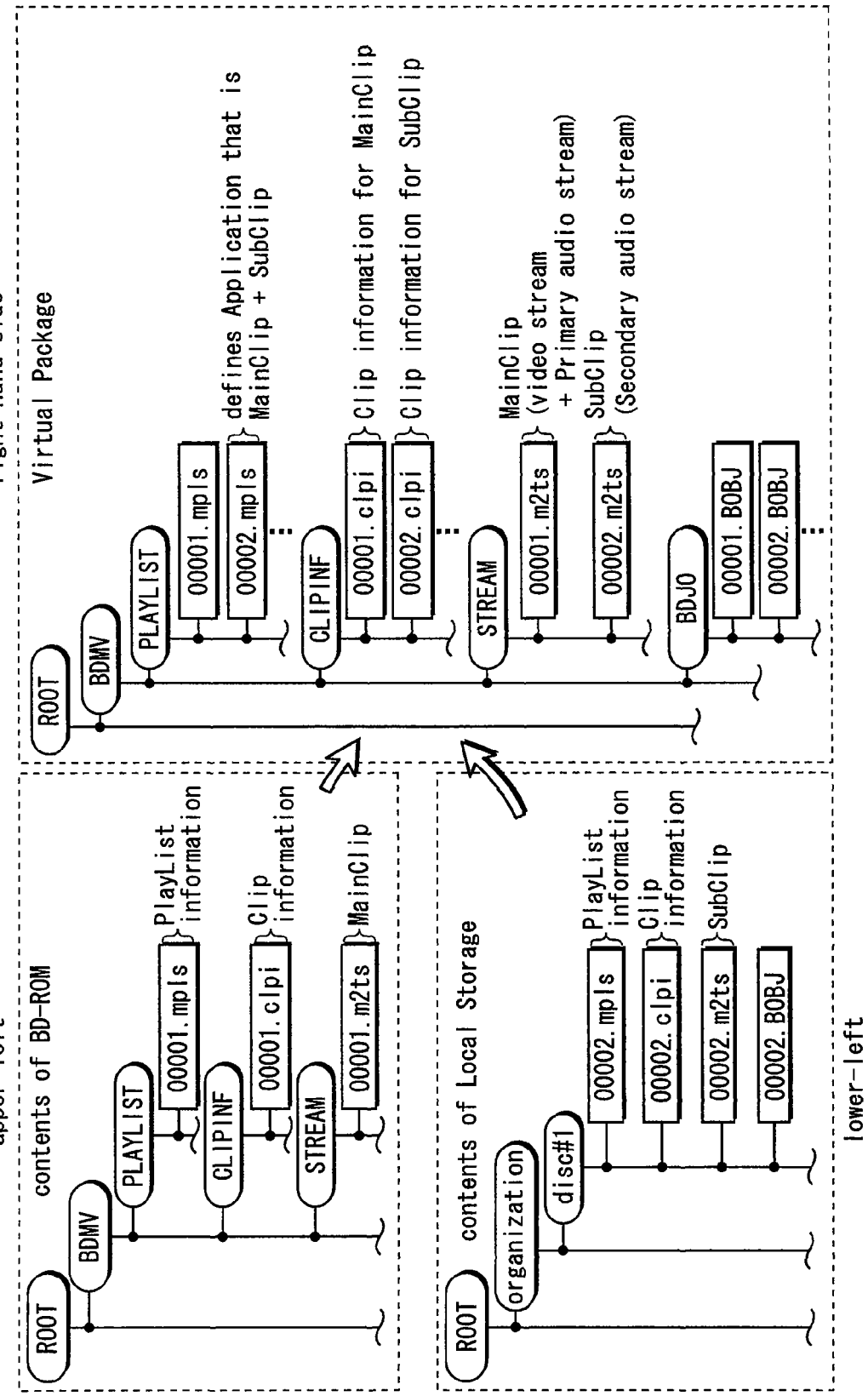
FIG. 24 shows a virtual package that is generated by the reproduction apparatus 300.

From now on, the virtual package will be described. FIG. 24 shows a virtual package that is generated by the reproduction apparatus 300. In FIG. 24, the upper left-hand side shows the recorded contents of the BD-ROM, and the lower left-hand side shows the recorded contents of the local storage 200. Also, the right-hand side shows the structure of the virtual package.

The reproduction apparatus obtains a virtual file system by combining the AVClips, Clip information, and PlayList information stored in the BD-ROM and the local storage 200.

More specifically, for this combination, the reproduction apparatus:

i) virtually adds PlayList(00002.mpls) in the Local Storage to the MPLS directory in the BD-ROM;

ii) virtually adds Clip information (00002.clpi) in the Local Storage to the CLPI directory in the BD-ROM; and iii) virtually adds AVClip#2 (00002.m2ts) in the Local Storage to the STREAM directory in the BD-ROM.

With the above-described combination, the virtual package shown in the right-hand side of FIG. 24 is generated.

Up to now, the recording medium has been described. From now on, the reproduction apparatus will be described.

Figure 25:
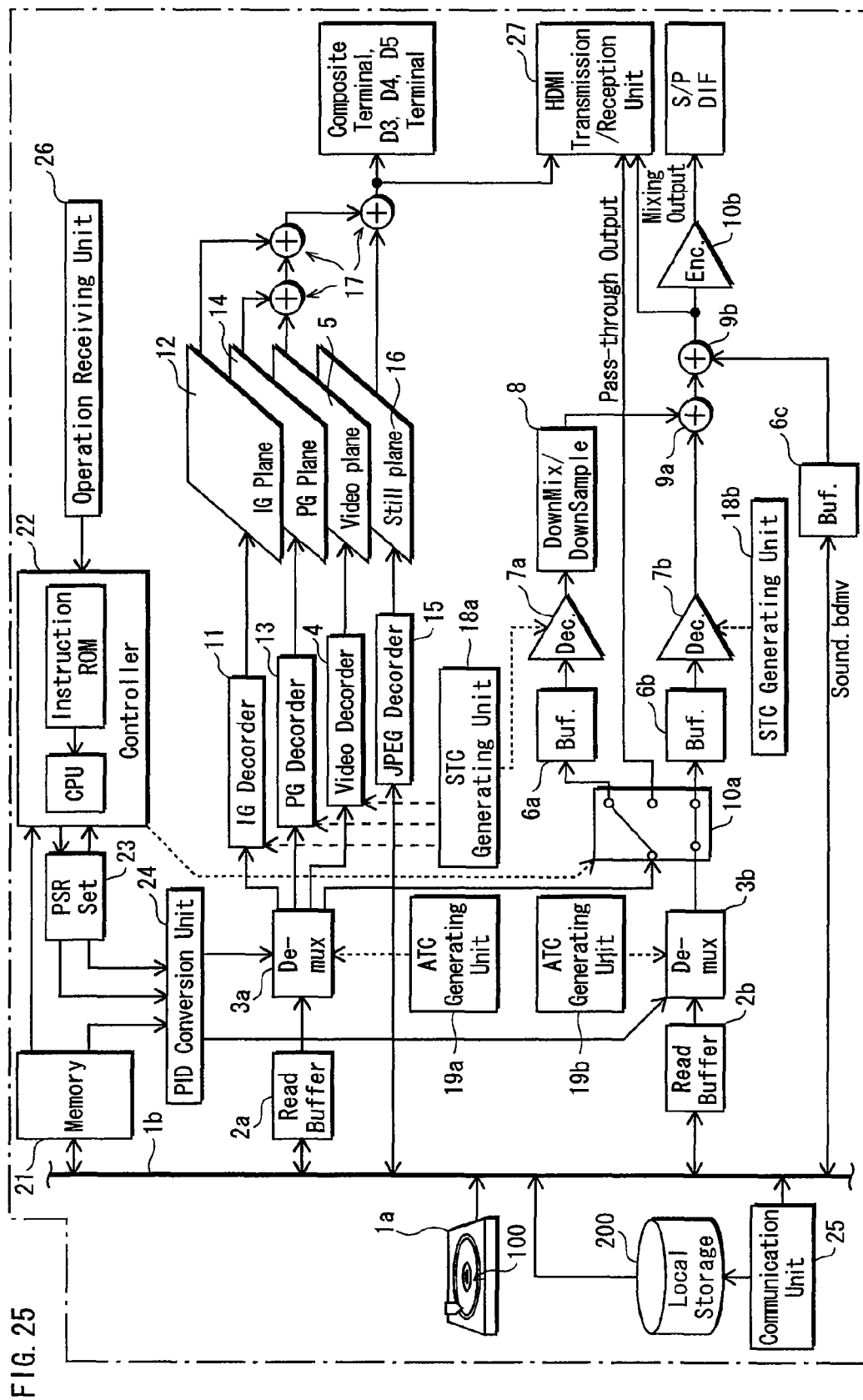
FIG. 25 shows the internal structure of the reproduction apparatus of the present invention.

FIG. 25 shows the internal structure of the reproduction apparatus of the present invention. The reproduction apparatus of the present invention is produced industrially based on the internal structure shown in FIG. 25. The reproduction apparatus of the present invention is mainly composed of two parts: a system LSI; and a drive apparatus, and can be produced industrially by mounting these parts in the cabinet and on the substrate. The system LSI is an integrated circuit in which various processing units, which perform functions of the reproduction apparatus, are included. The reproduction apparatus produced in this way includes: a BD-ROM drive 1a, a bus 1b, read buffers 2a and 2b, demultiplexers 3a and 3b, a video decoder 4, a video plane 5, buffers 6a, 6b and 6c, audio decoders 7a and 7b, a DownMix/DownSample 8, mixers 9a and 9b, a switch 10a, an encoder 10b, an Interactive Graphics decoder 11, an Interactive Graphics plane 12, a Presentation Graphics decoder 13, a Presentation Graphics plane 14, a JPEG decoder 15, a Still plane 16, a combining unit 17, STC generating units 18a and 18b, ATC generating units 19a and 19b, a memory 21, a controller 22, a PSR set 23, a PID conversion unit 24, a communication unit 25, an operation receiving unit 26, and an HDMI transmission/reception unit 27.

The BD-ROM drive 1a performs the loading/ejection of the BD-ROM, and performs accesses to the BD-ROM.

The bus 1b transfers thereon the TS packets read from the BD-ROM, and the TS packets read from the local storage 200.

The read buffer 2a is a FIFO memory in which the TS packets read from the BD-ROM 100 or the local storage 200 are stored by the First-In-First-Out method.

The read buffer 2b is a FIFO memory in which the TS packets read from the local storage 200 are stored by the First-In-First-Out method.

The demultiplexer 3a outputs TS packets having the PIDs that are notified from the PID conversion unit 24, among the TS packets that are transferred on the bus and have PIDs 0x1011, 0x1100-0x111F, 0x1200-0x121F, and 0x1400-141F, to the video decoder 4, the audio decoder 7a, the IG decoder 11, and the PG decoder 13.

The demultiplexer 3b demultiplexes TS packets having PIDs 0x1A00-0x1A1F, namely TS packets constituting the Secondary audio stream, among the TS packets that are transferred on the bus 1b. The demultiplexing by the demultiplexer 3b is achieved by comparing the reference values of the PIDs written in the stream_entries which, among the stream_entries of the Secondary audio streams containing the STN_table, correspond to the stream numbers stored in the PSR14, with the PIDs of the TS packets transferred on the bus 1b, and outputting the TS packets, which have PIDs that are found to match in the comparison, to the audio decoder 7b via the buffer 6b. It should be noted here that if there is only one reproducible Secondary audio stream, it is only necessary to compare the upper byte "1A" of the PID reference value written in the stream_entry, with the upper byte "1A" of the PID of the TS packet transferred on the bus 1b. This is because since there is no other Secondary audio stream, it is only necessary to refer to the upper byte of the PID that indicates that it is the Secondary audio stream.

If there are a plurality of reproducible Secondary audio streams, it is necessary to compare the lower byte (a value ranging from 0x00 to 0x1F) of the PID reference value written in the stream_entry, with the lower byte (a value ranging from 0x00 to 0x1F) of the PID of the TS packet transferred on the bus 1b, in addition to comparing the upper byte "1A" of the PID reference value written in the stream_entry, with the upper byte "1A" of the PID of the TS packet transferred on the bus 1b. This is because since there are a plurality of Secondary audio streams, it is necessary to refer to the lower byte of the PID so as to uniquely identify the Secondary audio stream.

Here, since the TS packets read from the BD-ROM and the local storage 200 are transferred on the bus 1b, the demultiplexer 3a and the demultiplexer 3b can deal with these TS packets read from the BD-ROM and the local storage 200 as one transport stream, and store them into the buffer as one transport stream. The PIDs assigned to the TS packets constituting the Primary audio stream are present in a separate zone in the PID assignment map from a zone in which the PIDs assigned to the TS packets constituting the Secondary audio stream are present. With this construction, while inputting these TS packets as one transport stream, the demultiplexer 3a and the demultiplexer 3b can output the Primary audio stream and the Secondary audio stream as different elementary streams. Here, the demultiplexer 3a and the demultiplexer 3b can supply the plurality of audio streams multiplexed in one transport stream to the decoder, by performing the same procedure as in demultiplexing them. It is accordingly possible for the demultiplexer 3a and the demultiplexer 3b to supply the Primary audio stream and the Secondary audio stream to the respective decoders in a manner compatible with a demultiplexer that demultiplexes only such TS packets that have a predetermined PID, from one transport stream.

There might be a case where only one demultiplexer is provided for the sake of mounting. In such a case also, assigning different PIDs to the Primary audio stream and the Secondary audio stream is effective.

Up to now, the BD-ROM drive 1a, the bus 1b, the read buffers 2a and 2b, and the demultiplexers 3a and 3b have been described.

The video decoder 4 decodes a plurality of PES packets output from the demultiplexer 3a to obtain non-compressed pictures, and writes the obtained pictures to the video plane 5.

The video plane 5 is a plane for storing non-compressed pictures. The "plane" is a memory area in the reproduction apparatus for storing pixel data of one screen. The resolution of the video plane 5 is 1920×1080. The picture data stored in the video plane 5 is composed of a plurality of pieces of pixel data each of which is represented by a 16-bit YUV value.

The buffer 6a stores therein, among the TS packets output from the demultiplexer 3a and having PIDs in a range from 0x1100 t 0x111F, TS packets having PIDs of the audio streams to be reproduced, by the First-In-First-Out method, and supplies the stored TS packets to the audio decoder 7a.

The buffer 6b stores therein, among the TS packets output from the demultiplexer 3b and having PIDs in a range from 0x1A00 t 0x1A1F, TS packets having PIDs of the audio streams to be reproduced, by the First-In-First-Out method, and supplies the stored TS packets to the audio decoder 7b.

The buffer 6c is a memory for preloading therein the file sound.bdmv that is read out from the BD-ROM/local storage. It is preferable that the preloading into the buffer 6c is performed when the BD-ROM is loaded or when titles are changed. This is because when the file sound.bdmv is tried to be read out during a reproduction of an AVClip, the optical pickup performs a seek to read out a file that is different from the AVClip. On the other hand, when the BD-ROM is loaded or when titles are changed, an AVClip is hardly being reproduced. Therefore, if the file sound.bdmv is always read out when the BD-ROM is loaded or when titles are changed, the response of the apparatus is increased and the AVClip reproduction is less apt to be interrupted.

The audio decoder 7a converts the TS packets stored in the buffer 6a into PES packets, decodes the PES packets to obtain non-compressed audio data in the LPCM state, and outputs the obtained audio data. This achieves a digital output for the Primary audio stream.

The audio decoder 7b converts the TS packets stored in the buffer 6b into PES packets, decodes the PES packets to obtain non-compressed audio data in the LPCM state, and outputs the obtained audio data. This achieves a digital output for the Secondary audio stream.

The DownMix/DownSample 8 converts the digital audio output from the audio decoder 7a to match the digital audio output from the audio decoder 7b in the audio attributes. Here, the audio attributes are the sampling frequency and/or the number of channels. They are made to be compatible with each other. The DownMix/DownSample 8 or the mixer 9a, in accordance with the gain control information extracted by the audio decoder 7b, also performs the process of reducing the gain on the side of the Primary audio stream in accordance with the metadata multiplexed in the Secondary audio stream.

The mixer 9a performs a mixing of the digital audio in the LPCM state output from the audio decoder 7a with the digital audio in the LPCM state output from the audio decoder 7b.

The mixer 9b performs a mixing of the digital audio in the LPCM state output from the mixer 9a with the sound data stored in the buffer 6c. The mixing by the mixer 9b is performed when the CPU 22 decodes a navigation command that is intended to output a click sound, or a byte code that is intended to output a click sound.

The switch 10a switches between (a) supplying, to the audio decoders 7a and 7b, the TS packets of the Primary audio stream demultiplexed by the demultiplexer 3a and the TS packets of the Secondary audio stream demultiplexed by the demultiplexer 3b, and (b) not supplying to the audio decoders 7a and 7b but outputting only the elementary streams to other devices. This operation of not supplying the TS packets of the Primary audio stream to the audio decoders 7a and 7b but outputting only the elementary streams to other devices is called "pass-through output". A conversion unit (not illustrated) that converts the TS packets into the elementary streams (that removes the TS/PES headers) is embedded in the switch 10a.

The encoder 10b, when the audio data in the LPCM state, which is obtained as a result of decoding by the audio decoder 7a and the audio decoder 7b and mixing by the mixer 9b, is sent as a surround sound/voice via a digital interface such as S/PDIF, encodes and compresses the mixed LPCM into the Dolby Digital (DD) format or the Dolby Theater System (DTS) format.

The Interactive Graphics (IG) decoder 11 decodes an IG stream read out from the BD-ROM 100 or the local storage 200, and writes the obtained non-compressed graphics into the IG plane 12.

The Interactive Graphics (IG) plane 12 is a plane into which the non-compressed graphics obtained by the IG decoder 11 are written. Also, characters or graphics drawn by applications are written into the IG plane 12.

The Presentation Graphics (PG) decoder 13 decodes an PG stream read out from the BD-ROM 100 or the local storage 200, and writes the obtained non-compressed graphics into the PG plane 14.

The Presentation Graphics (PG) plane 14 is a memory having an area of one screen, and stores one screen of non-compressed graphics.

The JPEG decoder 15 decodes JPEG data recorded in the BD-ROM 100 or the local storage 200, and writes the obtained data into the Still plane 16.

The Still plane 16 is a plane into which the non-compressed graphics obtained by decoding the JPEG data are written. Also, characters or graphics drawn by applications are written into the IG plane 12. The graphics data is used as the "wallpaper" of the GUI frame work written by a Java™ application.

The combining unit 17 combines the data stored in the IG plane 12, the data stored in the PG plane 14, the data stored in the video plane 5, and the data stored in the Still plane 16 to obtain a complex image.

The STC generating units 18a and 18b generate a System Time Clock (STC) in accordance with an instruction by the controller 22, and adjust the operation timing of each decoder.

The ATC generating units 19a and 19b generate Arrival Time Clock (ATC) in accordance with an instruction by the controller 22, and adjust the operation timing of the demultiplexer. The memory 21 is a memory for storing current PL information and current Clip information. The current PL information is PL information that is currently processed, among a plurality of pieces of PlayList information stored in the BD-ROM. The current Clip information is Clip information that is currently processed, among a plurality of pieces of Clip information stored in the BD-ROM/local storage.

The controller 22 achieves a reproduction control of the BD-ROM by decoding a Java™ application referred to by a Movie Object or a BD-J Object stored in the MovieObject.bdmv, and performing a PlayList reproduction in accordance with the decoding result (that is to say, a reproduction control in accordance with the current PL information). The controller 22 also performs the above-mentioned ATS control and STC control.

The PSR set 23 is a register embedded in the reproduction apparatus, and is composed of the 64 number of Player Setting/Status Registers (PSR) and the 4096 number of General Purpose Registers (GPR). Among the values (PSR) set in the Player Setting/Status Registers, PSR4 to PSR8 are used to represent the current reproduction point.

The PID conversion unit 24 converts the stream numbers of the Primary audio streams and Secondary audio streams into PIDs based on the STN table, and notifies the PIDs as the conversion results to the demultiplexers 3a and 3b.

The communication unit 25 achieves a communication function in the reading apparatus. When a URL is specified by a Java™ application in the BD-J mode, the communication unit 25 establishes a TCP connection or an FTP connection with a web site of the specified URL. The establishment of such a connection enables the Java™ application to download data from the web site.

The operation receiving unit 26 receives specification of an operation from a user, and notifies User Operation information, which indicates the operation specified by the user, to the controller 22.

The HDMI transmission/reception unit 27 receives, from an apparatus connected via HDMI (High Definition Multimedia Interface), information concerning the apparatus, and transmits the digital non-compressed video, which is obtained as a result of decoding by the video decoder 4, to the apparatus via HDMI, together with LPCM audio data.

Up to now, the hardware construction of the reproduction apparatus of the present invention has been explained. From now on, the software construction of the reproduction apparatus of the present invention will be explained.

Figure 26:
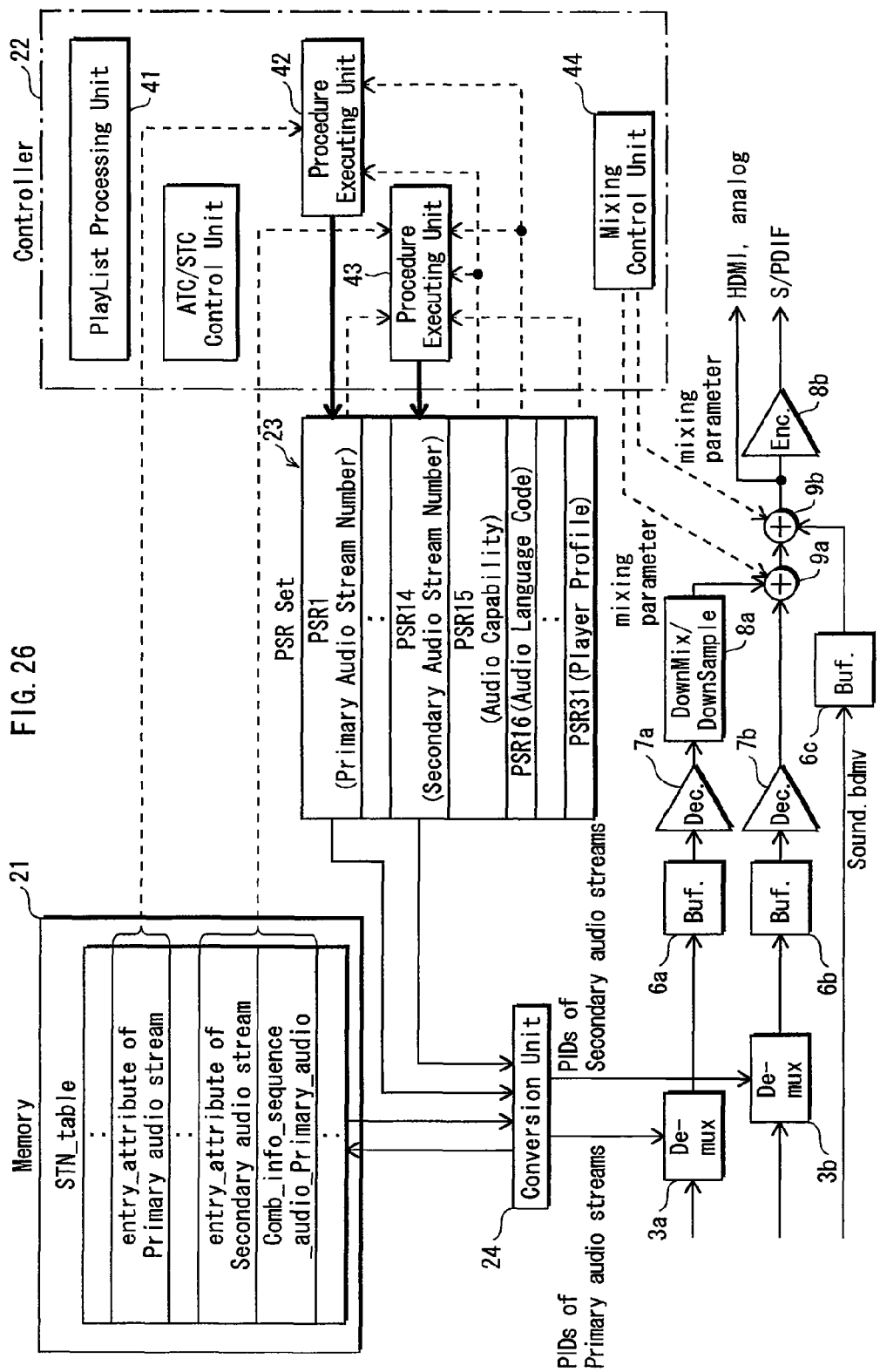
FIG. 26 shows the functions of the controller 22.

The controller 22 shown in FIG. 25 is shown in terms of the functions in FIG. 26. FIG. 26 shows the functions of the controller 22. As shown in FIG. 26, the controller 22 includes a PlayList processing unit 41, a Procedure executing units 42 and 43, a mixing control unit 44, and an ATC/STC control unit that causes the ATC generating units 19a and 19b and the STC generating units 18a and 18b to generate ATC and STC, respectively.

These components perform the processes based on the PSR set 23. The following explains PSR1, PSR14, and PSR31.
<PSR1>

FIG. 27A shows the bit assignment in the PSR1.

As shown in FIG. 27A, the lower eight bits (b0-b7) among 32 bits of the PSR1 represents a stream number, and identifies one of a plurality of Primary audio streams whose entries are written in the STN table of the current Play Item. When the value set in the PSR1 changes, the reproduction apparatus reproduces a Primary audio stream corresponding to the set value after the change. The PSR1 is set to "0xFF" as the initial value, and then may be set to a value ranging from "1" to "32" by the reproduction apparatus. The value "0xFF" is an unspecified value and indicates that there is no Primary audio stream or that a Primary audio stream has not been selected. When the PSR1 is set to a value ranging from "1" to "32", the set value is interpreted as a stream number of a Primary audio stream.
<PSR14>

FIG. 27B shows the bit assignment in the PSR14.

As shown in FIG. 27B, the lower eight bits (b0-b7) among 32 bits of the PSR14 represents a stream number, and identifies one of a plurality of Secondary audio streams whose entries are written in the STN_table of the current Play Item.

When the value set in the PSR14 changes, the reproduction apparatus reproduces a Secondary audio stream corresponding to the set value after the change. The PSR14 is set to "0xFF" as the initial value, and then may be set to a value ranging from "1" to "32" by the reproduction apparatus. The value "0xFF" is an unspecified value and indicates that there is no Secondary audio stream or that a Secondary audio stream has not been selected. When the PSR14 is set to a value ranging from "1" to "32", the set value is interpreted as a stream number of a Secondary audio stream.

<PSR31>

FIG. 27C shows the bit assignment in the PSR31.

As shown in FIG. 27C, bit 16 to bit 19 (b16-b19) among 32 bits of the PSR31 represents Player Profile information. When bit 16 to bit 19 are "0000"b, they indicate that the reproduction apparatus is shipped during a grace period, where " "b indicates bit values. Here, the grace period is a period during which reproduction apparatuses without predetermined functions may be shipped. The functions that can be omitted in the reproduction apparatuses shipped in the grace period include the audio mixing function. As a result, if bit 16 to bit 19 (b16-b19) of the PSR31 are set to "0000"b, namely if the Player Profile information is "0000"b, it indicates that predetermined functions including the audio mixing function are not mounted in the reproduction apparatus.

When the Player Profile information is "0001"b, it indicates that the reproduction apparatus is shipped after the grace period. Since reproduction apparatuses shipped after the grace period are basically required to be mounted with all the functions to be provided, the Player Profile information being "0001"b indicates that the reproduction apparatus is mounted with the mixing.

When the Player Profile information is "0011"b, it indicates that the reproduction apparatus is mounted with all the functions to be provided. Such a reproduction apparatus is mounted with all the functions regardless of whether it is shipped before or after the grace period. As a result, when the Player Profile information is "0011"b, it indicates that the reproduction apparatus is mounted with the sound mixing function.

The PSR may include, as information indicating the mixing function, information that indicates the number of channels with which the reproduction apparatus can perform the mixing.

Alternatively, the PSR may include information that indicates the number of audio output channels at the final output. For example, if an interface such as HDMI is connected for use, 5.1-channel LPCM audio, which is the decoding result, can be output as LPCM. However, if the interface is, for example, S/PDIF, the audio is output as 2 channels (L/R), not as 5.1 channels, for which a compression by an encoder is required. Accordingly, if it is judged that the mixer is followed by an encoder connected to S/PDIF (for example, not connected to HDMI), the number of audio output channels at the final output can be set to 5.1 channels. If the mixer is not followed by an encoder, the number of audio output channels at the final output can be set to 2 channels after mixing.

Up to now, the PSR set 23 has been described.

From now on, the PlayList processing unit 41, the Procedure executing unit 42, and the Procedure executing unit 43 will be described.

<Functional Construction Detail 1: PlayList Processing Unit>

The PlayList processing unit 41 achieves the PL reproduction. The PlayList processing unit 41 reproduces portions of a video stream and a Primary audio stream that correspond to a section from In_time to Out_time of the PlayItem information, and to be in synchronization with this, the PlayList processing unit 41 causes the audio decoder 7b to reproduce a portion of a Secondary audio stream that corresponds to a section from Sub_PlayItem_In_time to Sub_PlayItem_Out_ time of the SubPlayItem information.

Figure 28:
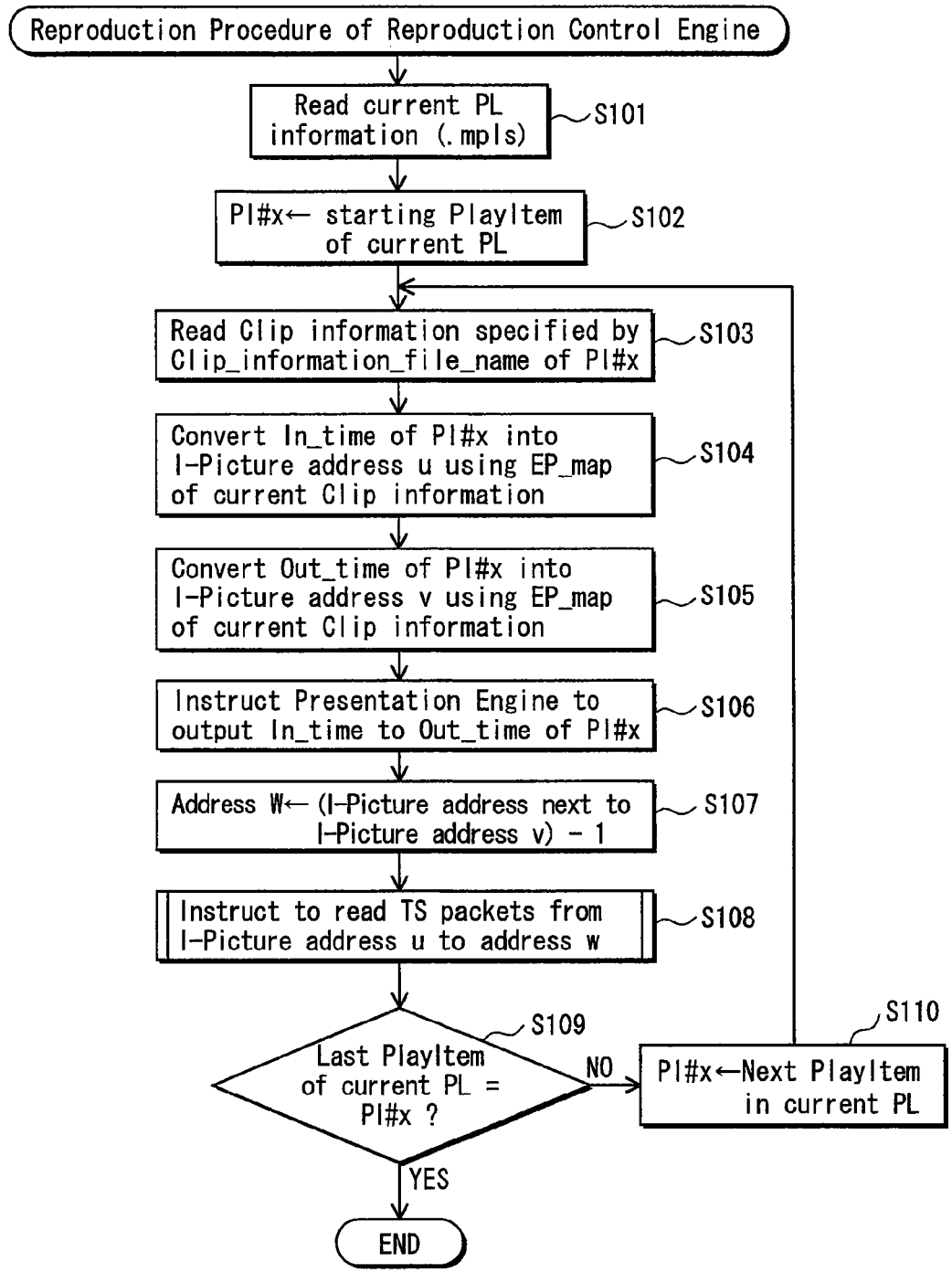
FIG. 28 is a flowchart showing the PlayList reproduction procedure by the PlayList processing unit.

FIG. 28 is a flowchart showing the PlayList reproduction procedure by the PlayList processing unit.

In this flowchart, first the current PL information (.mpls) is read out (step S101), and then steps S102 to S110 are performed. The steps S102 to S110 constitute a loop in which steps S103 to S110 are repeatedly performed for each piece of PI information that constitutes the current PL information until it is judged as Yes in step S109. In this loop process, the process-target PlayItem is referred to as PlayItem#x (PI#x). The PlayItem#x is initialized by being set to the starting PlayItem of the current PL information (step S102). The condition for ending the loop is that the PlayItem#x is the last PlayItem of the current PL information (step S109). If it is judged in step S109 that PlayItem#x is not the last PlayItem of the current PL information, PlayItem#x is set to the next PlayItem in the current PL information (step S110).

In the steps S103 to S110 that are repeatedly performed in the loop process, Clip information specified by Clip_information_file_name of PlayItem#x is read out onto the memory (step S103), In_time of PlayItem#x is converted into I-Picture address u using EP_map of the current Clip information (step S104), Out_time of PlayItem#x is converted into I-Picture address v using EP_map of the current Clip information (step S105), I-Picture address next to I-Picture address v is obtained, and an address that precedes the obtained address by one is set to address w (step S107), and the BD-ROM 100 or the local storage 200 is instructed to read TS packets from I-Picture address u to address w (step S108).

On the other hand, a video decoder or the like is instructed to output from mark_time_stamp of current PLMark to Out_ time of PlayItem#x (step S106). In the steps S105 to S108, a portion of AVClip specified by PlayItem#x is reproduced.

After this, it is judged whether or not the PlayItem#x is the last PlayItem of the current PL information (step S109).

If it is judged in step S109 that PlayItem#x is not the last PlayItem of the current PL information, PlayItem#x is set to the next PlayItem in the current PL information (step S110), and the control returns to step S103. As the above-described steps S103 to S110 are repeated, each piece of PI information that constitutes the current PL information is reproduced in sequence.

<Functional Construction Detail 2: Procedure Executing Unit 42>

The Procedure executing unit 42, when necessity for changing a piece of PlayItem information to another arises, or when the user instructed, through an operation, to change the stream number, executes a predetermined stream selection procedure, and writes a new stream number into PSR1. The reproduction apparatus reproduces the Primary audio stream according to the stream number written in PSR1. The setting of PSR1 thus enables a Primary audio stream to be selected.

The reason why the stream selection procedure is executed when the PlayItem information is changed is as follows. Since the STN_Table is provided in correspondence with each piece of PlayItem information, it may happen that a Primary audio stream, which is reproducible according to a piece of PlayItem information, cannot be reproduced according to another piece of PlayItem information.

Figure 29A:
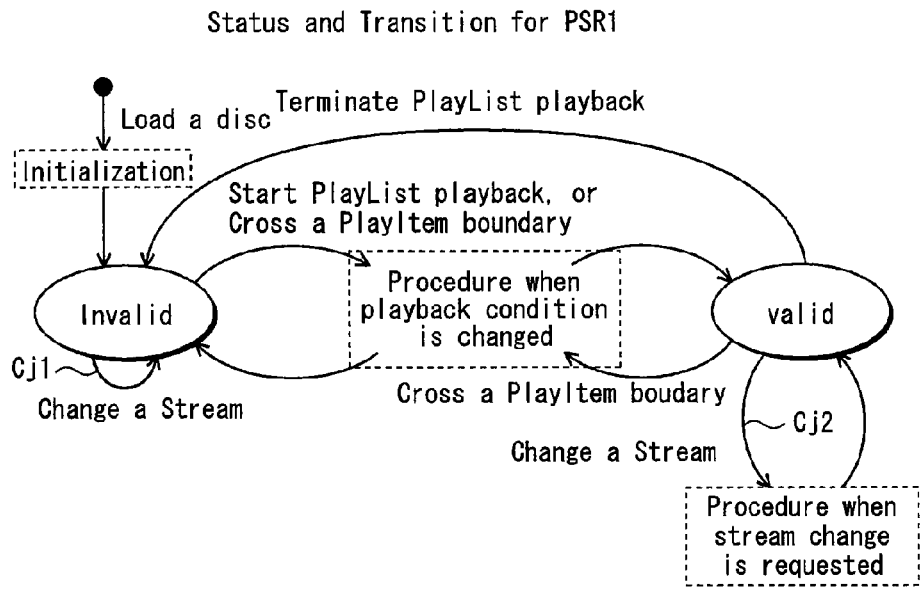
FIG. 29A shows the status transition of the value set in PSR1.

The Procedure executing unit 42 brings PSR1 to change in status as shown in FIG. 29A. FIG. 29A shows the status transition of the value set in PSR1. It should be noted here that in FIG. 29A, the term "valid" means that the value of PSR1 is equal to or smaller than the number of entries written in the STN_table of the Play Item, and is decodable.

The term "invalid" means that (a) the value of PSR1 is "0", (b) the value of PSR1 is larger than the number of entries written in the STN_table of the Play Item, or (c) decoding is not available even if the number of entries written in the STN_table of the Play Item is in the range from "1" to "32".

The frames drawn with dotted lines in FIG. 29A indicate a procedure for determining the value of PSR when the status changes. The procedure for setting a value to PSR is classified into "Procedure when playback condition is changed" and "Procedure when Stream change is requested".

The "Procedure when playback condition is changed" is a procedure to be executed when the reproduction apparatus has changed in the status due to some event that occurred to the apparatus.

The "Procedure when Stream change is requested" is a procedure to be executed when the user requests some changing (in FIG. 29A, "Change a Stream").

The "Procedure when playback condition is changed" and "Procedure when Stream change is requested" are stream selection procedures and will be described in detail with reference to the flowcharts.

The arrows in FIG. 29A symbolically indicate the status transition of PSR.

The notes attached to the arrows indicate events that trigger each status transition. That is to say, FIG. 29A indicates that a status transition of PSR1 occurs if an event such as "Load Disc", "Change a Stream", "Start PlayList playback", "Cross a PlayItem boundary", or "Terminate PlayList playback" occurs. It will be understood by referring to FIG. 29A that the above-mentioned procedures are not performed when a status transition of "Invalid→Invalid" or "Valid→Invalid" occurs. On the other hand, status transitions of "Invalid→Valid" and "Valid→Valid" go through the dotted-line frames. That is to say, the above-mentioned "Procedure when playback condition is changed" or "Procedure when Stream change is requested" is performed when PSR1 is set to be "Valid".

The following describes the events that trigger the status transition.

The event "Load Disc" indicates that the BD-ROM has been loaded in the reproduction apparatus. In such loading, PSR1 is once set to an unspecified value (0xFF). The event "Start PlayList playback" indicates that a reproduction process based on PlayList has been started. When such an event occurs, the "Procedure when playback condition is changed" is executed, and PSR1 is set to be "Valid".

The event "Terminate PlayList playback" indicates that a reproduction process based on PlayList has been terminated. It is understood that when such an event occurs, the "Procedure when playback condition is changed" is not executed, and PSR1 is set to be "Invalid".

The event "ChangeXXX" indicates that the user requested to change XXX (in FIG. 29A, Stream). If this event occurs when PSR1 is "Invalid" (indicated by "cj1" in FIG. 29A), PSR1 is set to a value as requested. Even if the value that is set in this way indicates a valid stream number, the value set in PSR1 is treated as an "Invalid" value. That is to say, in the status transition triggered by the event "ChangeXXX", PSR never changes from Invalid to Valid.

On the other hand, if event "Change a Stream" occurs when PSR1 is "Valid" (indicated by "cj2" in FIG. 29A), the "Procedure when Stream change is requested" is executed, and PSR1 is set to a new value. Here, the value set when the "Procedure when Stream change is requested" is executed may not be a value desired by the user. This is because the "Procedure when Stream change is requested" has a function to exclude an invalid value. If the event "Change stream" occurs when PSR1 is "Valid", PSR1 never changes from Valid to Invalid. This is because the "Procedure when Stream change is requested" assures that PSR1 does not become "Invalid".

The event "Cross a PlayItem boundary" indicates that a Play Item boundary has been passed. Here, the Play Item boundary is a boundary between two successive Play Items, namely a position between the end of a preceding Play Item and the start of a succeeding Play Item, among the two successive Play Items. If the event "Cross a PlayItem boundary" occurs when PSR1 is "Valid", the "Procedure when playback condition is changed" is executed. After the execution of the "Procedure when playback condition is changed", the status of PSR1 either returns to "Valid" or transits to "Invalid". Since the STN_table is provided in correspondence with each Play Item, if a Play Item changes, a reproducible elementary stream also changes. The status transition is aimed to set PSR1 to a most appropriate value for each Play Item by executing the "Procedure when playback condition is changed" each time a Play Item starts to be reproduced.

Figure 29B:
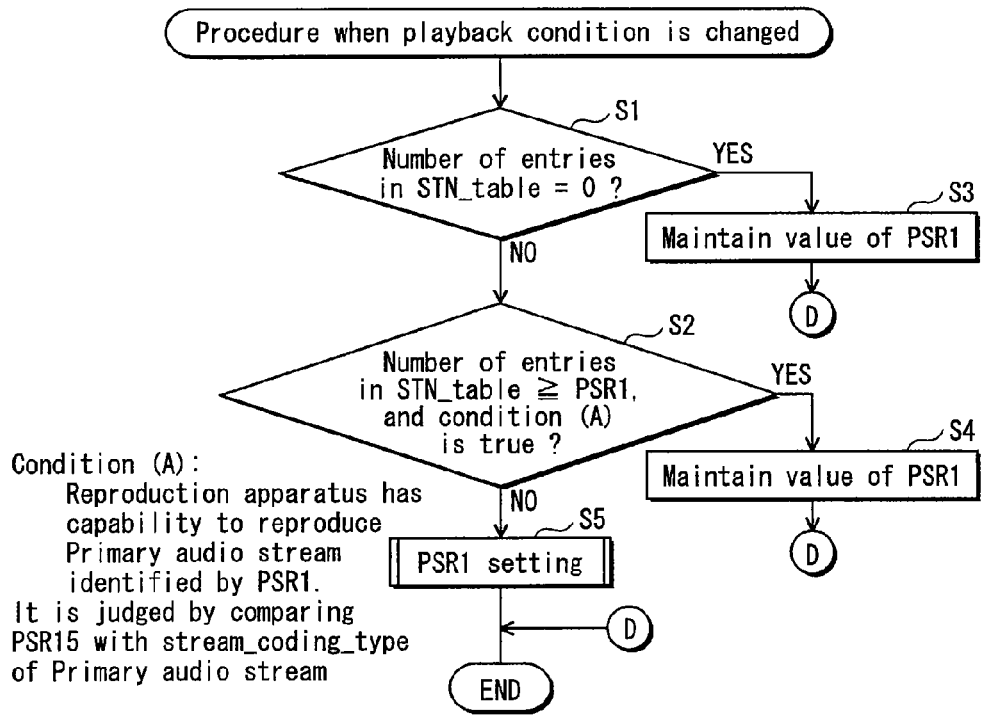
FIG. 29B is a flowchart of the "Procedure when playback condition is changed" in PSR1.

In the above-described status transition, the "Procedure when playback condition is changed" is executed as shown in FIG. 29B. FIG. 29B is a flowchart of the "Procedure when playback condition is changed". The procedure sets a value in PSR1 by performing two judgment steps, S1 and S2.

In step S1, it is judged whether the number of entries in STN_table is "0". If it is judged that the number of entries in STN_table is "0", the value of PSR1 is maintained (step S3).

In step S2, which is executed if it is judged in step S1 that the number of entries in STN_table is not "0", it is judged whether the number of entries in STN_table is equal to or larger than PSR1, and condition (A) is true. Here, the condition (A) is that the reproduction apparatus has capability to reproduce a Primary audio stream identified by PSR1. If the judgment result of step S2 is positive, the value of PSR1 is maintained (step S4). If either the value of PSR1 is larger than the number of entries in STN_table or the condition (A) is not satisfied, a process is performed to set PSR1 (step S5).

Figure 30:
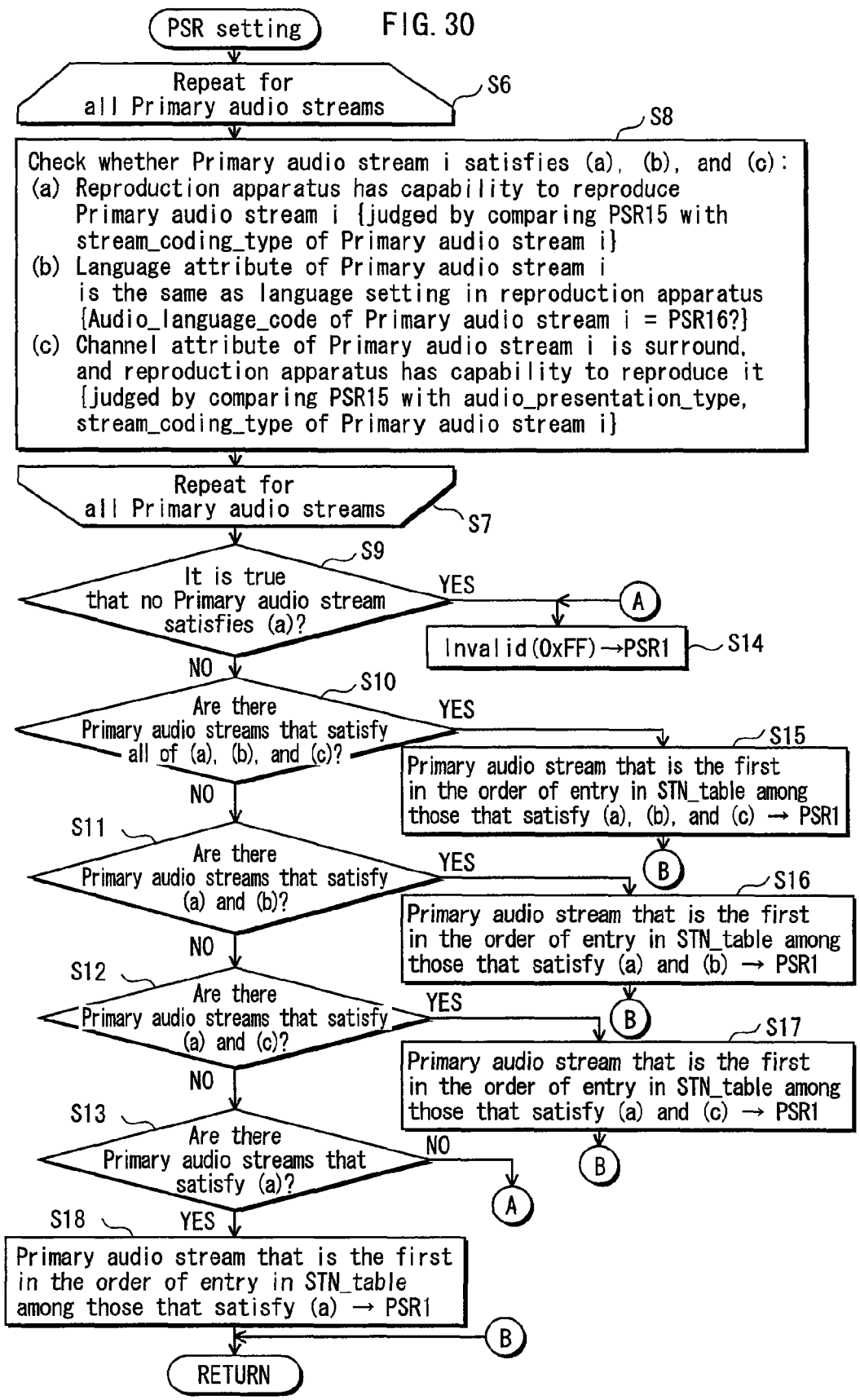
FIG. 30 is a flowchart showing the detailed procedure of step S5.

FIG. 30 is a flowchart showing the detailed procedure of step S5.

In this flowchart, steps S6 and S7 constitute a loop in which step S8 is repeatedly performed for all Primary audio streams. In this loop, the process-target Primary audio stream is referred to as Primary audio stream i. In step S8, it is checked whether Primary audio stream i satisfies conditions (a), (b), and (c).

The condition (a) is that the reproduction apparatus has capability to reproduce Primary audio stream i, and whether the condition is satisfied is judged by comparing PSR15 with stream_coding_type of Primary audio stream i.

The condition (b) is that the language attribute of Primary audio stream i is the same as the language setting in the reproduction apparatus, and whether the condition is satisfied is judged by checking whether audio_language_code of Primary audio stream i written in STN_table is equal to the value set in PSR.

The condition (c) is that the channel attribute of Primary audio stream i is surround, and the reproduction apparatus has capability to reproduce it, and whether the condition is satisfied is judged by comparing PSR15 with audio_presentation_type, stream_coding_type of Primary audio stream i.

Based on the pattern of (i) which conditions, among the plurality of conditions, are satisfied by Primary audio stream i and (ii) how many conditions are satisfied, this flowchart assigns priorities to the Primary audio streams.

After the process is repeatedly performed for all Primary audio streams, steps S9 to S13 are performed. In step S9, it is judged whether it is true that no Primary audio stream satisfies condition (a). If it is judged that it is true, an unspecified value (0xFF) is set to PSR1 (step S14).

In step S10, it is judged whether there are Primary audio streams that satisfy all of conditions (a), (b), and (c). If it is judged positively, the stream numbers of such Primary audio streams that satisfy all of conditions (a), (b), and (c) are set in PSR1.

Here, if there are a plurality of Primary audio streams that satisfy all of conditions (a), (b), and (c), it is necessary to determine one among them that is set in PSR1. In step S15, it is determined based on the order of entry in the STN_table. That is to say, in step S15, if there are a plurality of Primary audio streams that are the same in the codec, language attribute, and channel attribute, the STN_table is referred to and a Primary audio stream that is the first in the order of entry in the STN_table is selected.

It is therefore possible for the person in charge of authoring to control the priority levels of streams to be reproduced, by changing the order of entry in the STN_table.

If there is no Primary audio stream that satisfies all of conditions (a), (b), and (c), the control goes to step S11 in which it is judged whether there are Primary audio streams that satisfy conditions (a) and (b). If it is judged that there are Primary audio streams that satisfy conditions (a) and (b), a Primary audio stream among these that is the first in the order of entry in the STN_table is set in PSR1 (step S16).

If there is no Primary audio stream that satisfies all of conditions (a), (b), and (c) and there is no Primary audio stream that satisfies conditions (a) and (b), the control goes to step S12 in which it is judged whether there are Primary audio streams that satisfy conditions (a) and (c). If it is judged that there are Primary audio streams that satisfy conditions (a) and (c), a Primary audio stream among these that is the first in the order of entry in the STN_table is set in PSR1 (step S17).

If there is no Primary audio stream that satisfies all of conditions (a), (b), and (c), there is no Primary audio stream that satisfies conditions (a) and (b), and there is no Primary audio stream that satisfies conditions (a) and (c), the control goes to step S13 in which it is judged whether there are Primary audio streams that satisfy condition (a). If it is judged that there are Primary audio streams that satisfy condition (a), a Primary audio stream among these that is the first in the order of entry in the STN_table is set in PSR1 (step S18).

Figure 31:
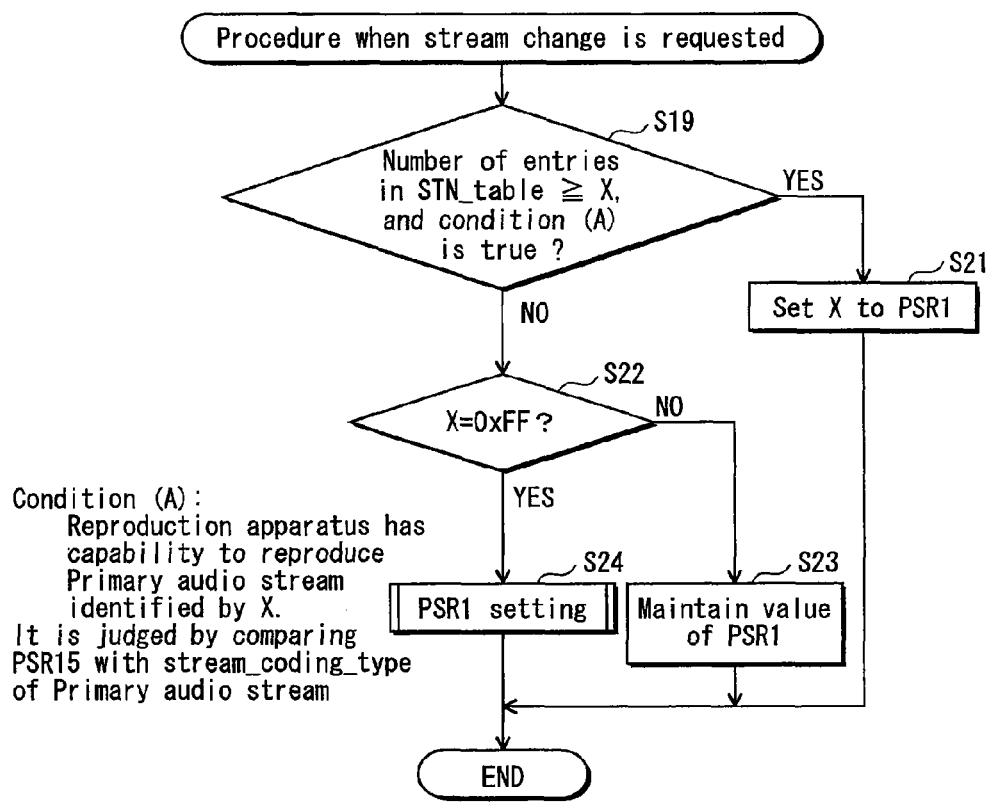
FIG. 31 is a flowchart showing the procedure for setting PSR1 when stream change is requested.

Up to now, the "Procedure when playback condition is changed" has been explained. From now on, the "Procedure when Stream change is requested" will be explained. FIG. 31 is a flowchart showing the procedure for setting PSR1 when stream change is requested. The flowchart of FIG. 31 differs from the flowchart of FIG. 29B in that in some places X is used in place of PSR1. The "X" is a value determined based on the User Operation information output from the operation receiving unit 26 or a button command output from the PG decoder 13.

In step S19 of the flowchart, it is judged whether the number of entries in STN_table is equal to or larger than X, and condition (A) is true. Here, the condition (A) is that the reproduction apparatus has capability to reproduce a Primary audio stream identified by PSR1. It is judged by comparing PSR15 with stream_coding_type of the Primary audio stream. If the judgment result of step S19 is positive, X is set to PSR1 (step S21).

If either X is larger than the number of entries in STN_table or the condition (A) is not satisfied, it is judged whether X is 0xFF. Here, if X is not 0xFF, it is considered that the number of the Primary audio stream that the user intends to select is invalid, and the value X, which is determined based on the user operation, is disregarded and the value set in PSR1 is maintained (step S23).

If X is 0xFF, PSR1 is set (step S24). The processing procedure of step S24 is the same as the procedure shown in FIG. 30 (Among the steps shown in FIG. 30, the judgment in step S9 is not required in the "Procedure when Stream change is requested". This is because in the "Procedure when Stream change is requested", if there is no Primary audio stream that satisfies conditions (a), (b), and (c), X, which is set by the user, is not set to PSR1, and the value set in PSR1 is maintained)

<Functional Construction Detail 3: Procedure Executing Unit 43>

The Procedure executing unit 43, when necessity for changing a piece of PlayItem information to another arises, or when the user instructed, through an operation, to change the stream number, executes a predetermined stream selection procedure, and writes a new stream number into PSR14. The reproduction apparatus reproduces the Primary audio stream according to the stream number written in PSR14. The setting of PSR14 thus enables a Primary audio stream to be selected.

Figure 32A:
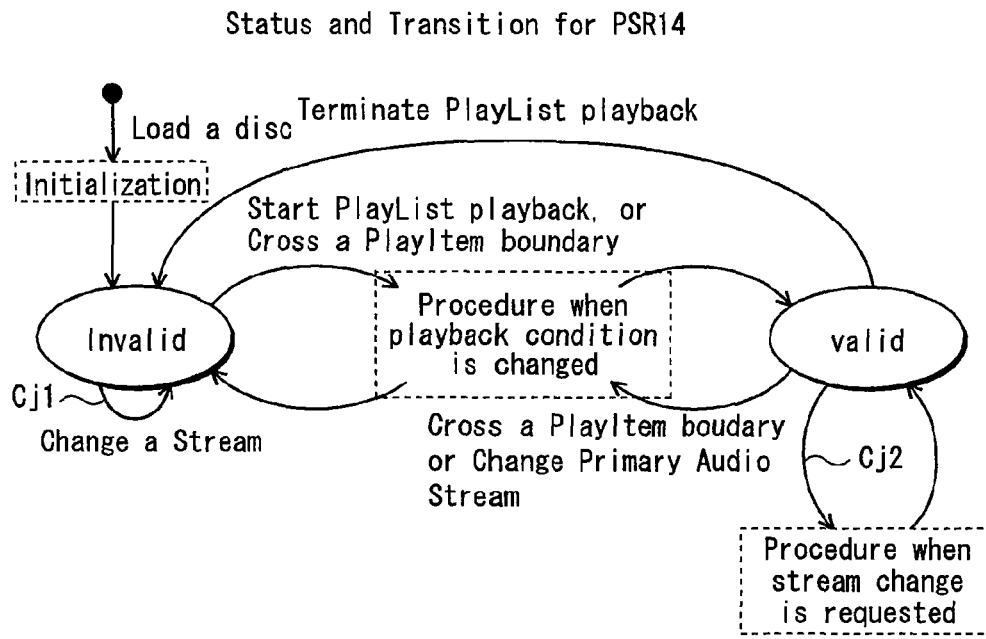
FIG. 32A shows the status transition of the value set in PSR14.

The Procedure executing unit 43 brings PSR14 to change in status as shown in FIG. 32A.

FIG. 32A shows the status transition of the value set in PSR14. It should be noted here that in FIG. 32A, the term "valid" means that the value of PSR14 is equal to or smaller than the number of entries written in the STN_table of the Play Item, and is decodable.

The term "invalid" means that (a) the value of PSR14 is "0", (b) the value of PSR14 is larger than the number of entries written in the STN_table of the Play Item, or (c) decoding is not available even if the number of entries written in the STN_table of the Play Item is in the range from "1" to "32".

The frames drawn with dotted lines in FIG. 32A indicate a procedure for determining the value of PSR when the status changes. The procedure for setting a value to PSR is classified into "Procedure when playback condition is changed" and "Procedure when Stream change is requested".

The "Procedure when playback condition is changed" is a procedure to be executed when the reproduction apparatus has changed in the status due to some event that occurred to the apparatus.

The "Procedure when Stream change is requested" is a procedure to be executed when the user requests some changing (in FIG. 32A, "Change a Stream").

The "Procedure when playback condition is changed" and "Procedure when Stream change is requested" are stream selection procedures and will be described in detail with reference to the flowcharts.

The arrows in FIG. 32A symbolically indicate the status transition of PSR.

The notes attached to the arrows indicate events that trigger each status transition. That is to say, FIG. 32A indicates that a status transition of PSR14 occurs if an event such as "Load Disc", "Change a Stream", "Start PlayList playback", "Cross a PlayItem boundary", or "Change Primary Audio Stream" occurs. It will be understood by referring to FIG. 32A that the above-mentioned procedures are not performed when a status transition of "Invalid→Invalid" or "Valid→Invalid" occurs. On the other hand, status transitions of "Invalid→Valid" and "Valid→Valid" go through the dotted-line frames. That is to say, the above-mentioned "Procedure when playback condition is changed" or "Procedure when Stream change is requested" is performed when PSR14 is set to be "Valid".

The following describes the events that trigger the status transition.

The event "Load Disc" indicates that the BD-ROM has been loaded in the reproduction apparatus. In such loading, PSR14 is once set to an unspecified value (0xFF).

The event "Start PlayList playback" indicates that a reproduction process based on PlayList has been started. When such an event occurs, the "Procedure when playback condition is changed" is executed, and PSR14 is set to be "Valid".

The event "Terminate PlayList playback" indicates that a reproduction process based on PlayList has been terminated. It is understood that when such an event occurs, the "Procedure when playback condition is changed" is not executed, and PSR14 is set to be "Invalid".

The event "ChangeXXX" indicates that the user requested to change XXX (in FIG. 32A, Stream). If this event occurs when PSR1 is "Invalid" (indicated by "cj1" in FIG. 32A), PSR14 is set to a value as requested. Even if the value that is set in this way indicates a valid stream number, the value set in PSR14 is treated as an "Invalid" value. That is to say, in the status transition triggered by the event "ChangeXXX", PSR never changes from Invalid to Valid.

On the other hand, if event "Change a Stream" occurs when PSR14 is "Valid" (indicated by "cj2" in FIG. 32A), the "Procedure when Stream change is requested" is executed, and PSR14 is set to a new value. Here, the value set when the "Procedure when Stream change is requested" is executed may not be a value desired by the user. This is because the "Procedure when Stream change is requested" has a function to exclude an invalid value. If the event "Change stream" occurs when PSR14 is "Valid", PSR14 never changes from Valid to Invalid. This is because the "Procedure when Stream change is requested" assures that PSR14 does not become "Invalid".

The event "Cross a PlayItem boundary" indicates that a Play Item boundary has been passed. Here, the Play Item boundary is a boundary between two successive Play Items, namely a position between the end of a preceding Play Item and the start of a succeeding Play Item, among the two successive Play Items. If the event "Cross a PlayItem boundary" occurs when PSR14 is "Valid", the "Procedure when playback condition is changed" is executed. After the execution of the "Procedure when playback condition is changed", the status of PSR14 either returns to "Valid", or if the event "Cross a PlayItem boundary" or "Change Primary Audio Stream" occurs, transits to "Invalid". The status transition is aimed to set PSR14 to a most appropriate value for each Play Item by executing the "Procedure when playback condition is changed" each time a Play Item starts to be reproduced or each time a Primary audio stream is changed.

Figure 32B:
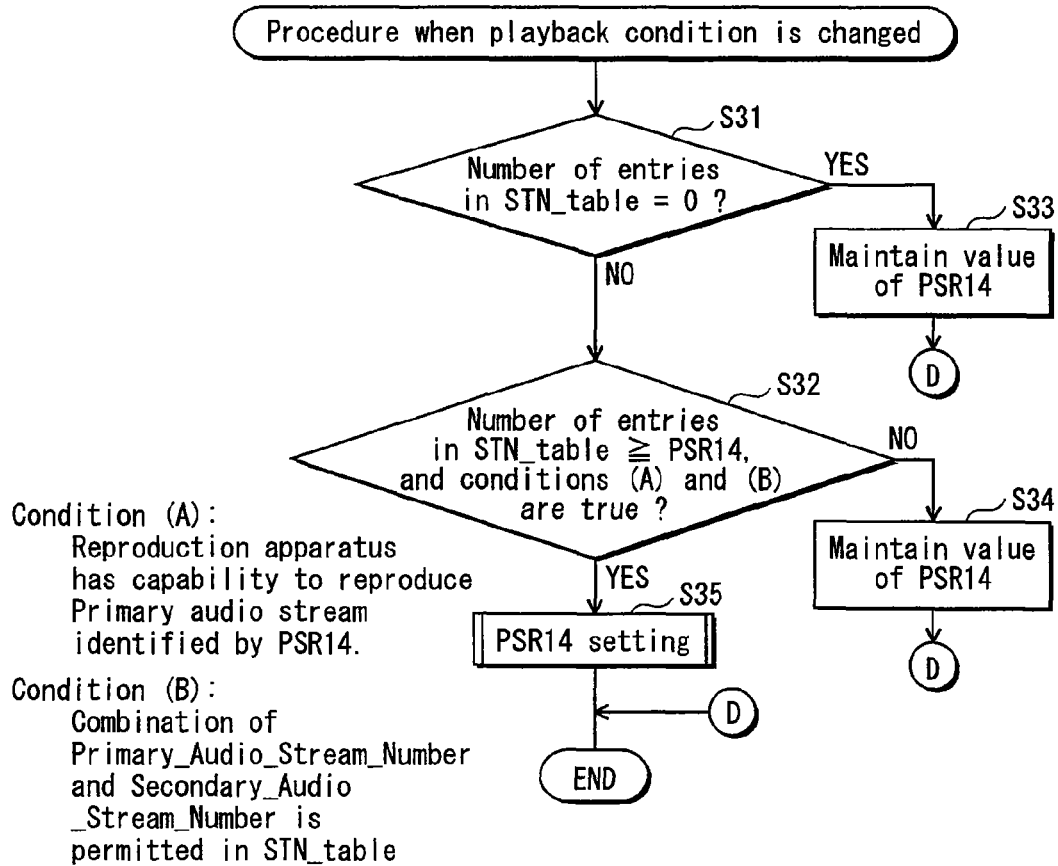
FIG. 32B is a flowchart of the "Procedure when playback condition is changed" in PSR14.

In the above-described status transition, the "Procedure when playback condition is changed" is executed as shown in FIG. 32B. The procedure sets a value in PSR14 by performing two judgment steps, S31 and S32.

In step S31, it is judged whether the number of entries in STN_table is "0". If it is judged that the number of entries in STN_table is "0", the value of PSR14 is maintained (step S33).

In step S32, which is executed if it is judged in step S31 that the number of entries in STN_table is not "0", it is judged whether the number of entries in STN_table is equal to or larger than PSR14, and conditions (A) and (B) are true. Here, the condition (A) is that the reproduction apparatus has capability to reproduce a Primary audio stream identified by PSR14, and the condition (B) is that the combination of Primary_Audio_Stream_Number and Secondary_Audio_Stream_Number is permitted in the STN_table. If the judgment result of step S32 is negative (NO in step S32), the value set in PSR14 is maintained (step S34). If the judgment result of step S32 is positive (YES in step S32), a process is performed to set PSR14 (step S35).

Figure 33:
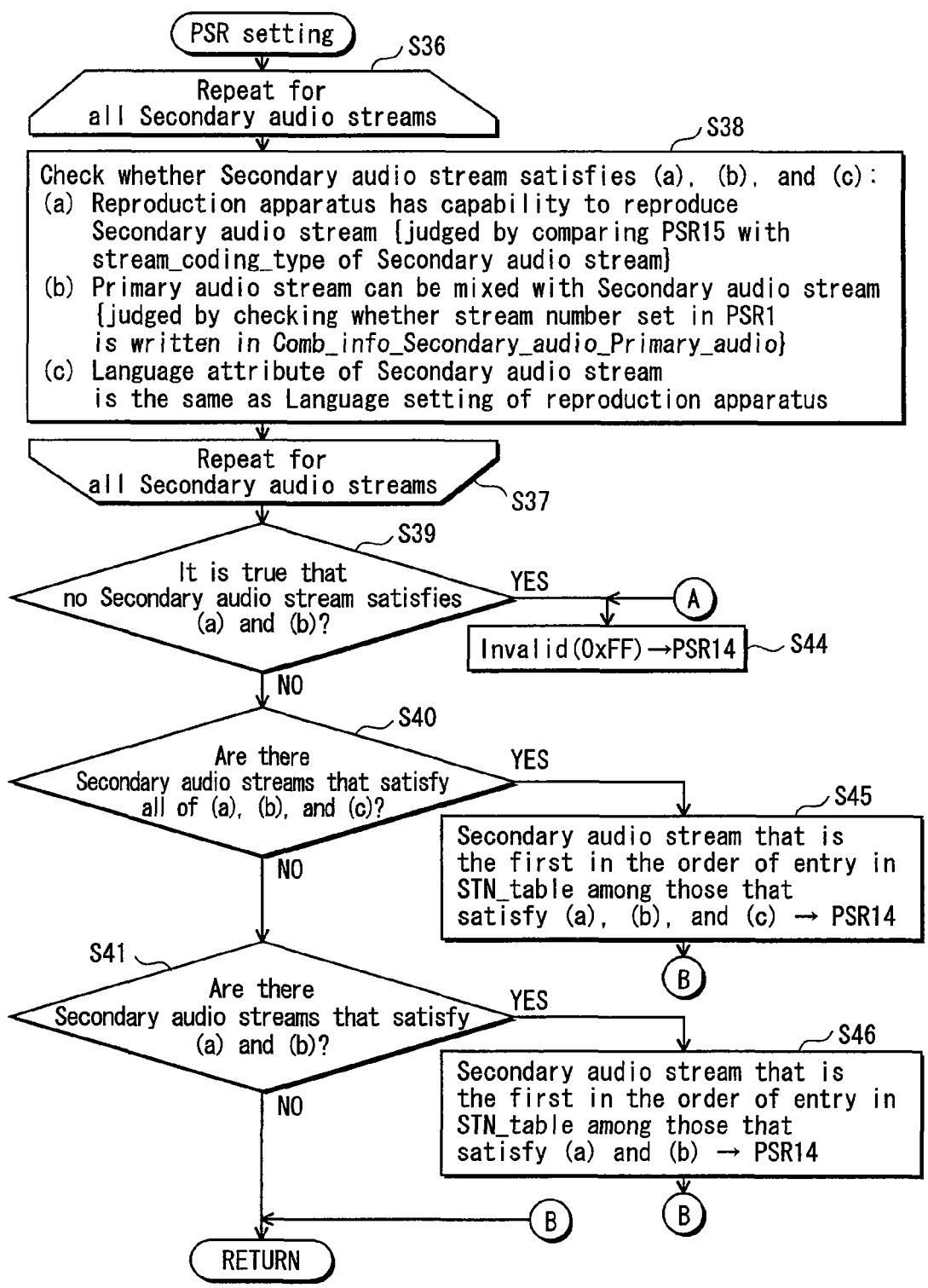
FIG. 33 is a flowchart showing the detailed procedure of step S35.

FIG. 33 is a flowchart showing the detailed procedure of step S35.

In this flowchart, steps S36 and S37 constitute a loop in which step S38 is repeatedly performed for all Secondary audio streams. In this loop, the process-target Secondary audio stream is referred to as Secondary audio stream i. In step S38, it is checked whether Secondary audio stream i satisfies conditions (a), (b), and (c).

The condition (a) is that the reproduction apparatus has capability to reproduce Secondary audio stream i, and whether the condition is satisfied is judged by comparing the register indicating the audio stream reproduction capability (PSR15) with stream_coding_type of Secondary audio stream i.

The condition (b) is that the Primary audio stream can be mixed with the Secondary audio stream, and whether the condition is satisfied is judged by checking whether the stream number set in PSR14 is written in Comb_info_Secondary_audio_Primary_audio.

The condition (c) is that the language attribute of Secondary audio stream i is the same as the language setting in the reproduction apparatus, and whether the condition is satisfied is judged by checking whether audio_language_code of Secondary audio stream i written in STN_table is equal to the value set in PSR.

Based on the pattern of (i) which conditions, among the plurality of conditions, are satisfied by Secondary audio stream i and (ii) how many conditions are satisfied, this flowchart assigns priorities to the Secondary audio streams.

After the process is repeatedly performed for all Secondary audio streams, steps S39 to S41 and steps S44 to S46 are performed. In step S39, it is judged whether it is true that no Secondary audio stream satisfies conditions (a) and (b). If it is judged that it is true, an unspecified value (0xFF) is set to PSR14 (step S44).

In step S40, it is judged whether there are Secondary audio streams that satisfy all of conditions (a), (b), and (c). If it is judged positively, the stream numbers of such Secondary audio streams that satisfy all of conditions (a), (b), and (c) are set in PSR14.

Here, if there are a plurality of Secondary audio streams that satisfy all of conditions (a), (b), and (c), it is necessary to determine one among them that is set in PSR14. In step S45, it is determined based on the order of entry in the STN_table. That is to say, in step S45, if there are a plurality of Secondary audio streams that are the same in the codec, language attribute, and channel attribute, the STN_table is referred to and a Secondary audio stream that is the first in the order of entry in the STN_table is selected.

It is therefore possible for the person in charge of authoring to control the priority levels of streams to be reproduced, by changing the order of entry in the STN_table.

If there is no Secondary audio stream that satisfies all of conditions (a), (b), and (c), the control goes to step S41 in which it is judged whether there are Secondary audio streams that satisfy conditions (a) and (b). If it is judged that there are Secondary audio streams that satisfy conditions (a) and (b), a Secondary audio stream among these that is the first in the order of entry in the STN_table is set in PSR14 (step S46).

Figure 34:
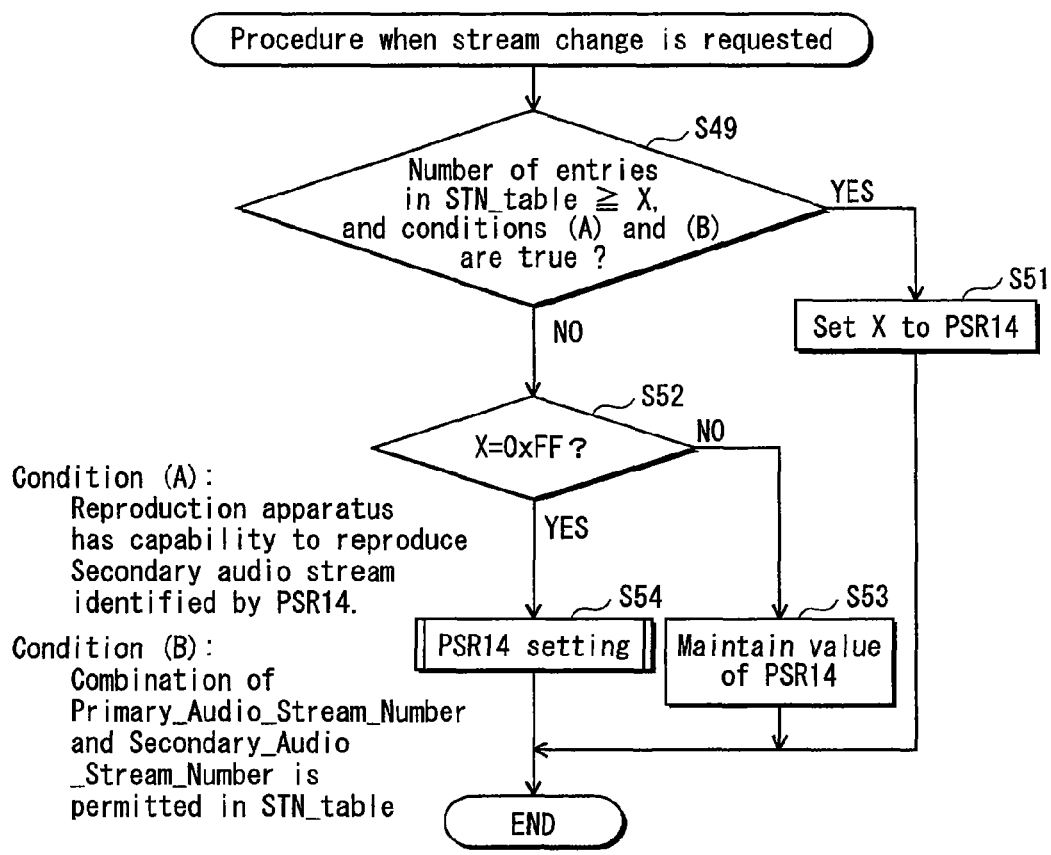
FIG. 34 is a flowchart showing the procedure for setting PSR14 when stream change is requested.

Up to now, the "Procedure when playback condition is changed" has been explained. From now on, the "Procedure when Stream change is requested" will be explained. FIG. 34 is a flowchart showing the procedure for setting PSR14 when stream change is requested. The flowchart of FIG. 34 differs from the flowchart of FIG. 32B in that in some places X is used in place of PSR14. The "X" is a value determined based on the User Operation information output from the operation receiving unit 26 or a button command output from the PG decoder 13.

In step S49 of the flowchart, it is judged whether the number of entries in STN_table is equal to or larger than X, and conditions (A) and (B) are true. If the judgment result of step S49 is positive, X is set to PSR14 (step S51).

If either X is larger than the number of entries in STN_table or the conditions (A) and (B) are not satisfied, it is judged whether X is 0xFF (step S52). Here, if X is not 0xFF, it is considered that the number of the Secondary audio stream that the user intends to select is invalid, and the value X, which is determined based on the user operation, is disregarded and the value set in PSR14 is maintained (step S53).

If X is 0xFF, PSR14 is set (step S54). The processing procedure of step S54 is the same as the procedure shown in FIG. 33 (Among the steps shown in FIG. 30, the judgment in step S39 is not required in the "Procedure when Stream change is requested". This is because in the "Procedure when Stream change is requested", if there is no Primary audio stream that satisfies conditions (a), (b), and (c), X, which is set by the user, is not set to PSR14, and the value set in PSR14 is maintained)

This completes the explanation of the Procedure executing unit 43.

<Functional Construction Detail 4: Mixing Control Unit 44>

The mixing control unit 44, if the Player Profile information is 0001h or 0011h, controls the mixers 9a and 9b to mix the reproduction output of the Primary audio stream with the reproduction output of the Secondary audio stream or the reproduction output of the sound data.

When the current reproduction point in the PlayItem time axis is in a period from In_time to Out_time of the SubPlayItem information, and when the Secondary audio stream is valid in the STN_Table of the current PlayItem information, the mixing control unit 44 controls the mixer 9a to mix the reproduction output of the audio decoder 7a with the reproduction output of the audio decoder 7b because the audio decoder 7b is decoding the Secondary audio stream having the stream number stored in PSR14.

If the attribute of the Primary audio stream is "surround", the reproduction output of the Secondary audio stream can be mixed after a downmixing is performed such that only desired components are held among components such as L, R, C, LS, RS, LR, RR, and LFE. Here, when the Secondary audio stream is, for example, a commentary of the movie director, by changing the channel of the Primary audio stream, with which the Secondary audio stream is to be mixed, from L to C and to R, it is possible to give the user a sensation as if the director is waking around the user. Such mixing is called panning. In panning, the sound/voice of a Secondary audio stream (for example, monaural) with a less number of channels than a Primary audio stream is used.

When a confirmation operation is performed on a button drawn by a Java™ application, or when a confirmation operation is performed on a button drawn by an IG stream, the mixing control unit 44 controls the mixer 9b to mix the sound data with the reproduction output of the Primary audio stream or with the mixing result of the reproduction output of the Primary audio stream and the reproduction output of the Secondary audio stream.

As described above, according to the present embodiment, the demultiplexer 3b can obtain a TS packet that is transferred on the bus 1b, refer to the upper byte of the PID, and enter the TS packet into a decoder dedicated to Secondary audio streams. With this construction, the demultiplexer 3b can demultiplex only the PES packets that constitute the Secondary audio stream, and enter the PES packets into a decoder that is different from a decoder dedicated to Primary audio streams.

Since it is possible to enter packets that constitute a Primary audio stream and packets that constitute a Secondary audio stream respectively into different decoders, it is possible, for example, to downconvert, downmix, or reduce the gain of only the packets that constitute a Primary audio stream. This makes it possible to subject only the packets that constitute a Primary audio stream to special processes in real time even when reading out a Secondary audio stream from the local storage 200 while reading out the Primary audio stream from the BD-ROM 100 and supplying the two streams to the two respective decoders.

Second Embodiment

The second embodiment of the present invention relates to the selection of an apparatus to decode a Primary audio stream among the reproduction apparatus 300 and the AV amplifier 500 in a home theater system.

Figure 35A:
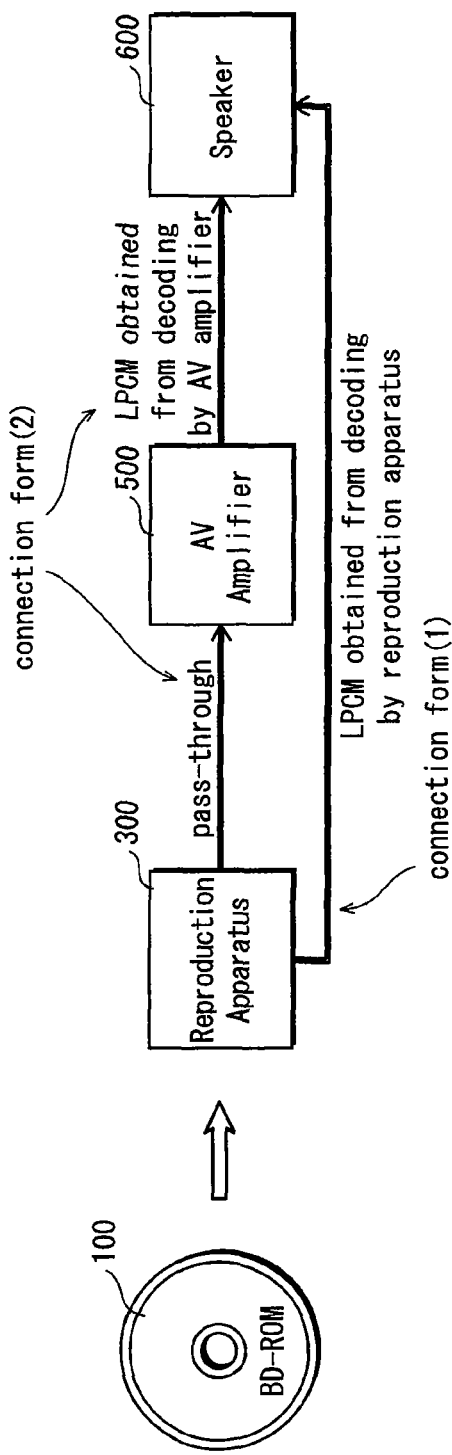
FIG. 35A shows the connection form of the reproduction apparatus 300, the AV amplifier 500, and the speakers 600.

FIG. 35A shows the connection form of the reproduction apparatus 300, the AV amplifier 500, and the speakers 600. The connection form in the home theater system is classified into a form in which the reproduction apparatus 300 is directly connected to the speakers 600 without connection to the AV amplifier 500 in between (connection form (1)), and a form in which the reproduction apparatus 300 is connected to the speakers 600 via the AV amplifier 500 (connection form (2)).

In the former connection form (1), the LPCM obtained as a result of decoding by the reproduction apparatus 300 is supplied to the speakers 600. On the other hand, in the latter connection form (2), the reproduction apparatus 300 performs merely a pass-through output, and the LPCM obtained as a result of decoding by the AV amplifier 500 is supplied to the speakers 600.

The number of channels changes in each apparatus in the home theater system when two or more connection forms are available in the home theater system.

Figure 35B:
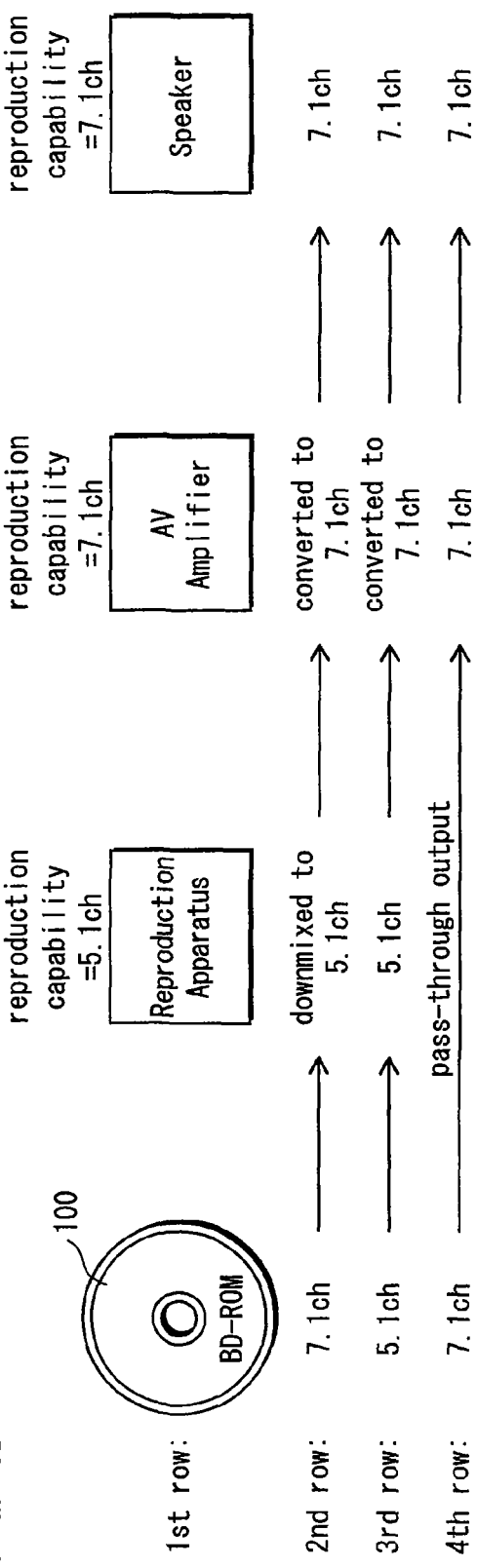
FIG. 35B shows how the number of channels changes in each of the reproduction apparatus 300, the AV amplifier 500, and the speakers 600.

FIG. 35B shows how the number of channels changes in each of the reproduction apparatus 300, the AV amplifier 500, and the speakers 600. The $1^{st}$ row of FIG. 35B shows each of the BD-ROM 100, the reproduction apparatus 300, the AV amplifier 500, and the speakers 600. In regards with the decoding capability of these apparatuses, the reproduction apparatus 300 is capable of decoding up to 5.1 channels, the AV amplifier 500 is capable up to 7.1 channels, and the speakers 600 is capable up to 7.1 channels.

The $2^{nd}$ to $4^{th}$ rows show by which apparatus and how the downmixing is performed when the BD-ROM 100 has Primary audio streams of 7.1 channels and 5.1 channels. The $2^{nd}$ row shows the case where the BD-ROM 100 has a Primary audio stream of 7.1 channels and it is decoded by the reproduction apparatus 300. In this case, the reproduction apparatus 300 reads out the Primary audio stream of 7.1 channels from the BD-ROM 100, decodes and downmixes it to 5.1 channels, and outputs an LPCM of the downmixed 5.1 channels. The AV amplifier 500 converts the LPCM of the downmixed 5.1 channels to 7.1 channels, and outputs the converted LPCM of 7.1 channels to the speakers 600.

The $3^{rd}$ row shows the case where the BD-ROM 100 has a Primary audio stream of 5.1 channels. In this case, the reproduction apparatus 300 decodes the Primary audio stream of 5.1 channels, and outputs an LPCM as the decoding result to the AV amplifier 500 without downmixing. The AV amplifier 500 converts the LPCM of 5.1 channels to 7.1 channels, and outputs the converted LPCM of 7.1 channels to the speakers 600.

The 4$^{th}$ row shows the case where the BD-ROM 100 has a Primary audio stream of 7.1 channels and it is output by the reproduction apparatus 300 by the pass-through output. In this case, the decoding is performed by the AV amplifier 500, and the sound/voice of 7.1 channels, which is the decoding result of the AV amplifier 500, is supplied to the speakers 600 and is output as the sound/voice.

These outputs are compared as follows. In the case of the 2$^{nd}$ row, the reproduction apparatus 300 converts the sound/voice from 7.1 channels to 5.1 channels, then the AV amplifier 500 converts it from 5.1 channels to 7.1 channels, and outputs the sound/voice of 7.1 channels to the speakers 600. With this construction, although the audio stream recorded on the BD-ROM 100 is 7.1 channels, the audio quality of the sound/voice finally output in the case of the 2$^{nd}$ row hardly differs from the audio quality of the sound/voice finally output in the case of the 3$^{rd}$ row.

On the other hand, in the case of the 4$^{th}$ row, since the AV amplifier 500, which has the decoding capability of 7.1 channels, is caused to decode the audio stream of 7.1 channels, a high-quality output is expected.

In the present embodiment, in such an output form, when a device to which the reproduction apparatus is connected to has the reproduction capability, the reproduction apparatus performs the pass-through output so that the device performs the decoding.

Figure 36A:
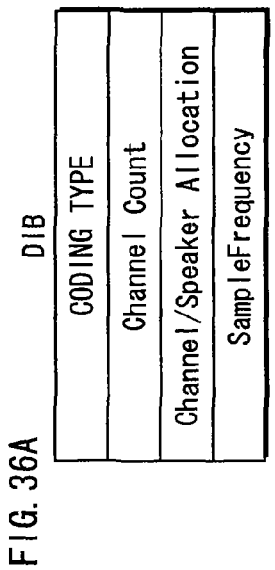
FIG. 36A shows the DIB.

The DIB (Decoder Information Block) of the HDMI is used to determine how high the reproduction capability or the decoding capability of the connection partner device is, or to determine whether to perform a stream output. FIG. 36A shows the DIB.

As shown in FIG. 36A, the DIB includes "Coding Type" that shows the encoding method by which an output to the AV amplifier 500 is possible, "Channel Count" that shows the number of channels with which the connection partner device can decode, "Channel/Speaker Allocation" that shows the arrangement of speakers, and "Sample Frequency" that shows a frequency at which the connection partner device can reproduce.

Figure 36B:
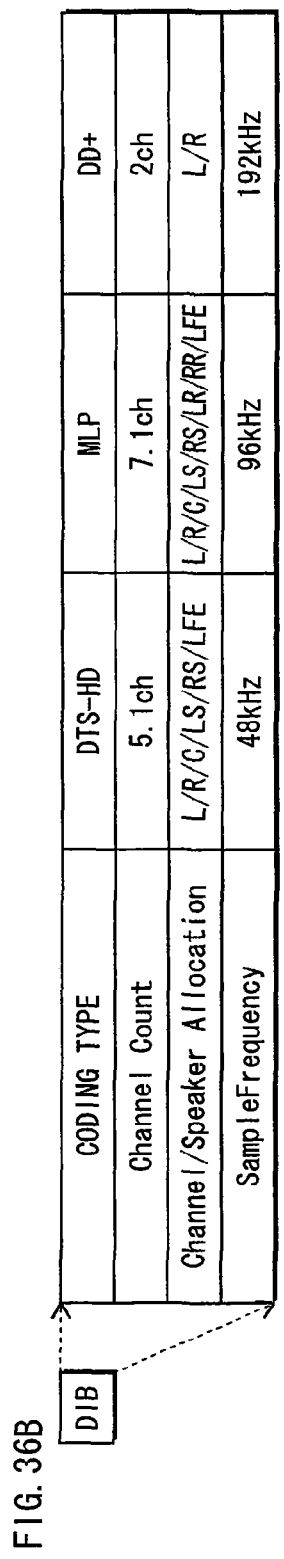
FIG. 36B shows the values that can be set in each field of the DIB.

FIG. 36B shows the values that can be set in each field of the DIB.

In the example of FIG. 36B, the row of the "Coding Type" shows encoding methods DTS-HD, MLP, and DD+ by which the connection partner device can decode. In the actual writing of the "Coding Type", four parameters "CT0", "CT1", "CT2", and "CT3" are used. Also, the row of the "Channel Count" shows 5.1 ch, 7.1 ch, and 2 ch which are the numbers of channels with which the connection partner device can decode.

Also, the row of the "Channel/Speaker Allocation" shows "L/R/C/LS/RS/LFE", "L/R/C/LS/RS/LR/RR/LFE", and "L/R" which indicate physical arrangements of speakers for 5.1 ch, 7.1 ch, and 2 ch, respectively.

The row of the "Sample Frequency" shows sampling frequencies "48 KHz", "192 KHz", and "96 KHz".

Figure 36C:
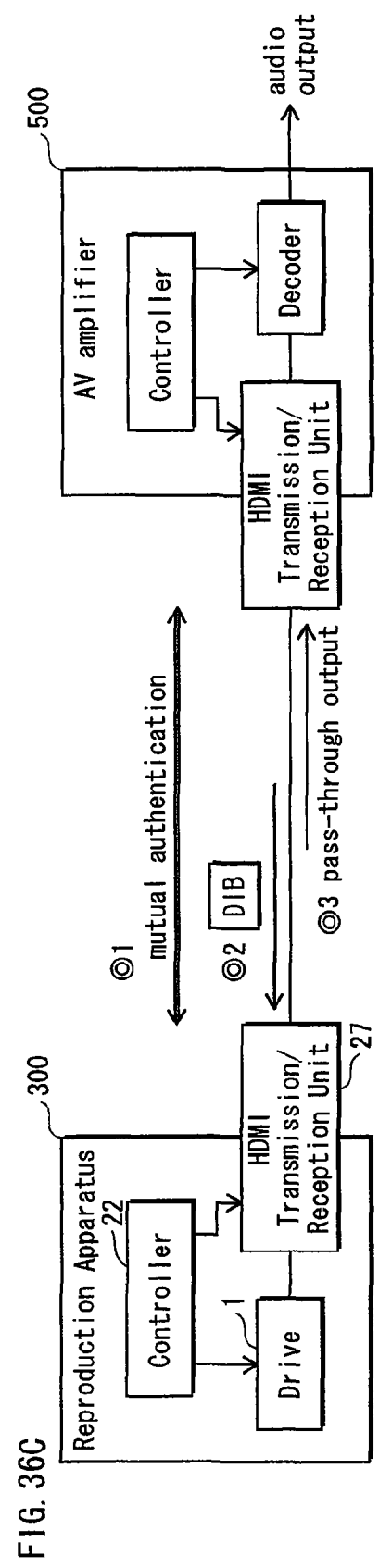
FIG. 36C shows a communication sequence using the DIB between the reproduction apparatus 300 and the AV amplifier 500.

FIG. 36C shows a communication sequence using the DIB between the reproduction apparatus 300 and the AV amplifier 500.

When the reproduction apparatus 300 is connected with the AV amplifier 500, the HDMI transmission/reception unit 27 of the reproduction apparatus 300 performs a mutual authentication with the AV amplifier 500 as indicated by "☐1, then, as indicated by "☐2", receives the DIB from the AV amplifier 500, which is to be a receiver. If, upon referring to the DIB, it is confirmed that the AV amplifier 500 has the capability to decode the Primary audio stream, the reproduction apparatus 300 can output the Primary audio stream to the AV amplifier 500 by the pass-through output, as indicated by "☐3". If the AV amplifier 500 does not have the capability to decode the Primary audio stream, either the LPCM decoded by the reproduction apparatus is transferred, or the stream is not be reproduced.

The following describes an improvement to the reproduction apparatus in the second embodiment.

FIG. 37 shows an internal structure of PSR15 in the PSR set 23.

PSR15 is 32-bit long as is the case with PSR1, PSR14, and PSR31 explained in the first embodiment.

The bits b0 to b3 show whether the reproduction apparatus has a capability to decode and reproduce LPCM audio streams. When the four bits are "0001"b, it indicates that the reproduction apparatus has a capability to reproduce LPCM audio streams of 48/96 Hz having the stereo attribute. When the four bits are "0010"b, it indicates that the reproduction apparatus has a capability to reproduce LPCM audio streams of 48/96 Hz having the surround attribute. When the four bits are "0101"b, it indicates that the reproduction apparatus has a capability to reproduce LPCM audio streams of any frequency having the stereo attribute. When the four bits are "0110"b, it indicates that the reproduction apparatus has a capability to reproduce LPCM audio streams of any frequency having the surround attribute.

The bits b4 to b7 of PSR15 show whether the reproduction apparatus has a capability to decode and reproduce DD/DD+ audio streams. When the lower two bits of the four bits are "01"b, it indicates that the reproduction apparatus has a capability to reproduce up to two channels (2 ch) of basic data (independent substreams) of DD/DD+ audio streams. When the lower two bits of the four bits are "10"b, it indicates that the reproduction apparatus has a capability to reproduce multi channels (channels that are larger in number than 2 ch) of basic data (independent substreams) of DD/DD+ audio streams.

When the upper two bits of the four bits are "01"b, it indicates that the reproduction apparatus has a capability to reproduce up to two channels (2 ch) of extension data (dependent substreams) of DD/DD+ audio streams. When the upper two bits of the four bits are "10"b, it indicates that the reproduction apparatus has a capability to reproduce multi channels of extension data (dependent substreams) of DD/DD+ audio streams.

When the upper two bits of the four bits are "00"b, it indicates that the reproduction apparatus does not have a capability to reproduce extension data (dependent substreams) of DD/DD+ audio streams.

The bits b8 to b11 of PSR15 show whether the reproduction apparatus has a capability to decode and reproduce DTS-HD audio streams. When the lower two bits of the four bits are "01"b, it indicates that the reproduction apparatus has a capability to reproduce up to two channels (2 ch) of basic data (Core substreams) of DTS-HD audio streams. When the lower two bits of the four bits are "10"b, it indicates that the reproduction apparatus has a capability to reproduce multi channels of basic data (Core substreams) of DTS-HD audio streams.

When the upper two bits of the four bits are "01"b, it indicates that the reproduction apparatus has a capability to reproduce up to two channels (2 ch) of extension data (Extension substreams) of DTS-HD audio streams. When the upper two bits of the four bits are "10"b, it indicates that the reproduction apparatus has a capability to reproduce multi channels of extension data (Extension substreams) of DTS-HD audio streams.

When the upper two bits of the four bits are "00"b, it indicates that the reproduction apparatus does not have a capability to reproduce extension data (Extension substreams) of DTS-HD audio streams.

The bits b12 to b15 of PSR15 show whether the reproduction apparatus has a capability to decode and reproduce DD/MLP audio streams. When the lower two bits of the four bits are "01"b, it indicates that the reproduction apparatus has a capability to reproduce up to two channels (2 ch) of DD audio streams. When the lower two bits of the four bits are "10"b, it indicates that the reproduction apparatus has a capability to reproduce multi channels of DD audio streams.

When the upper two bits of the four bits are "01"b, it indicates that the reproduction apparatus has a capability to reproduce up to two channels (2 ch) of MLP audio streams. When the upper two bits of the four bits are "10"b, it indicates that the reproduction apparatus has a capability to reproduce multi channels of MLP audio streams.

When the upper two bits of the four bits are "00"b, it indicates that the reproduction apparatus does not have a capability to reproduce MLP audio streams.

As described above, PSR15 can define, for each encoding method, whether or not the reproduction apparatus has a capability to process the basic data and the extension data. Here, the "2 ch" used in the explanation of PSR15 means two channels for L and R, respectively.

Figure 38:
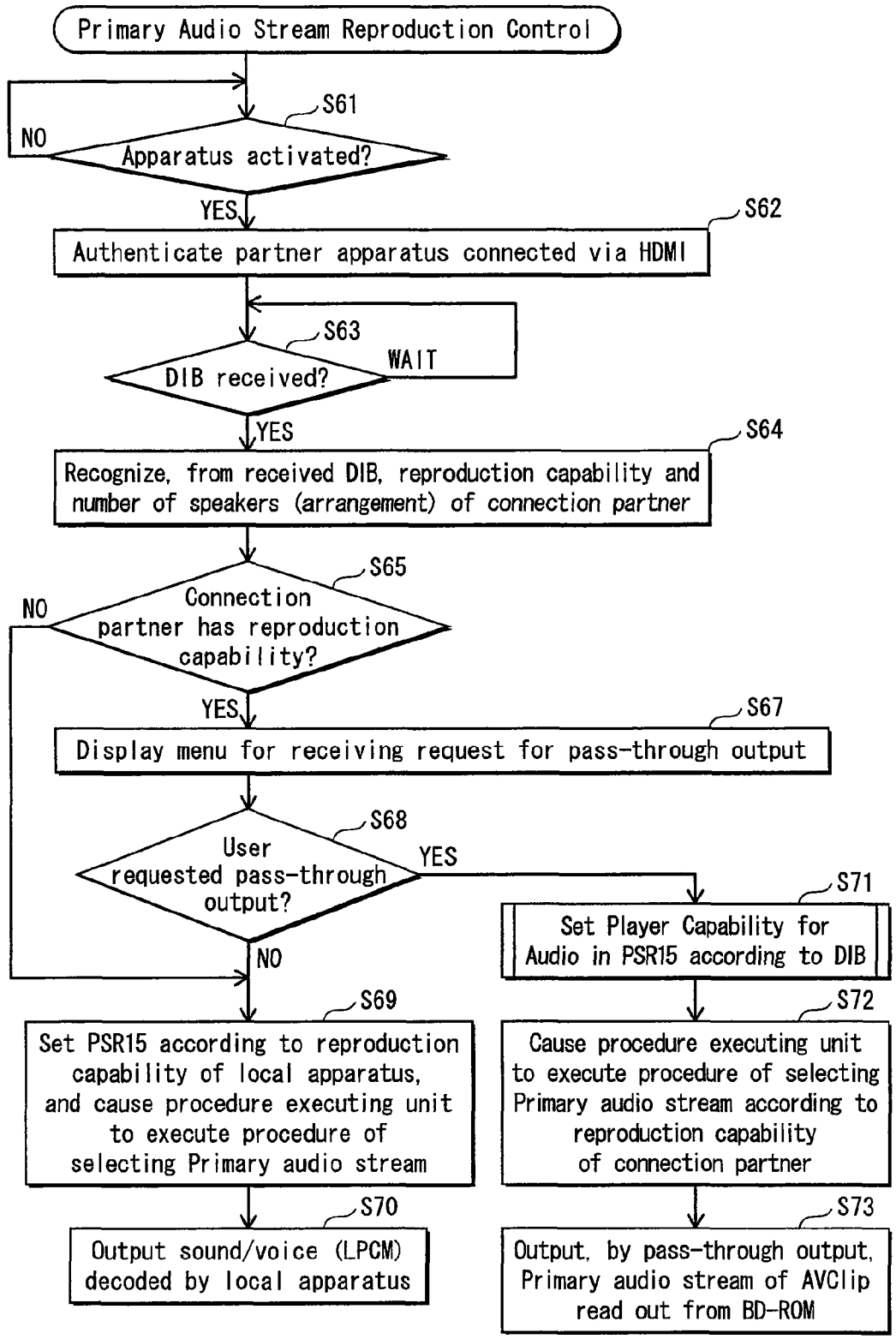
FIG. 38 is a flowchart showing the processing procedure of the controller 22 in the second embodiment.

With such definition of PSR15, the controller 22 in the second embodiment performs the reproduction control of the Primary audio stream, in accordance with the flowchart shown in FIG. 38. FIG. 38 is a flowchart showing the processing procedure of the controller 22 in the second embodiment.

In step S61, it is judged whether the apparatus has been activated. If it is judged that the apparatus has been activated, the partner apparatus connected via HDMI is authenticated (step S62). When the connected apparatuses are successfully authenticated mutually, the control moves to step S63. The step S63 is a loop in which it is repeatedly judged whether or not the DIB has been received. If it is judged that the DIB has been received (YES in step S63), the controller 22 recognizes, by referring to the DIB received from the connection partner, the reproduction capability and the number of speakers (arrangement) of the connection partner (step S64). Then in step S65, it is judged whether or not the connection partner has the reproduction capability. If it is judged that the connection partner has the reproduction capability, the controller 22 displays a menu for receiving a request for the pass-through output (step S67), and judges whether the user requested the pass-through output (step S68).

It should be noted here that if it is recognized, by referring to the DIB, that a device (in many cases, an AV amplifier) connected to a speaker has the decoding capability, the pass-through output may be set automatically (YES in step S68) so that the connection partner device performs the decoding, without allowing the user to set.

Further, it may be preliminarily set that if it is recognized, by referring to the apparatus settings menu (initial settings menu) of the reproduction apparatus 300, that the connection partner device has the decoding capability, the pass-through output is set automatically (YES in step S68).

Figure 39:
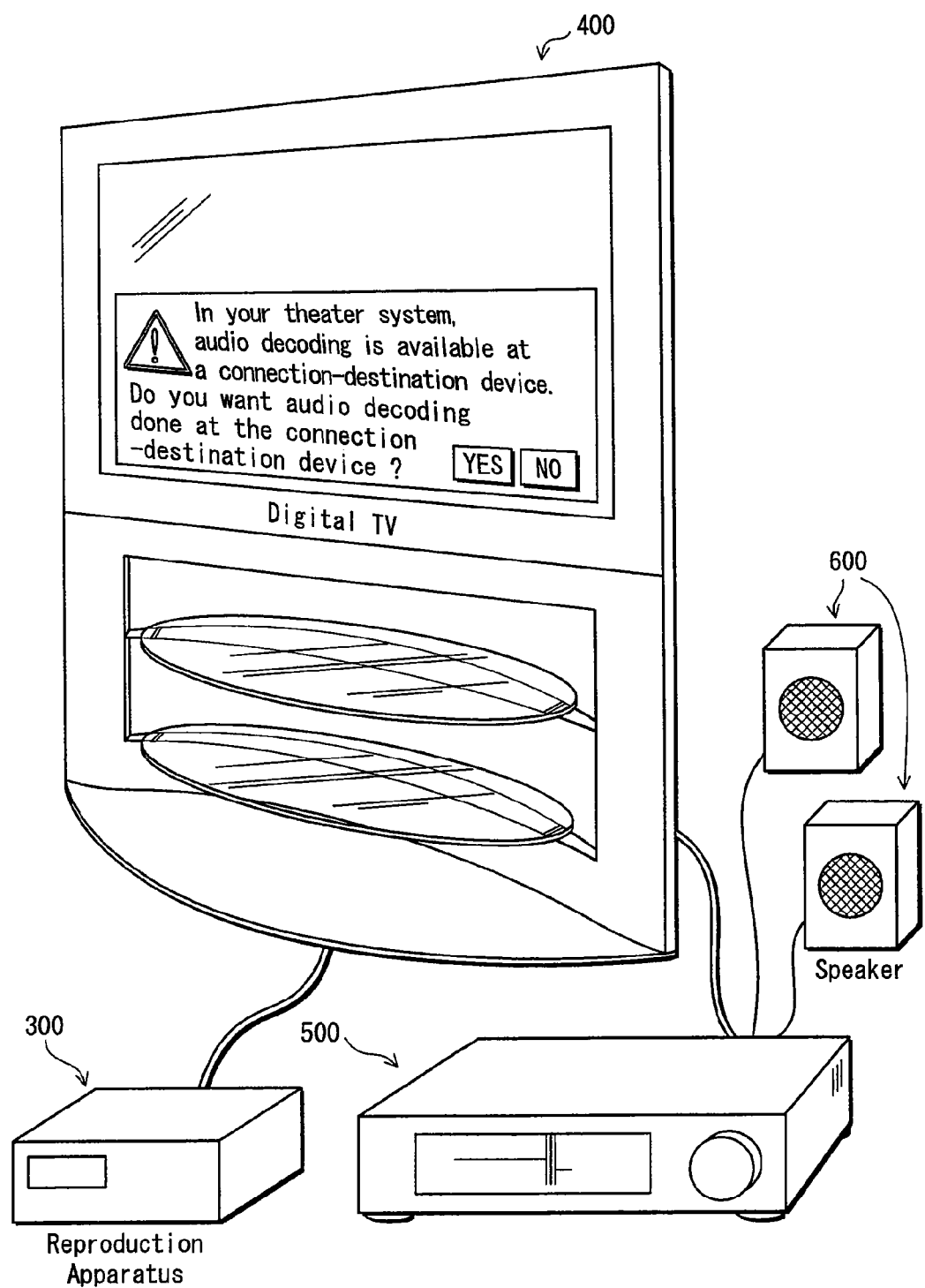
FIG. 39 shows a menu for receiving a determination on whether or not to perform the pass-through output.
Figure 40:
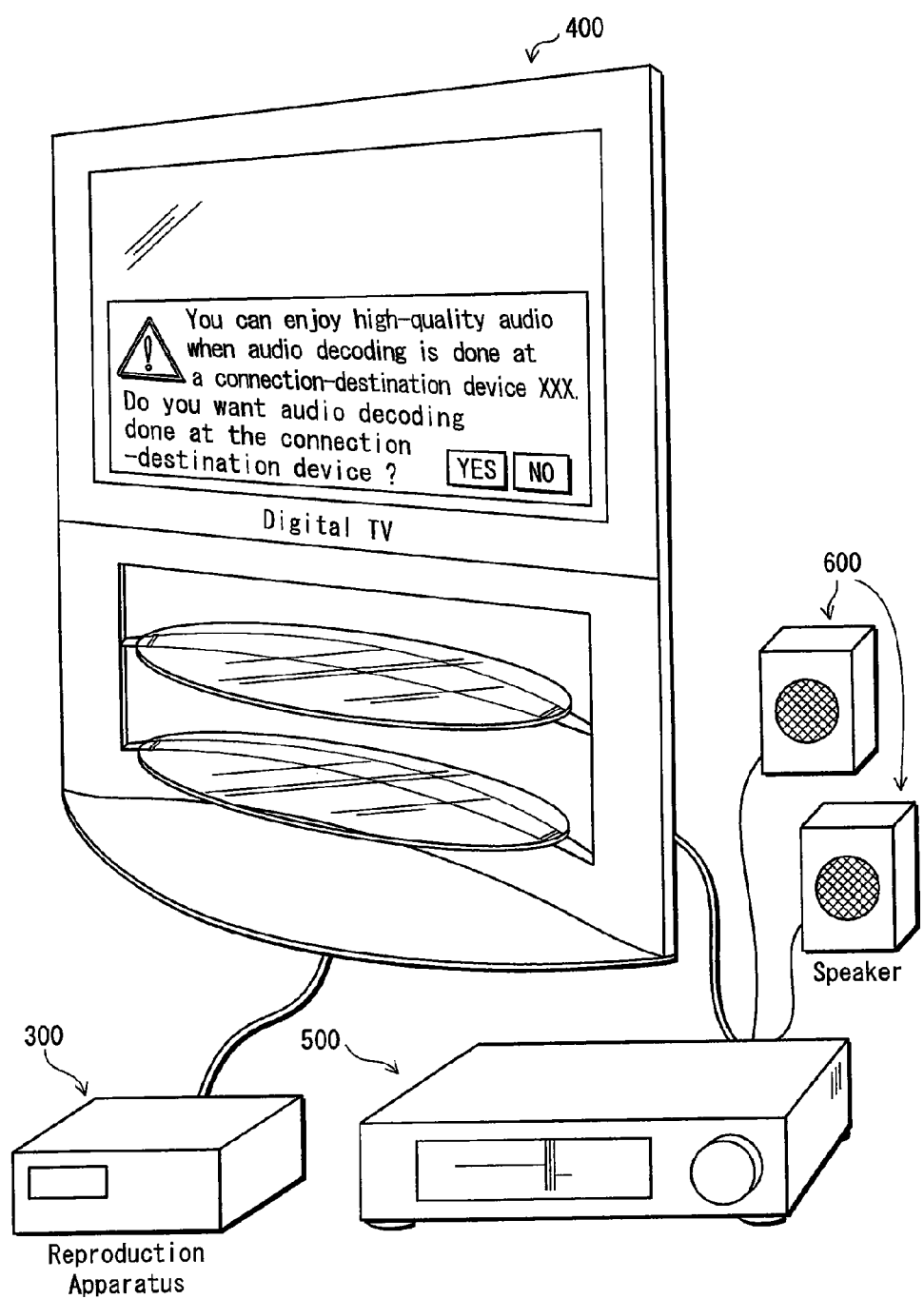
FIG. 40 shows a menu for receiving a determination on whether or not to perform the pass-through output.

FIGS. 39 and 40 shows menus for receiving a determination on whether or not to perform the pass-through output. The menus shown in FIGS. 39 and 40 are each composed of a message that is supposed to attract the user's attention: "In your theater system, audio decoding is available at a connection-destination device"; or "You can enjoy high-quality audio when audio decoding is done at a connection-destination device XXX", and buttons "YES" and "NO" for receiving determination on whether or not to allow the connection-destination device to perform the decoding.

In the message shown in the menu of FIG. 40, "XXX" may be filled with the product name or the model number of the AV amplifier 500. Alternatively, "XXX" may be filled with the product name or the model number of the television 400 as well as those of the AV amplifier 500, allowing the user to select one among them. This enables the user to select a device that is to perform the decoding. Further, if the user has two or more AV amplifiers, it is preferable that the product names and/or the model numbers of the AV amplifiers are displayed such that the user can select one among them.

When the user makes a confirmation on the "YES" button on the menu to instruct the pass-through output, the Player capability for Audio is set in PSR15 according to the DIB (step S71), and the Procedure executing unit 42 is caused to execute the procedure of selecting a Primary audio stream according to the decoding capability of the AV amplifier 500 (step S72). After this, the Primary audio stream of the AVClip read out from the BD-ROM is output by the pass-through output (step S73).

If the user does not operate to cause the AV amplifier 500 to perform the decoding, the controller 22 sets PSR15 in accordance with the decoding capability of the reproduction apparatus itself, causes the Procedure executing unit 42 to execute the procedure of selecting a Primary audio stream (step S69), and causes the sound/voice (LPCM) decoded by the reproduction apparatus to be output (step S70).

Figure 41:
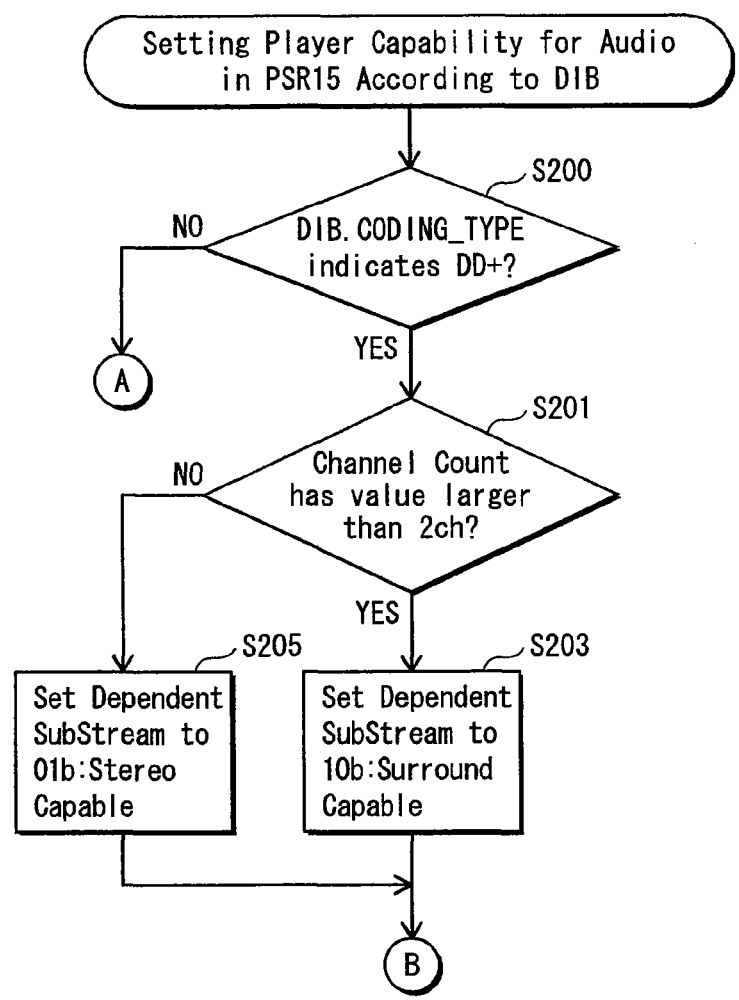
FIG. 41 is a flowchart showing the procedures for setting Player capability for Audio in PSR15 according to the DIB.
Figure 42:
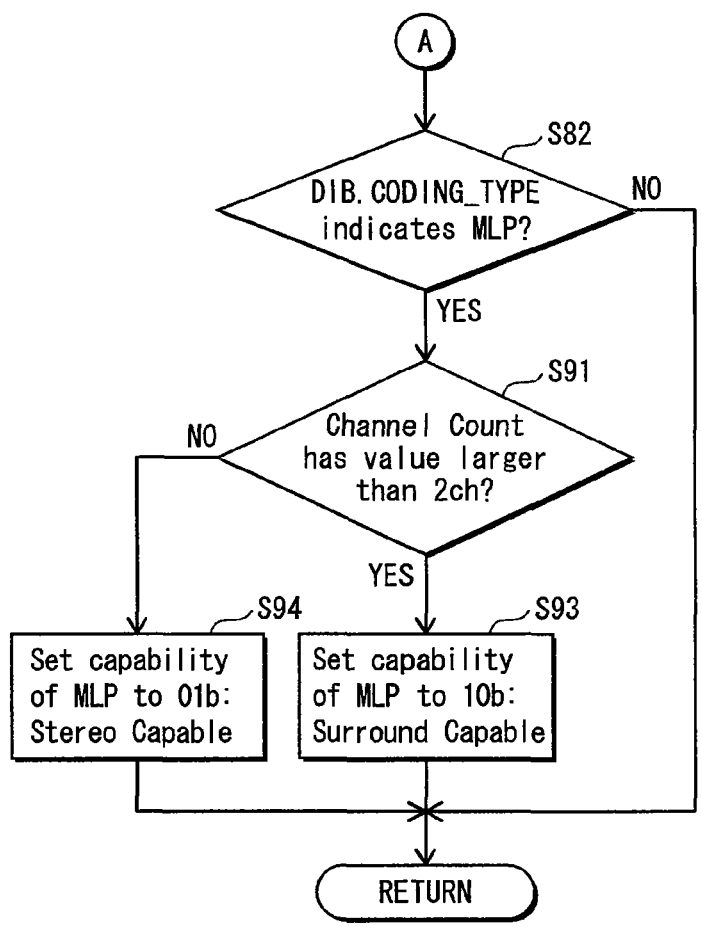
FIG. 42 is a flowchart showing the procedures for setting Player capability for Audio in PSR15 according to the DIB.

FIGS. 41 and 42 are flowcharts showing the procedures for setting Player capability for Audio in PSR15 according to the DIB.

In the flowchart of FIG. 41, in step S200, it is judged whether or not DIB.CODING_TYPE indicates DD+.

If it is judged that DIB.CODNG_TYPE indicates DD+, the control moves to step S201 in which it is judged whether or not the Channel count of the DIB has a value larger than 2. If the judgment result of step S201 is positive, the control moves to step S203 in which the "capability" of Dependent SubStream is set to 10b:Surround Capable.

If it is judged as "NO" in step S201, the control moves to step S205 in which the "capability" of Dependent SubStream is set to 01b:Stereo Capable.

In the flowchart of FIG. 42, in step S82, it is judged whether or not DIB.CODING_TYPE indicates MLP. If it is judged that DIB.CODING_TYPE indicates MLP (YES in step S82), the control moves to step S91 in which it is judged whether or not the Channel count of the DIB has a value larger than 2.

If the judgment result of step S91 is positive (YES in step S91), the control moves to step S93 in which the "capability" of MLP is set to 10b:Surround Capable. If it is judged as "NO" in step S91, the control moves to step S94 in which the "capability" of MLP is set to 01b:Stereo Capable.

It should be noted here that although Channel Count of the DIB is used in the judgments in steps S201 and S91 of FIGS. 41 and 42, Channel/Speaker Allocation may be used instead.

As described above, according to the present embodiment, information of the capability of the connection partner device is obtained via a digital interface such as HDMI, and PSR15 is set according to the obtained capability information. Further, a Primary audio stream is selected from the BD-ROM disc/local storage, and the pass-through output of the selected Primary audio stream is performed. This makes it possible to effectively use the decoder resource of the connection partner device to achieve a high-quality audio reproduction. Also, since an AV amplifier and speakers are often developed/sold as a set. In such a case, the AV amplifier provides adjustment that matches the characteristics of the speakers. Accordingly, even if the reproduction apparatus can decode using the internal decoder, it is possible to cause the AV amplifier connected to the reproduction apparatus to decode to obtain a reproduction result of an acoustically higher quality.

Third Embodiment

The local storage 200 in the first embodiment is a hard disk embedded in the reproduction apparatus, while the local storage 200 in the third embodiment is an SD memory card which is a portable recording medium. The present embodiment relates to an improvement in the case where a dynamic scenario is recorded in the portable recording medium for use in the reproduction apparatus.

The SD memory card is a portable recording medium that is provided with a secure area and a non-secure area. Files on a local storage such as those shown in the first embodiment are recorded in the non-secure area after they are encoded, and the encryption key is recorded in the secure area. The encryption key cannot be read out from the secure area unless the authenticity of the reader is confirmed through the authentication performed by the SD memory card. This construction prevents an unauthorized copy of the files from the non-secure area, and enables the files to be read out only when the BD-ROM is accessible as well.

The dynamic scenario is a program such as a Java™ application or a Movie Object described in the first embodiment that causes the reproduction apparatus to perform a reproduction via the PlayList information. The dynamic scenario may be recorded on the BD-ROM 100 or on the local storage 200. When the dynamic scenario is recorded on a portable recording medium, it means that the dynamic scenario is accessible by any of reproduction apparatuses disposed at various locations. Accordingly, the dynamic scenario may be accessed by the reproduction apparatus 300 that is mounted in a car.

Figures 43A, 43B:
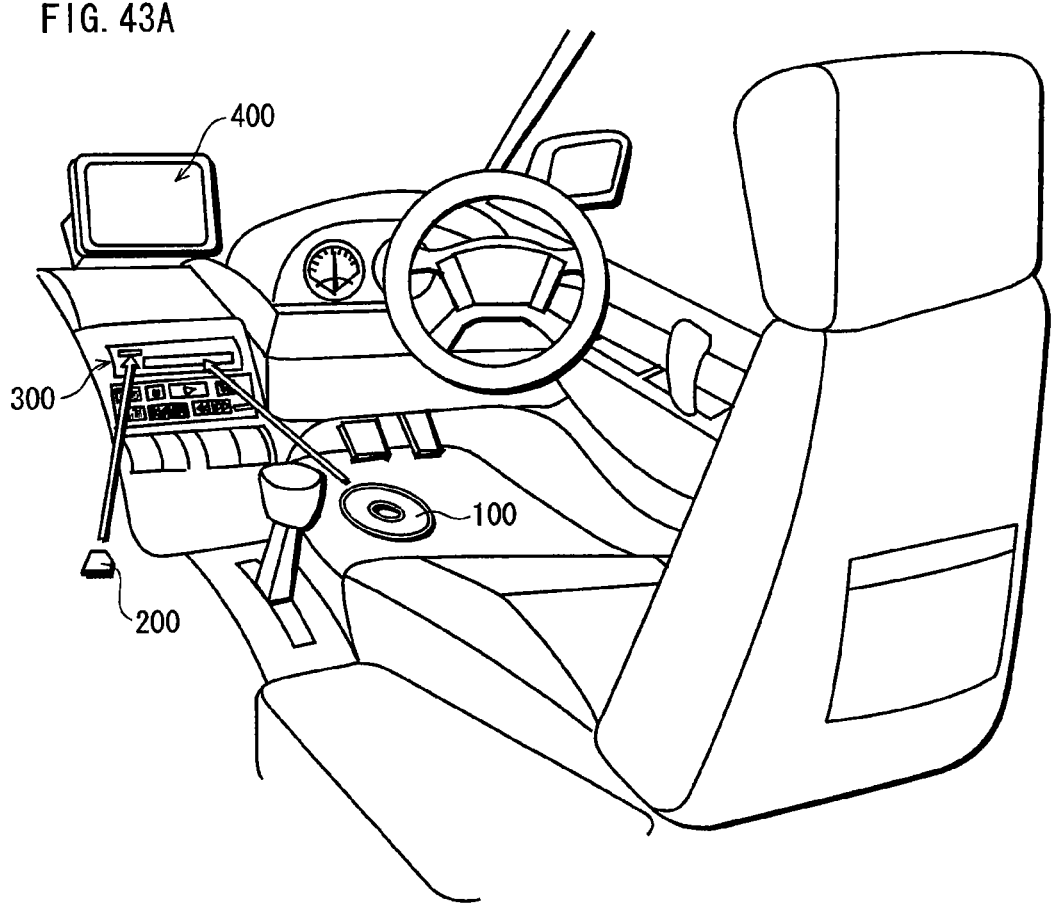
FIG. 43A shows an example of the reproduction apparatus 300 mounted in a car.
FIG. 43B shows the internal structure of PSR31 in the third embodiment.

FIG. 43A shows the reproduction apparatus 300 mounted in a car. The reproduction apparatus 300 and the television 400 constitute a car audio system. The portable local storage 200 may be installed in the reproduction apparatus 300, together with the BD-ROM 100.

When the reproduction apparatus 300 is mounted in a car, it is preferable to clearly indicate that the reproduction apparatus 300 is operated like a CD reproduction apparatus. To clearly indicate that the reproduction apparatus 300 is operated like a CD reproduction apparatus, PSR31 in the present embodiment is constructed as shown in FIG. 43B.

FIG. 43B shows the internal structure of PSR31 in the third embodiment. When the reproduction apparatus is mounted in a car, the Player Profile information of PSR31 in the third embodiment is set to "1000"b by an engineer of the maker or by an end user. When Profile information of PSR31 is set to "1000"b, the Profile information indicates that the reproduction apparatus is operated as an Audio Profile Player. Here, the "Audio Profile Player" indicates that the reproduction apparatus is not suited for being operated via an interactive screen, but is operated CD-player-like (that is to say, the reproduction apparatus is a BD-ROM reproduction apparatus that performs a reproduction control on the contents only by linear operations like a CD reproduction apparatus, and is not ready for a reproduction control on the contents via a GUI or the like, or the reproduction apparatus temporarily transfers into such a mode when it detects that the car is running).

When the reproduction apparatus is CD-player-like, the content is reproduced by operations that are performed in units of chapters, such as a chapter skip and a chapter search. The chapter is defined by the PlayList Mark information shown in FIG. 17.

The following describes the PlayList Mark information.

Figure 44:
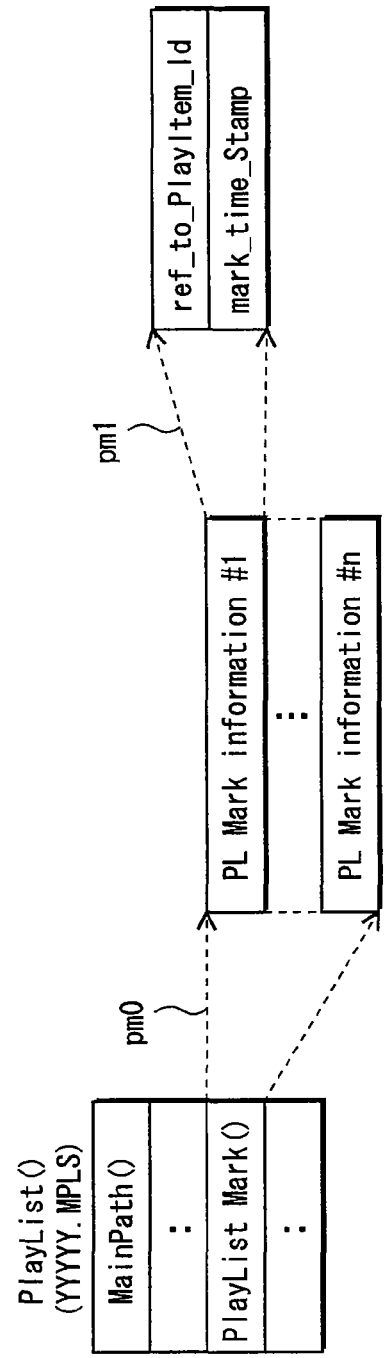
FIG. 44 shows the internal structure of the PlayList Mark information contained in the PlayList information.

FIG. 44 shows the internal structure of the PlayList Mark information contained in the PlayList information. As indicated by the lead line pm0 in the drawing, the PlayList Mark information includes a plurality of pieces of PL Mark information(#1-#n). The PL Mark information (PL Mark( )) specifies a given position on the PL time axis as a chapter point. As indicated by the lead line pm1 in the drawing, the PL Mark information includes: "ref_to_PlayItem_Id" that indicates a PlayItem being a target of the chapter specification; and "Mark_time_stamp" that indicates a chapter position in the PlayItem by a time notation.

Figure 45:
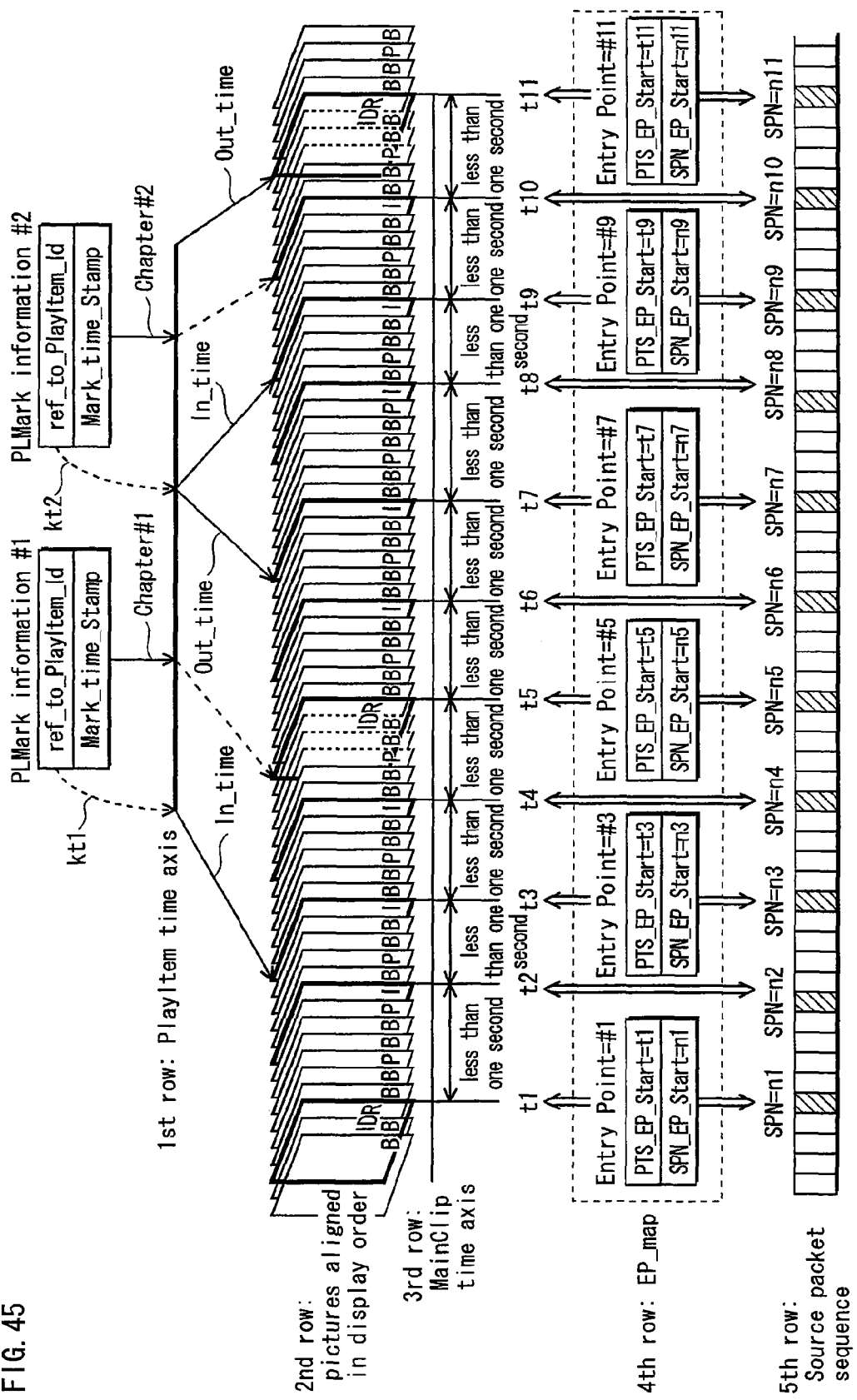
FIG. 45 shows a specification of a chapter position by the PL Mark information.

FIG. 45 shows a specification of a chapter position by the PL Mark information. The $2^{nd}$ to $5^{th}$ rows in FIG. 45 show the EP map and AVClip shown in FIG. 10.

The $1^{st}$ row shows the PL Mark information and the PL time axis. Two pieces of PL Mark information #1 and #2 are shown in the $1^{st}$ row. The arrows kt1 and kt2 indicate specifications of PlayItems by ref_to_PlayItem_Id in the PL Mark information. As understood from these arrows, ref_to_PlayItemId in the PL Mark information specifies PlayItems to be referred to. Also, the Mark_time_stamp indicates the times of Chapters #1 and #2 on the PL time axis. In this way, the PL Mark information defines chapter points on the PlayItem time axis.

Up to now, the PL Mark information has been described. From now on, the improvement on the dynamic scenario will be described.

In the case of a program that is embedded in the reproduction apparatus, it is known in the manufacturing stage whether the program is used in a car or in a home theater system. However, in the case of the dynamic scenario (Movie Object, Java™ application) that is supplied to the reproduction apparatus via the BD-ROM 100 or the portable local storage 200, it cannot be known preliminarily whether the program is used in a car or in a home theater system. This is because the user determines what reproduction apparatus the BD-ROM 100 or the local storage 200 being an SD memory card should be used in.

For this reason, when the Player Profile information is set to specify Audio Profile Player, the Movie Object or the Java™ application needs to control the reproduction apparatus to be operated CD-player-like. On the other hand, when the Player Profile information is set otherwise, it is preferable that the reproduction apparatus is operated via an interactive screen.

Figure 46:
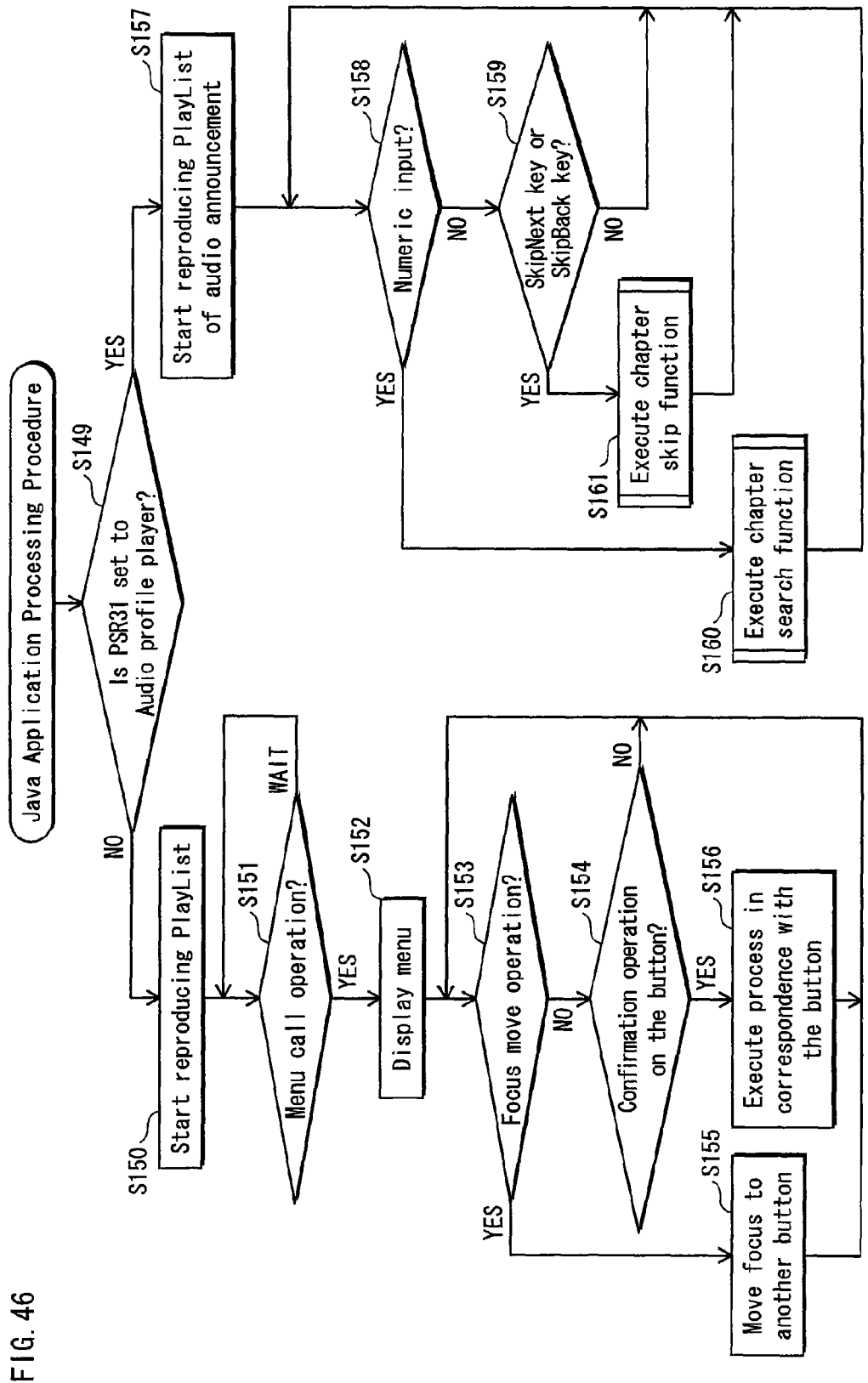
FIG. 46 is a flowchart of a processing procedure of a Java™ application in the third embodiment.

FIG. 46 is a flowchart of a processing procedure of a Java™ application in the present embodiment.

In step S149, it is judged whether or not PSR31 is set to specify Audio profile player. If the judgment result in step S149 is negative, the PlayList starts to be reproduced (step S150). The control then moves to the loop in step S151.

The step S151 constitutes a loop waiting for a Menu call operation. If it is judged that the Menu call operation has been performed, the menu is displayed (step S152), and steps S153 to S156 are performed. In step S153, it is judged whether or not a Focus move operation has been performed. If it is judged that the Focus move operation has been performed, the focus is moved to another button (step S155).

In step S154, it is judged whether or not an operation has been performed to make confirmation on the button. If it is judged that the operation has been performed to make confirmation on the button, a process is executed in correspondence with the button (step S156).

If it is judged in step S149 that PSR31 is set to specify Audio profile player (YES in step S149), a PlayList of an audio announcement is reproduced to notify the user that a linear CD-like reproduction is performed. The control then moves to a loop composed of steps S158 to S159.

In step S158, it is judged whether or not a numeric has been input. In step S159, it is judged whether or not the SkipNext key or the SkipBack key has been operated.

If it is judged in step S158 that a numeric has been input, the control moves to step S160 in which the chapter search function is executed. If it is judged in step S159 that the SkipNext key or the SkipBack key has been operated, the control moves to step S161 in which the chapter skip function is executed.

In the above-provided example, a Java™ application is used. When a Movie Object is used, steps S153 to S155 are performed using navigation commands in the IG stream or navigation commands of the Movie Object. The operations in this case are similar to those for a Java™ application, and the explanation is omitted.

Figure 47:
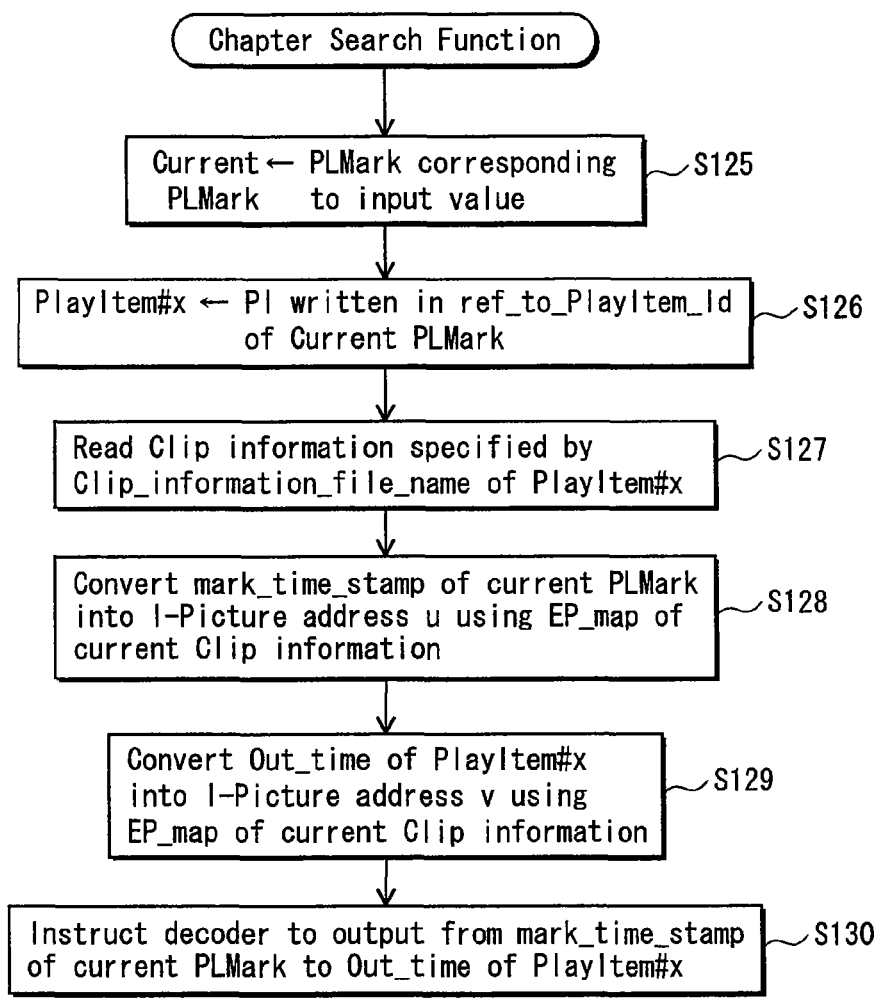
FIG. 47 is a flowchart showing the procedure of the chapter search.

The following provides explanation of the procedures of the chapter search and the chapter skip, with reference to the flowcharts. FIG. 47 is a flowchart showing the procedure of the chapter search.

First, the PL Mark information corresponding to an input value is set to the current PL Mark (step S125). Secondly, in step S126, the PI written in ref_to_PlayItem_Id of the Current PL Mark is set to PlayItem#x (step S126). In step S127, the Clip information specified by Clip_informationfile_name of PlayItem#x is read out. In step S128, mark_time_stamp of the current PL Mark is converted into I-Picture address u using EP_map of current Clip information.

Figure 48:
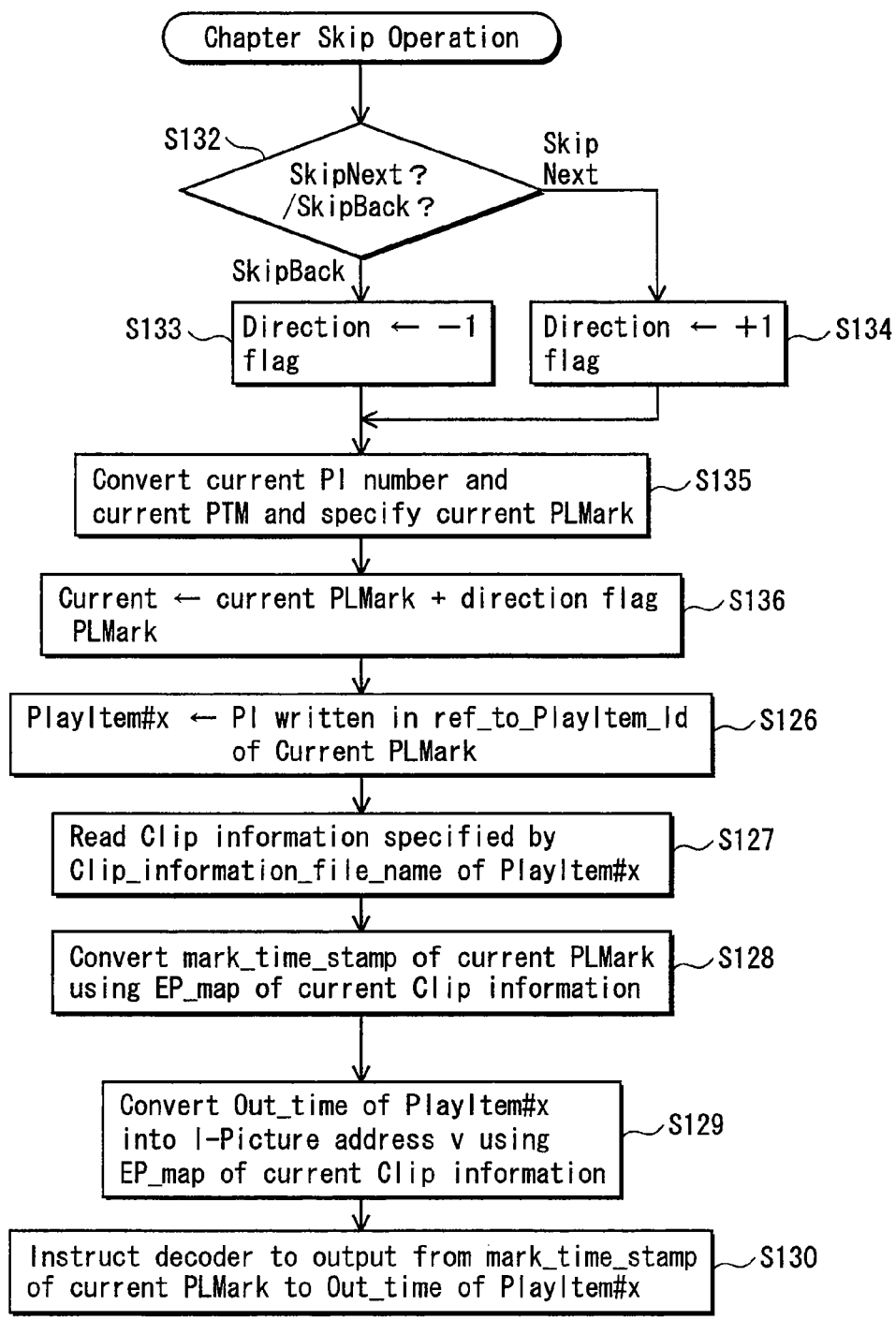
FIG. 48 is a flowchart showing the procedure of the chapter skip.

In step S129, Out_time of PlayItem#x is converted into I-Picture address v using EP_map of the current Clip information. In step S130, the decoder is instructed to output the data extending from mark_time_stamp of the current PLMark to Out_time of PlayItem#x. Up to now, the chapter search has been described. From now on, the chapter skip will be explained. FIG. 48 is a flowchart showing the procedure of the chapter skip.

In step S132, it is judged which of the SkipNext key and the SkipBack key was depressed. If it is judged that the SkipBack key was depressed, the control moves to step S133 in which the direction flag is set to −1. If it is judged that the SkipNext key was depressed, the control moves to step S134 in which the direction flag is set to +1.

In step S135, the current PI number and the current PTM are converted to specify the current PL Mark. In step S136, a result of adding the value of the direction flag to the current PL Mark number is set to the current PL Mark number. Here, in the case of the SkipNext key, the direction flag has been set to +1, thus the current PL Mark number is incremented; and in the case of the SkipBack key, the direction flag has been set to −1, thus the current PL Mark number is decremented. After the PL Mark information is set in this way, TS packets are read out by executing steps S126 to S130, as in FIG. 47.

Up to now, the procedure of the reproduction apparatus in a reproduction based on the PL Mark information has been explained.

As described above, according to the present embodiment, when the PSR31 is set to specify Audio Profile Player, a dynamic scenario such as Movie Object or Java™ application can be used so that the user can reproduce a PlayList with operationability equivalent to that of a CD reproduction apparatus. With such a construction, the BD-ROM can be operated by the user in the same manner as a music CD. More specifically, the chapter search/skip function corresponds to the function to search/skip songs in the music CD. Also, when a dynamic scenario runs on a reproduction apparatus that is not set to Audio Profile Player, an interactive reproduction is available, with a GUI-based menu being displayed on presumption that images are output. In the case where reproduction is performed via an interface such as HDMI that enables the state of the connected devices to be monitored, the following are available. That is to say, it is possible to monitor the ON/OFF of the power of the monitor display or to monitor the selection of an input source image, and if it is detected that the monitor display is not displaying reproduced images, PSR31 may be set to specify Audio Profile Player, or the reproduction may be paused, or the reproduction apparatus 300 may be powered off in conjunction with the monitor display.

Fourth Embodiment

The fourth embodiment relates to how to acquire the PlayList information, Clip information, or AVClip information described in the first embodiment. The central body of the acquisition process is a Java™ application. This is because the Java™ application has ability to form a connection on the network and file a desired file from the server apparatus.

The connection for acquiring a file from a server can be established using the openConnection method provided in the Java™ software library called Java™.net. The following is an example of such a connection when the URL of the file in the server is http://xxx.com/vp_data/0.m2ts.

EXAMPLE new java™.netURL(http://xxx.com/vp_data/0.m2ts. openConnection( )

Figure 49:
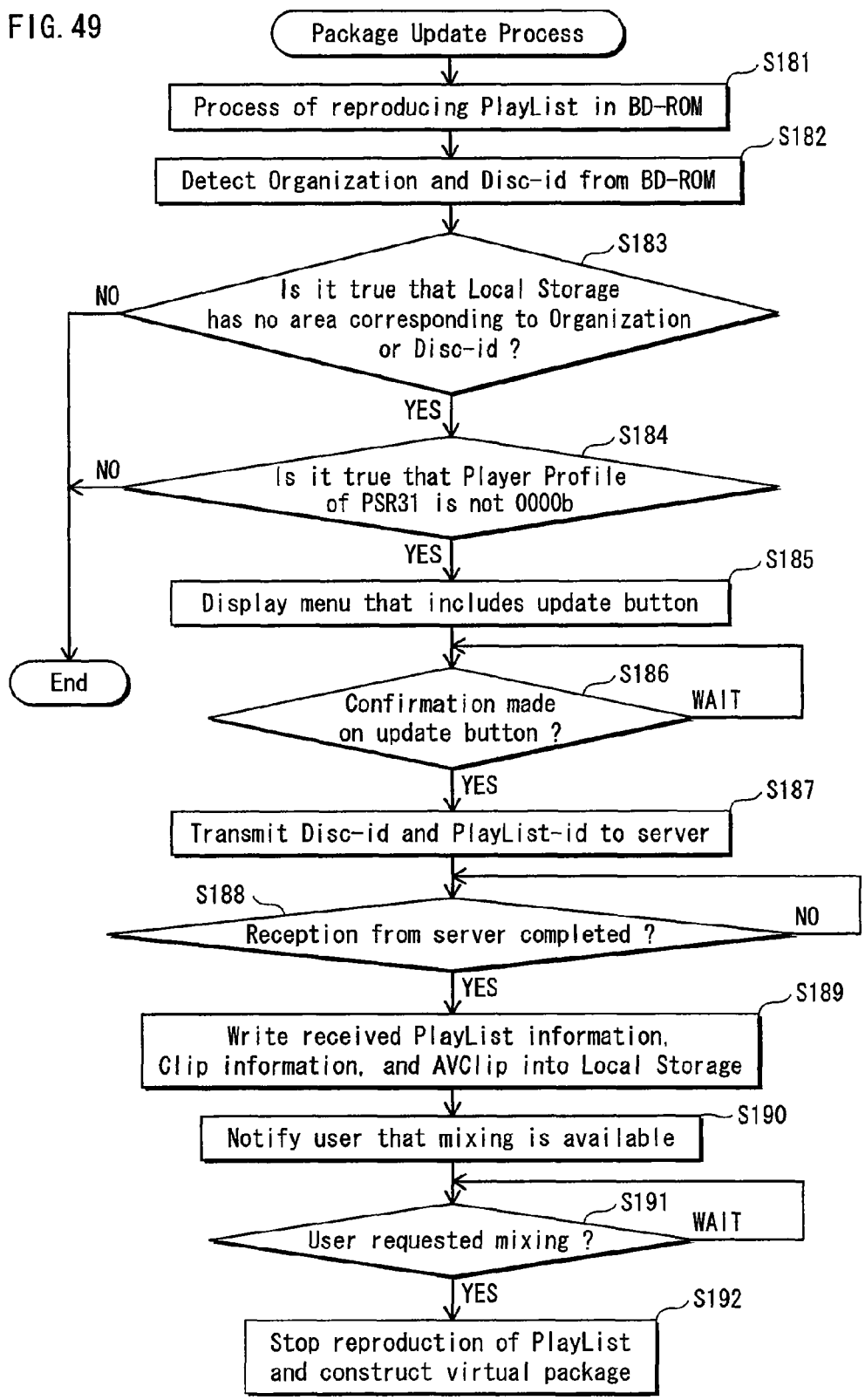
FIG. 49 is a flowchart of a Java™ application in the fourth embodiment.

FIG. 49 is a flowchart of a Java™ application in the fourth embodiment. In step S181, a PlayList in BD-ROM starts to be reproduced. After this, in step S182, "Organization" and "Disc-id" are read out from the BD-ROM, where "Organization" is information indicating a corporation or an organization that is the distributor of the BD-ROM, and "Disc-id" is an identifier of the BD-ROM.

In step S183, it is judged whether or not it is true that the local storage 200 has no area corresponding to Organization or Disc-id read out in step S182.

If it is judged that the local storage 200 does not have such an area, the control moves to step S184 in which it is judged whether or not it is true that Player Profile of PSR31 is not "0000"b.

The current process ends if the judgment result in step S183 or step S184 is "NO". If the local storage 200 has no area corresponding to Organization or Disc-id, and if the audio mixing can be performed, judgment results in both step S183 and step S184 are "YES".

If the judgment results in both step S183 and step S184 are "YES", a menu having an "update button" is displayed (step S185). Then, a confirmation on the "update button" is waited for (step S186).

Figure 50:
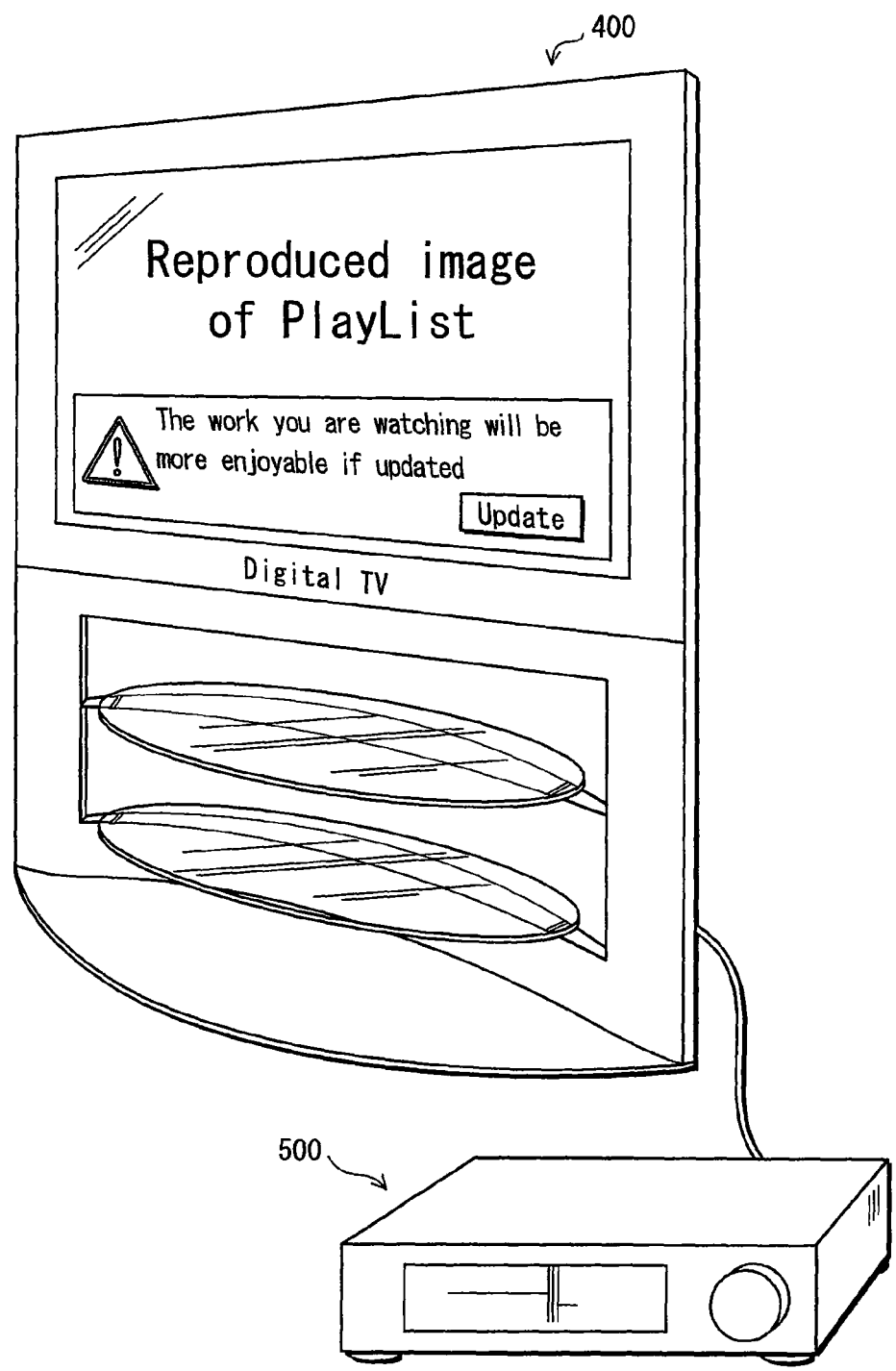
FIG. 50 shows an example of displaying a menu having an "update button".

FIG. 50 shows an example of displaying a menu having an "update button". In FIG. 50, the button "Update" is the above-indicated "update button". If an operation is performed to make confirmation on the "update button", Disc-id and PlayList-id are transmitted to the server apparatus in step S187.

The Disc-id is identification information of the BD-ROM and the PlayList-id identification information of the PlayList being reproduced. The server apparatus uses these information to select an additional content to be acquired, on the database of the contents provider. The selected additional content is sent back to the reproduction apparatus via a network. The additional content includes a set of files (PlayList information, Clip information, and AVClip) to be recorded on the local storage 200.

In step S188, reception of the additional content is waited for. If the additional content is received, the control moves to step S189 in which the PlayList information, Clip information, and AVClip that constitute the received additional content are written into the local storage 200. After this, if downloading from the server apparatus is completed and mixing has become available in the reproduction, the user is notified that mixing is available in the reproduction (step S190). Then the process enters a loop waiting for the user to request mixing (step S191). If the user requests mixing, the control moves to step S192 in which the reproduction of the PlayList is stopped, and the virtual package is constructed.

Asking the server whether or not an update is available and downloading the content for the update can be executed any time. For example, they can be executed at regular intervals while the disc is loaded or while a content is reproduced. Also, the user may be asked whether to reproduce the content immediately after the reproduction is ready to start (immediately after the virtual package is ready to be reproduced).

As described above, according to the present embodiment, when a PlayList is reproduced initially, an AVClip is reproduced while a downloading is performed, and the user can watch a reproduced image of the PlayList while waiting for the data to be downloaded into the local storage 200. This prevents the user from getting bored of waiting for the data to be downloaded into the local storage 200 even if the data has several hundreds mega bytes as a file in the local storage 200.

Here, a condition for deleting the additional content from the local storage 200 may be set in the reproduction apparatus 300 as an initial setting, and the reproduction apparatus 300 may delete the additional content in accordance with the initial setting. For example, it is preferable that the initial setting specifies receiving an input of time, and deleting the additional content at a predetermined time (for example, automatically deleting the additional content after one month has passed).

Alternatively, when the BD-ROM is ejected, the user may be asked whether to delete the additional content from the local storage 200, and the additional content may be deleted if the user answers positively.

Further, when the BD-ROM is a partial disc having a read-only area and a writable area, the additional content in the local storage 200 may be written to the writable area of the partial disc.

<Supplementary Notes>

Up to now, the best mode for carrying out the invention, as far as known to the applicant at this time of filing the present application, has been described. However, further improvements or modifications can be made on the present invention in terms of the following technical topics. It should be noted here that whether or not to make such improvements or modifications is optional, and depends on the implementer of the invention.

<Arrangement to Be Made on Additional Content>

It is preferable that the reproduction apparatus is initially set to delete the additional content from the local storage 200 months or years after the download therein.

<Substitute for PID>

In the first embodiment, the PID is used to discern between the Primary audio stream and the Secondary audio stream. In case MPEG2-PS is used instead, it is preferable that PES packet headers of the Primary audio stream and the Secondary audio stream have different stream_ids.

It is only required that the Primary audio stream and the Secondary audio stream are discernable in the level of system streams so that two audio streams are discernable by one demultiplexer. Alternatively, it is only required that before two streams are combined into one, the PID of one of the streams is changed so that the two streams can be discernable.

<Realization of Control Procedure>

Both the control procedures explained in the above-described embodiments using the flowcharts and the control procedures of the functional components explained in the above-described embodiments satisfy the requirements for the "program invention" since the above-mentioned control procedures are realized concretely using the hardware resources and are the creation of a technical idea utilizing natural laws.

Production of Program of Present Invention

The program of the present invention is an object program that can execute on a computer. The object program is composed of one or more program codes that cause the computer to execute each step in the flowchart or each procedure of the functional components. There are various types of program codes such as the native code of the processor, and JAVA™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

The program of the present invention can be produced as follows. First, the software developer writes, using a programming language, a source program that achieves each flowchart and functional component. In this writing, the software developer uses the class structure, variables, array variables, calls to external functions, and so on, which conform to the sentence structure of the programming language he/she uses.

The written source program is sent to the compiler as files. The compiler translates the source program and generates an object program.

The translation performed by the compiler includes processes such as the sentence structure analysis, optimization, resource allocation, and code generation. In the sentence structure analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program of the present invention can be produced in this way.

Use of Program of Present Invention

The program of the present invention can be used as follows.

(i) Used as Embedded Program

When the program of the present invention is used as an embedded program, the load module as the program is written into an instruction ROM, together with the Basic Input/Output System (BIOS) program and various pieces of middleware (operation systems). The program of the present invention is used as the control program of the reproduction apparatus 300 as the instruction ROM is embedded in the control unit and is executed by the CPU.

(ii) Used as Application

When the reproduction apparatus 300 is a hard-disk-embedded model, the Basic Input/Output System (BIOS) program is embedded in an instruction ROM, and various pieces of middleware (operation systems) are preinstalled in the hard disk. Also, a boot ROM for activating the system from the hard disk is provided in the reproduction apparatus 300.

In this case, only the load module is supplied to the reproduction apparatus 300 via a transportable recording medium and/or a network, and is installed in the hard disk as one application. This enables the reproduction apparatus 300 to perform the bootstrapping by the boot ROM to activate an operation system, and then causes the CPU to execute the installed load module as one application so that the program of the present application can be used.

As described above, when the reproduction apparatus 300 is a hard-disk-embedded model, the program of the present invention can be used as one application. Accordingly, it is possible to transfer, lend, or supply, via a network, the program of the present invention separately.

<Controller 22>

Components such as the controller 22 described above in the embodiments can be realized as one system LSI.

The system LSI is obtained by implementing a bear chip on a high-density substrate and packaging them. The system LSI is also obtained by implementing a plurality of bear chips on a high-density substrate and packaging them, so that the plurality of bear chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the reproduction apparatus 300.

The bear chip packaged in the system LSI includes a front-end unit, a back-end unit, and a digital processing unit. The front-end unit digitizes analog signals. The back-end unit converts digital data obtained through digital processes into the analog format and outputs the analog data.

The internal-structure components shown in the above-described embodiments are implemented in the digital processing unit.

As described above in "Used as Embedded Program", the load module as the program, the Basic Input/Output System (BIOS) program and various pieces of middleware (operation systems) are written into an instruction ROM. The major improvement of the embodiments is achieved by the load module as the program. It is therefore possible to produce a system LSI of the present invention by packaging the instruction ROM, in which the load module as the program is stored, as the bear chip.

In regards with a specific implementation method, it is preferable to use the SoC implementation or the SiP implementation. The SoC (System on Chip) implementation is a technology for printing a plurality of circuits onto a chip. The SiP (System in Package) implementation is a technology for packaging a plurality of circuits by resin or the like. Through these processes, a system LSI of the present invention can be produced based on the internal structure of the reproduction apparatus 300 described in each embodiment above.

It should be noted here that although the term LSI is used here, it may be called IC, LSI, super LSI, ultra LSI or the like, depending on the level of integration.

Further, part or all of the components of each reproduction apparatus may be achieved as one chip. The integrated circuit is not limited to the SoC implementation or the SiP implementation, but may be achieved by a dedicated circuit or a general purpose processor. It is also possible to achieve the integrated circuit by using the FPGA (Field Programmable Gate Array) that can be re-programmed after it is manufactured, or a reconfigurable processor that can reconfigure the connection and settings of the circuit cells inside the LSI. Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

INDUSTRIAL APPLICABILITY

The recording medium and reproduction apparatus of the present invention can be mass-produced based on the internal structures of them shown in the embodiments above. As such, the recording medium and reproduction apparatus of the present invention has the industrial applicability.

The invention claimed is:

1. A non-transitory computer-readable recording medium for recording playlist information which when read and executed by a computer, causes the computer to perform operations, comprising:

main path information that specifies, as a main stream, one of a plurality of digital streams, and defining a main playback section in the main stream; and sub path information that specifies, as a sub stream, another one of the plurality of digital streams, and defines a sub playback section in the sub stream, the sub playback section being to be synchronized with the main playback section, the sub stream being recorded in the recording medium; and a video stream and a primary audio stream multiplexed in the main stream;

wherein the sub stream includes a secondary audio stream which includes metadata that defines a coefficient matrix that is to be included in a sound mixing application, and further wherein the coefficient matrix defines conversion coefficients for respective channels for audio outputs of the primary audio stream, each of the conversion coefficients being used when a conversion process for sound-mixing is performed for each of the channels.

2. A playback apparatus for playing back a plurality of digital streams in accordance with playlist information, the playback apparatus comprising:

a first reading unit operable to read a main stream in accordance with main path information, the main stream including a primary audio stream, and the main path information including information that specifics one of a plurality of digital streams and defining a main playback section in the main stream;

a second reading unit operable to read a sub stream in accordance with sub path information, the sub stream including a secondary audio stream, the sub path information including information that specifies another one of the plurality of digital streams and defining a sub playback section in the sub stream, wherein the sub playback section is synchronized with the main playback section;

a demultiplexing unit operable to demultiplex the primary audio stream read by the first reading unit and the secondary audio stream read by the second reading unit;

a first decoder operable to decode the primary audio stream and output a result of the decoding as an audio output;

a second decoder operable to decode the secondary audio stream and output a result of the decoding as an audio output; and a mixing unit operable to mix the audio output of the first decoder with the audio output of the second decoder, wherein the secondary audio stream includes metadata that defines a coefficient matrix that is to be included in a sound mixing application, and further wherein the coefficient matrix defines conversion coefficients for respective channels for audio outputs of the primary audio stream, each of the conversion coefficients being used when a conversion process for sound mixing is performed for each of the channels.

3. A method for recording playlist information comprising:

multiplexing a video stream and a primary audio stream in a main stream; and recording main path information onto a recording medium, the main path information including information that specifies, as the main stream, one of a plurality of digital streams, and defines a main playback section in the main stream; and recording sub path information onto the recording medium, the sub path information including information that specifies, as a sub stream, another one of the pluralityy of digital streams, and defines a sub playback section in the sub stream, the sub playback section being synchronized with the main playback section;

wherein the sub stream includes a secondary audio stream, which includes metadata that defines a coefficient matrix that is to be included in a sound mixing application, and further wherein the coefficient matrix defines conversion coefficients for respective channels for audio outputs of the primary audio stream, each of the conversion coefficients being used when a conversion process for sound mixing is performed for each of the channels.

4. A playback method for playing back a plurality of digital streams in accordance with playlist information defining playback sections in a plurality of video streams, the playback method comprising:

a first reading step of reading packets of the main stream in accordance with the main path information, the main stream including a primary audio stream, and the main path information including information that specifies one of a plurality of digital streams and defining a main playback section in the main stream;

a second reading step of reading packets of the sub stream in accordance with the sub path information, the sub stream including a secondary audio stream, the sub path information including information that specifies another one of the plurality of digital streams and defining a sub playback section in the sub stream, wherein the sub playback section is synchronized with the main playback section;

a demultiplexing step of demultiplexing packets of the primary audio stream read by the first reading unit and packets of the secondary audio stream read by the second reading unit;

a first decoding step of decoding the primary audio stream and outputting a result of the decoding as an audio output;

a second decoding step of decoding the secondary audio stream and outputting a result of the decoding as an audio output; and a mixing step of mixing the audio output of the first decoding step with the audio output of the second decoding step, wherein the secondary audio stream includes metadata that defines a coefficient matrix that is to be included in a sound mixing application, and further wherein the coefficient matrix defines conversion coefficients for respective channels for audio outputs of the primary audio stream, each of the conversion coefficients being used when a conversion process for sound mixing is performed for each of the channels.

* * * * *